US010787312B2

(12) United States Patent
Oren et al.

(10) Patent No.: US 10,787,312 B2
(45) Date of Patent: Sep. 29, 2020

(54) APPARATUS FOR THE TRANSPORT AND STORAGE OF PROPPANT

(71) Applicant: Oren Technologies, LLC, Houston, TX (US)

(72) Inventors: John Oren, Houston, TX (US); Joshua Oren, Houston, TX (US)

(73) Assignee: OREN TECHNOLOGIES, LLC, Houston, TX (US)

( * ) Notice: Subject to any disclaimer, the term of this patent is extended or adjusted under 35 U.S.C. 154(b) by 0 days.

(21) Appl. No.: 15/716,648

(22) Filed: Sep. 27, 2017

(65) Prior Publication Data

US 2018/0016095 A1     Jan. 18, 2018

Related U.S. Application Data

(60) Division of application No. 14/738,485, filed on Jun. 12, 2015, now Pat. No. 9,809,381, which is a
(Continued)

(51) Int. Cl.
*B65D 88/12*     (2006.01)
*B65D 90/12*     (2006.01)
(Continued)

(52) U.S. Cl.
CPC ............ *B65D 90/12* (2013.01); *B65D 88/30* (2013.01); *B65D 90/587* (2013.01);
(Continued)

(58) Field of Classification Search
CPC .... B65D 88/12; B65D 88/126; B65D 90/545; B65G 63/045; B65G 63/067
(Continued)

(56) References Cited

U.S. PATENT DOCUMENTS

| 137,871 A | 4/1873 | Worsley |
|---|---|---|
| 150,894 A | 5/1874 | Safely |

(Continued)

FOREIGN PATENT DOCUMENTS

| CN | 2037354 | 5/1989 |
|---|---|---|
| CN | 2059909 | 8/1990 |

(Continued)

OTHER PUBLICATIONS

Smith, Ryan E., Prefab Architecture, A Guide to Modular Design and Construction, John Wiley & Sons, Inc., 2010.
(Continued)

*Primary Examiner* — Saul Rodriguez
*Assistant Examiner* — Willie Berry, Jr.
(74) *Attorney, Agent, or Firm* — Lorenz & Kopf LLP

(57) ABSTRACT

An apparatus for the transport and storage of proppant has a container with a top wall, a pair of end walls and a pair of side walls. The pair of side walls extend between the pair of end walls. The container has a bottom discharge opening. The container includes a funnel extending from the pair of side walls and from the pair of and walls toward the bottom discharge opening. The funnel has sides extending in an angle of greater than 25° with respect to horizontal. The funnel includes a pair of side plates extending respectively from the pair of side walls toward the bottom discharge opening and a pair of end plates extending respectively from the pair of end walls toward the bottom discharge opening. Each of the side plates and the end plates is formed of a stainless steel material.

9 Claims, 21 Drawing Sheets

Related U.S. Application Data continuation-in-part of application No. 13/768,962, filed on Feb. 15, 2013, now Pat. No. 9,771,224, which is a continuation-in-part of application No. 13/628,702, filed on Sep. 27, 2012, which is a continuation-in-part of application No. 13/555,635, filed on Jul. 23, 2012, now Pat. No. 9,718,610.

(60) Provisional application No. 62/012,153, filed on Jun. 13, 2014, provisional application No. 62/012,165, filed on Jun. 13, 2014, provisional application No. 62/139,323, filed on Mar. 27, 2015.

(51) Int. Cl.
*B65D 88/30* (2006.01)
*B65D 90/58* (2006.01)
*B65G 15/42* (2006.01)
*B65G 63/00* (2006.01)

(52) U.S. Cl.
CPC ...... *B65D 2590/0091* (2013.01); *B65G 15/42* (2013.01); *B65G 63/008* (2013.01)

(58) Field of Classification Search
USPC .............................. 414/340, 342, 344, 561
See application file for complete search history.

(56) References Cited

U.S. PATENT DOCUMENTS

| | | | |
|---|---|---|---|
| 384,443 A | 6/1888 | Hoover | |
| 448,238 A | 3/1891 | Johnson | |
| 710,611 A | 10/1902 | Ray | |
| 711,632 A | 10/1902 | Johnson | |
| 917,649 A | 4/1909 | Otto | |
| 1,143,641 A | 6/1915 | McGregor | |
| 1,331,883 A | 2/1920 | Stuart | |
| 1,344,768 A | 6/1920 | Messiter | |
| 1,434,488 A | 11/1922 | Forsythe et al. | |
| 1,520,560 A | 12/1923 | Burno | |
| 1,506,936 A | 9/1924 | Lea | |
| 1,526,527 A | 2/1925 | Butler | |
| 1,573,664 A | 2/1926 | Wetherill | |
| 1,807,447 A | 5/1931 | Smith | |
| 1,850,000 A | 3/1932 | Fernand | |
| 1,932,320 A | 10/1933 | Steward | |
| 1,973,312 A | 9/1934 | Hardinge | |
| 2,020,628 A | 11/1935 | Woodruff | |
| 2,233,005 A | 2/1941 | Garlinghouse | |
| 2,255,448 A | 9/1941 | Morris | |
| 2,293,160 A | 8/1942 | Miller et al. | |
| 2,368,672 A | 2/1945 | McNamara | |
| 2,381,103 A | 8/1945 | Frank | |
| 2,385,245 A | 9/1945 | Willoughby | |
| 2,413,661 A | 12/1946 | Stokes | |
| 2,423,879 A | 7/1947 | De Frees | |
| 2,563,470 A | 8/1951 | Kane | |
| 2,564,020 A | 8/1951 | Mengel | |
| 2,603,342 A | 7/1952 | Martinson | |
| 2,616,758 A | 11/1952 | Meyers | |
| 2,622,771 A | 12/1952 | Tulou | |
| 2,652,174 A | 9/1953 | Shea et al. | |
| 2,670,866 A | 3/1954 | Glesby | |
| 2,678,145 A | 5/1954 | Ejuzwiak et al. | |
| 2,693,282 A | 11/1954 | Sensibar | |
| 2,700,574 A | 1/1955 | Tourneau | |
| 2,792,262 A | 4/1955 | Hathom | |
| 2,774,515 A | 12/1956 | Johansson et al. | |
| 2,791,973 A | 5/1957 | Dorey | |
| 2,801,125 A | 7/1957 | Page et al. | |
| 2,808,164 A | 10/1957 | Glendinning | |
| 2,812,970 A | 11/1957 | Martinson | |
| 2,837,369 A | 6/1958 | Stopps | |
| 2,865,521 A | 12/1958 | Fisher et al. | |
| 2,873,036 A | 2/1959 | Noble | |
| 2,894,666 A | 7/1959 | Campbell, Jr. | |
| 2,988,235 A | 6/1961 | Ronyak | |
| 2,994,460 A | 8/1961 | Matthews | |
| 3,041,113 A | 6/1962 | Sackett | |
| 3,049,248 A | 8/1962 | Heltzel et al. | |
| 3,064,832 A | 11/1962 | Heltzel | |
| 3,083,879 A | 4/1963 | Coleman | |
| 3,090,527 A | 5/1963 | Rensch | |
| 3,109,389 A | 11/1963 | Karlsson | |
| 3,122,258 A | 2/1964 | Raymond | |
| 3,134,606 A | 5/1964 | Oyler | |
| 3,135,432 A | 6/1964 | McKinney | |
| 3,163,127 A | 12/1964 | Gutridge et al. | |
| 3,187,684 A | 6/1965 | Ortner | |
| 3,198,494 A | 8/1965 | Curran et al. | |
| 3,199,585 A | 8/1965 | Cronberger | |
| 3,248,026 A | 4/1966 | Kemp | |
| 3,255,927 A | 6/1966 | Ruppert et al. | |
| 3,265,443 A | 8/1966 | Simas | |
| 3,270,921 A | 9/1966 | Nadolske et al. | |
| 3,281,006 A | 10/1966 | Tonchung | |
| 3,294,306 A | 12/1966 | Areddy | |
| 3,318,473 A | 5/1967 | Jones et al. | |
| 3,326,572 A | 6/1967 | Murray | |
| 3,343,688 A | 9/1967 | Ross | |
| 3,353,599 A | 11/1967 | Swift | |
| 3,354,918 A | 11/1967 | Coleman | |
| 3,378,152 A | 4/1968 | Warner | |
| 3,387,570 A | 6/1968 | Pulcrano et al. | |
| 3,396,675 A | 8/1968 | Stevens | |
| 3,397,654 A | 8/1968 | Snyder | |
| 3,406,995 A | 10/1968 | McCarthy | |
| 3,407,971 A | 10/1968 | Oehler | |
| 3,425,599 A | 2/1969 | Sammarco et al. | |
| 3,455,474 A | 7/1969 | Truncali | |
| 3,476,270 A | 11/1969 | Cox et al. | |
| 3,483,829 A * | 12/1969 | Barry .................. | B60K 1/00 104/18 |
| 3,486,787 A | 12/1969 | Campbell | |
| 3,499,694 A | 3/1970 | Coppel | |
| 3,508,762 A | 4/1970 | Pratt | |
| 3,524,567 A | 8/1970 | Coleman | |
| 3,528,570 A | 9/1970 | Pase | |
| 3,561,633 A | 2/1971 | Morrison et al. | |
| 3,587,834 A | 6/1971 | Dugge | |
| 3,596,609 A | 8/1971 | Ortner | |
| 3,601,244 A | 8/1971 | Ort et al. | |
| 3,602,400 A | 8/1971 | Cooke | |
| 3,650,567 A | 3/1972 | Danielson | |
| 3,653,521 A | 4/1972 | Bridge | |
| 3,661,293 A | 5/1972 | Gerhard et al. | |
| 3,692,363 A | 9/1972 | Tenebaum et al. | |
| 3,704,797 A | 12/1972 | Suykens | |
| 3,721,199 A | 3/1973 | Hassenauer | |
| 3,729,121 A | 4/1973 | Cannon | |
| 3,734,215 A | 5/1973 | Smith | |
| 3,738,511 A | 6/1973 | Lemon et al. | |
| 3,752,334 A * | 8/1973 | Robinson, Jr. ......... | B65G 35/00 414/357 |
| 3,752,511 A | 8/1973 | Racy | |
| 3,777,909 A | 12/1973 | Rheinfrank | |
| 3,785,534 A | 1/1974 | Smith | |
| 3,800,712 A | 4/1974 | Krug, Jr. | |
| 3,802,584 A | 4/1974 | Sackett | |
| 3,817,261 A | 6/1974 | Rogge | |
| 3,820,762 A | 6/1974 | Bostrom et al. | |
| 3,827,578 A | 8/1974 | Hough | |
| 3,840,141 A | 10/1974 | Allom et al. | |
| 3,854,612 A | 12/1974 | Snape | |
| 3,861,716 A | 1/1975 | Baxter et al. | |
| 3,883,005 A | 5/1975 | Stevens | |
| 3,904,105 A | 9/1975 | Booth | |
| 3,909,223 A | 9/1975 | Schmidt | |
| 3,913,933 A | 10/1975 | Visser et al. | |
| 3,933,100 A | 1/1976 | Dugge | |
| 3,963,149 A | 6/1976 | Fassauer | |
| 3,970,123 A | 7/1976 | Poulton et al. | |
| 3,986,708 A | 10/1976 | Heltzel et al. | |
| 3,997,089 A | 12/1976 | Clarke et al. | |

(56) References Cited

U.S. PATENT DOCUMENTS

| | | |
|---|---|---|
| 3,999,290 A | 12/1976 | Wood |
| 4,003,301 A | 1/1977 | Norton |
| 4,004,700 A | 1/1977 | Empey |
| 4,019,635 A | 4/1977 | Boots |
| 4,049,135 A * | 9/1977 | Glassmeyer .......... B65D 88/126 108/55.1 |
| 4,057,153 A | 11/1977 | Weaver |
| 4,058,239 A | 11/1977 | Van Mill |
| 4,059,194 A * | 11/1977 | Barry .................. B61B 1/005 414/278 |
| 4,063,656 A | 12/1977 | Lambert |
| 4,073,410 A | 2/1978 | Melcher |
| 4,125,195 A | 11/1978 | Sasadi |
| 4,138,163 A | 2/1979 | Calvert et al. |
| 4,178,117 A | 12/1979 | Brugler |
| 4,204,773 A | 5/1980 | Bates |
| 4,210,273 A | 7/1980 | Hegele |
| 4,210,963 A | 7/1980 | Ricciardi et al. |
| RE30,358 E | 8/1980 | Sensibar |
| 4,222,498 A | 9/1980 | Brock |
| 4,227,732 A | 10/1980 | Kish |
| 4,232,884 A | 11/1980 | DeWitt |
| 4,239,424 A | 12/1980 | Pavolka |
| 4,245,820 A | 1/1981 | Muryn |
| 4,247,228 A | 1/1981 | Gray et al. |
| 4,247,370 A | 1/1981 | Nijhawan et al. |
| 4,258,953 A | 3/1981 | Johnson |
| 4,265,266 A | 5/1981 | Kierbow et al. |
| 4,278,190 A | 7/1981 | Oory et al. |
| 4,280,640 A | 7/1981 | Daloisio |
| 4,282,988 A | 8/1981 | Hulbert, Jr. |
| 4,287,921 A | 9/1981 | Sanford |
| 4,287,997 A | 9/1981 | Rolfe et al. |
| 4,289,353 A | 9/1981 | Merritt |
| 4,299,597 A | 11/1981 | Oetiker et al. |
| 4,306,895 A | 12/1981 | Thompson et al. |
| 4,329,106 A | 5/1982 | Adler |
| 4,350,241 A | 9/1982 | Wenzel |
| 4,359,176 A | 11/1982 | Johnson |
| 4,363,396 A | 12/1982 | Wolf et al. |
| 4,395,052 A | 7/1983 | Rash |
| 4,397,406 A | 8/1983 | Croley |
| 4,398,653 A | 8/1983 | Daloisio |
| 4,402,392 A | 9/1983 | Fabian et al. |
| 4,407,202 A | 10/1983 | McCormick |
| 4,408,886 A | 10/1983 | Sampson et al. |
| 4,410,106 A | 10/1983 | Kierbow et al. |
| 4,420,285 A | 12/1983 | Loyer et al. |
| 4,427,133 A | 1/1984 | Kierbow et al. |
| 4,428,504 A | 1/1984 | Bassett et al. |
| 4,449,861 A | 5/1984 | Saito et al. |
| 4,453,645 A | 6/1984 | Usui et al. |
| 4,474,204 A | 10/1984 | West |
| 4,475,672 A | 10/1984 | Whitehead |
| 4,478,155 A | 10/1984 | Cena et al. |
| 4,483,462 A | 11/1984 | Heintz |
| 4,513,755 A | 4/1985 | Baroni |
| 4,525,071 A | 6/1985 | Horowitz |
| 4,526,353 A | 7/1985 | Stomp |
| 4,532,098 A | 7/1985 | Campbell et al. |
| 4,534,869 A | 8/1985 | Seibert |
| 4,552,573 A | 11/1985 | Weis |
| 4,569,394 A | 2/1986 | Sweatman et al. |
| 4,570,967 A | 2/1986 | Allnut |
| 4,571,143 A | 2/1986 | Hellerich |
| 4,588,605 A | 5/1986 | Frei et al. |
| 4,608,931 A | 9/1986 | Ruhmann et al. |
| 4,619,531 A | 10/1986 | Dunstan |
| 4,624,729 A | 11/1986 | Bresciani et al. |
| 4,626,155 A | 12/1986 | Hlinsky et al. |
| 4,626,166 A | 12/1986 | Jolly |
| 4,628,825 A | 12/1986 | Taylor et al. |
| 4,639,015 A | 1/1987 | Pitts |
| 4,648,584 A | 3/1987 | Wamser |
| 4,660,733 A | 4/1987 | Snyder et al. |
| 4,701,095 A | 10/1987 | Berryman et al. |
| 4,714,010 A | 12/1987 | Smart |
| 4,715,754 A | 12/1987 | Scully |
| 4,724,976 A | 2/1988 | Lee |
| 4,738,774 A | 4/1988 | Patrick |
| 4,741,273 A | 5/1988 | Sherwood |
| 4,761,039 A | 8/1988 | Hilaris |
| 4,779,751 A | 10/1988 | Munroe |
| 4,798,039 A | 1/1989 | Deglise |
| 4,801,389 A | 1/1989 | Brannon et al. |
| 4,819,830 A | 4/1989 | Schultz |
| 4,836,510 A | 6/1989 | Weber et al. |
| 4,836,735 A | 6/1989 | Dennehy |
| 4,848,605 A | 7/1989 | Wise |
| 4,882,784 A | 11/1989 | Tump |
| 4,889,219 A | 12/1989 | Key |
| 4,901,649 A | 2/1990 | Fehrenbach et al. |
| 4,909,378 A | 3/1990 | Webb |
| 4,909,556 A | 3/1990 | Koskinen |
| 4,917,019 A | 4/1990 | Hesch et al. |
| 4,919,583 A | 4/1990 | Speakman, Jr. |
| 4,923,358 A | 5/1990 | Van Mill |
| 4,946,068 A | 8/1990 | Erickson et al. |
| 4,947,760 A | 8/1990 | Dawson et al. |
| 4,949,714 A | 8/1990 | Orr |
| 4,954,975 A | 9/1990 | Kalata |
| 4,956,821 A | 9/1990 | Fenelon |
| 4,964,243 A | 10/1990 | Reiter |
| 4,975,205 A | 12/1990 | Sloan |
| 4,975,305 A | 12/1990 | Biginelli |
| 4,988,115 A | 1/1991 | Steinke |
| 4,995,522 A | 2/1991 | Barr |
| 5,004,400 A | 4/1991 | Handke |
| 5,028,002 A | 7/1991 | Whitford |
| 5,036,979 A | 8/1991 | Selz |
| 5,042,538 A | 8/1991 | Wiese |
| 5,069,352 A | 12/1991 | Harbolt et al. |
| 5,080,259 A | 1/1992 | Hadley |
| 5,082,304 A | 1/1992 | Preller |
| 5,102,281 A | 4/1992 | Handke |
| 5,102,286 A | 4/1992 | Fenton |
| 5,105,858 A | 4/1992 | Levinson |
| 5,131,524 A | 7/1992 | Uehara |
| 5,167,719 A | 12/1992 | Tamaki |
| 5,190,182 A | 3/1993 | Copas et al. |
| 5,195,861 A | 3/1993 | Handke |
| 5,199,826 A | 4/1993 | Lawrence |
| 5,201,546 A | 4/1993 | Lindsay |
| 5,224,635 A | 7/1993 | Wise |
| 5,253,746 A | 10/1993 | Friesen et al. |
| 5,253,776 A | 10/1993 | Decroix et al. |
| 5,265,763 A | 11/1993 | Heinrici et al. |
| 5,277,014 A | 1/1994 | White |
| 5,280,883 A | 1/1994 | Ibar |
| 5,286,158 A | 2/1994 | Zimmerman |
| 5,286,294 A | 2/1994 | Ebi et al. |
| 5,290,139 A | 3/1994 | Hedrick |
| 5,317,783 A | 6/1994 | Williamson |
| 5,320,046 A | 6/1994 | Hesch |
| 5,324,097 A | 6/1994 | DeCap |
| 5,339,996 A | 8/1994 | Dubbert |
| 5,345,982 A | 9/1994 | Nadeau et al. |
| 5,358,137 A | 10/1994 | Shuert et al. |
| 5,373,792 A | 12/1994 | Pileggi et al. |
| 5,392,946 A | 2/1995 | Holbrook et al. |
| 5,402,915 A | 4/1995 | Hogan |
| 5,413,154 A | 5/1995 | Hurst, Jr. et al. |
| 5,429,259 A | 7/1995 | Robin |
| 5,441,321 A | 8/1995 | Karpisek |
| 5,465,829 A | 11/1995 | Kruse |
| 5,470,175 A | 11/1995 | Jensen et al. |
| 5,470,176 A | 11/1995 | Corcoran et al. |
| 5,493,852 A | 2/1996 | Stewart |
| 5,498,119 A | 3/1996 | Faivre |
| 5,507,514 A | 4/1996 | Jacques |
| 5,538,286 A | 7/1996 | Hoff |
| 5,549,278 A | 8/1996 | Sidler |
| 5,564,599 A | 10/1996 | Barber et al. |
| 5,570,743 A | 11/1996 | Padgett et al. |

(56) References Cited

U.S. PATENT DOCUMENTS

| | | |
|---|---|---|
| 5,590,976 A | 1/1997 | Kilheffer et al. |
| 5,601,181 A | 2/1997 | Lindhorst |
| 5,602,761 A | 2/1997 | Spoerre et al. |
| 5,613,446 A | 3/1997 | DiLuigi et al. |
| 5,617,974 A | 4/1997 | Sawyer |
| 5,647,514 A | 7/1997 | Toth et al. |
| RE35,580 E | 8/1997 | Heider et al. |
| 5,667,298 A | 9/1997 | Musil |
| 5,687,881 A | 11/1997 | Rouse et al. |
| 5,690,466 A | 11/1997 | Gaddis et al. |
| 5,697,535 A | 12/1997 | Coleman |
| 5,706,614 A | 1/1998 | Wiley et al. |
| 5,718,555 A | 2/1998 | Swalheim |
| 5,722,552 A | 3/1998 | Olson |
| 5,722,688 A | 3/1998 | Garcia |
| 5,746,258 A | 5/1998 | Huck |
| 5,761,854 A | 6/1998 | Johnson et al. |
| 5,762,222 A | 6/1998 | Liu |
| 5,772,390 A | 6/1998 | Walker |
| 5,782,524 A | 7/1998 | Heider et al. |
| 5,785,421 A | 7/1998 | Milek |
| 5,803,296 A | 9/1998 | Olson |
| 5,806,863 A | 9/1998 | Heger et al. |
| 5,836,480 A | 11/1998 | Epp et al. |
| 5,845,799 A | 12/1998 | Deaton |
| 5,876,172 A | 3/1999 | Di Rosa |
| 5,878,903 A | 3/1999 | Ung |
| 5,906,471 A | 5/1999 | Schwoerer |
| 5,911,337 A | 6/1999 | Bedeker |
| 5,924,829 A | 7/1999 | Hastings |
| 5,927,558 A | 7/1999 | Bruce |
| 5,960,974 A | 10/1999 | Kee |
| 5,971,219 A | 10/1999 | Karpisek |
| 5,993,202 A | 11/1999 | Yamazaki et al. |
| 5,997,099 A | 12/1999 | Collins |
| 6,002,063 A | 12/1999 | Bilak et al. |
| 6,006,918 A | 12/1999 | Hart |
| 6,069,118 A | 5/2000 | Hinkel et al. |
| 6,077,068 A | 6/2000 | Okumura |
| 6,092,974 A | 7/2000 | Roth |
| 6,109,486 A | 8/2000 | Lee |
| 6,120,233 A | 9/2000 | Adam |
| D431,358 S | 10/2000 | Willemsen |
| 6,155,175 A | 12/2000 | Rude et al. |
| 6,186,654 B1 | 2/2001 | Gunteret et al. |
| 6,190,107 B1 | 2/2001 | Lanigan et al. |
| 6,192,985 B1 | 2/2001 | Hinkel et al. |
| 6,196,590 B1 | 3/2001 | Kim |
| 6,205,938 B1 | 3/2001 | Foley et al. |
| 6,210,088 B1 | 4/2001 | Crosby |
| 6,231,284 B1 | 5/2001 | Kordel |
| 6,247,594 B1 | 6/2001 | Garton |
| 6,263,803 B1 | 7/2001 | Dohr et al. |
| 6,269,849 B1 | 8/2001 | Fields |
| 6,273,154 B1 | 8/2001 | Laug |
| 6,283,212 B1 | 9/2001 | Hinkel et al. |
| 6,286,986 B2 | 9/2001 | Grimland |
| 6,296,109 B1 | 10/2001 | Nohl |
| 6,306,800 B1 | 10/2001 | Samuel et al. |
| 6,328,156 B1 | 12/2001 | Ostman |
| 6,328,183 B1 | 12/2001 | Coleman |
| 6,364,584 B1 | 4/2002 | Taylor |
| 6,374,915 B1 | 4/2002 | Andrews |
| 6,382,446 B1 | 5/2002 | Hinkle et al. |
| 6,390,742 B1 | 5/2002 | Breeden |
| 6,401,983 B1 | 6/2002 | McDonald et al. |
| 6,412,422 B2 | 7/2002 | Dohr et al. |
| 6,415,909 B1 | 7/2002 | Mitchell et al. |
| 6,416,271 B1 | 7/2002 | Pigott et al. |
| 6,422,413 B1 | 7/2002 | Hall et al. |
| 6,425,725 B1 | 7/2002 | Ehlers |
| 6,450,522 B1 | 9/2002 | Yamada et al. |
| 6,457,291 B2 | 10/2002 | Wick |
| 6,498,976 B1 | 12/2002 | Ehlbeck et al. |
| 6,505,760 B1 | 1/2003 | Werner |
| 6,508,387 B1 | 1/2003 | Simon et al. |
| 6,508,615 B2 | 1/2003 | Taylor |
| 6,523,482 B2 | 2/2003 | Wingate |
| 6,537,002 B2 | 3/2003 | Gloystein |
| 6,557,896 B1 | 5/2003 | Stobart |
| 6,575,614 B2 | 6/2003 | Tosco et al. |
| 6,660,693 B2 | 12/2003 | Miller et al. |
| 6,663,373 B2 | 12/2003 | Yoshida |
| 6,666,573 B2 | 12/2003 | Grassi |
| 6,675,066 B2 | 1/2004 | Moshgbar |
| 6,675,073 B2 | 1/2004 | Kieman et al. |
| 6,705,449 B2 | 3/2004 | Wagstaffe |
| 6,720,290 B2 | 4/2004 | England et al. |
| 6,772,912 B1 | 8/2004 | Schall et al. |
| 6,774,318 B2 | 8/2004 | Beal et al. |
| 6,776,235 B1 | 8/2004 | England |
| 6,783,032 B2 | 8/2004 | Fons |
| 6,811,048 B2 | 11/2004 | Lau |
| 6,828,280 B2 | 12/2004 | England et al. |
| 6,835,041 B1 | 12/2004 | Albert |
| 6,882,960 B2 | 4/2005 | Miller |
| 6,902,061 B1 | 6/2005 | Elstone |
| 6,915,854 B2 | 7/2005 | England et al. |
| 6,953,119 B1 | 10/2005 | Wening |
| 6,955,127 B2 | 10/2005 | Taylor |
| 6,964,551 B1 | 11/2005 | Friesen |
| 6,968,946 B2 | 11/2005 | Shuert |
| 6,974,021 B1 | 12/2005 | Boevers |
| 7,008,163 B2 | 3/2006 | Russell |
| 7,051,661 B2 | 5/2006 | Herzog et al. |
| 7,084,095 B2 | 8/2006 | Lee et al. |
| 7,104,425 B2 | 9/2006 | Le Roy |
| 7,140,516 B2 | 11/2006 | Bothor |
| 7,146,914 B2 | 12/2006 | Morton et al. |
| 7,201,290 B2 | 4/2007 | Mehus et al. |
| 7,214,028 B2 | 5/2007 | Boasso |
| 7,240,681 B2 | 7/2007 | Saik |
| 7,252,309 B2 | 8/2007 | Eng Soon et al. |
| 7,284,579 B2 | 10/2007 | Elgan et al. |
| 7,284,670 B2 | 10/2007 | Schmid |
| 7,316,333 B2 | 1/2008 | Wegner |
| 7,367,271 B2 | 5/2008 | Early |
| 7,377,219 B2 | 5/2008 | Brandt |
| 7,410,623 B2 | 8/2008 | Mehus et al. |
| 7,475,796 B2 | 1/2009 | Garton |
| 7,500,817 B2 | 3/2009 | Furrer et al. |
| 7,513,280 B2 | 4/2009 | Brashears et al. |
| 7,591,386 B2 | 9/2009 | Hooper |
| 7,640,075 B2 | 12/2009 | Wietgrefe |
| 7,695,538 B2 | 4/2010 | Cheng |
| 7,753,637 B2 | 7/2010 | Benedict et al. |
| 7,798,558 B2 | 9/2010 | Messier |
| 7,802,958 B2 | 9/2010 | Garcia et al. |
| 7,803,321 B2 | 9/2010 | Lark et al. |
| 7,837,427 B2 | 11/2010 | Beckel |
| 7,841,394 B2 | 11/2010 | McNeel et al. |
| 7,845,516 B2 | 12/2010 | Pessin et al. |
| 7,858,888 B2 | 12/2010 | Lucas et al. |
| 7,867,613 B2 | 1/2011 | Smith |
| 7,891,304 B2 | 2/2011 | Herzog et al. |
| 7,891,523 B2 | 2/2011 | Mehus et al. |
| 7,896,198 B2 | 3/2011 | Mehus et al. |
| 7,921,783 B2 | 4/2011 | Forbes et al. |
| 7,967,161 B2 | 6/2011 | Townsend |
| 7,980,803 B2 | 7/2011 | Brandstätter et al. |
| 7,997,213 B1 | 8/2011 | Gauthier et al. |
| 7,997,623 B2 | 8/2011 | Williams |
| 8,083,083 B1 | 12/2011 | Mohns |
| 8,201,520 B2 | 6/2012 | Meritt |
| 8,313,278 B2 | 11/2012 | Simmons et al. |
| 8,366,349 B2 | 2/2013 | Beachner |
| 8,375,690 B2 | 2/2013 | LaFargue et al. |
| 8,379,927 B2 | 2/2013 | Taylor |
| 8,387,824 B2 | 3/2013 | Wietgrefe |
| 8,393,502 B2 | 3/2013 | Renyer et al. |
| 8,424,666 B2 | 4/2013 | Berning et al. |
| 8,469,065 B2 | 6/2013 | Schroeder et al. |
| D688,349 S | 8/2013 | Oren et al. |
| D688,351 S | 8/2013 | Oren |

(56) References Cited

U.S. PATENT DOCUMENTS

| | | |
|---|---|---|
| D688,772 S | 8/2013 | Oren et al. |
| 8,505,780 B2 | 8/2013 | Oren |
| 8,544,419 B1 | 10/2013 | Spalding et al. |
| 8,545,148 B2 | 10/2013 | Wanek-Pusset et al. |
| 8,562,022 B2 | 10/2013 | Nadeau et al. |
| 8,573,387 B2 | 11/2013 | Trimble |
| 8,573,917 B2 | 11/2013 | Renyer |
| 8,585,341 B1 | 11/2013 | Oren |
| D694,670 S | 12/2013 | Oren |
| 8,616,370 B2 | 12/2013 | Allegretti |
| 8,622,251 B2 | 1/2014 | Oren |
| 8,636,832 B2 | 1/2014 | Stutzman et al. |
| 8,646,641 B2 | 2/2014 | Moir |
| 8,662,525 B1 | 3/2014 | Dierks et al. |
| 8,668,430 B2 | 3/2014 | Oren |
| D703,582 S | 4/2014 | Oren |
| 8,820,559 B2 | 9/2014 | Beitler et al. |
| 8,827,118 B2 | 9/2014 | Oren |
| 8,881,749 B1 | 11/2014 | Smith |
| 8,887,914 B2 | 11/2014 | Allegretti |
| 8,905,266 B2 | 12/2014 | De Brabanter |
| 8,915,691 B2 | 12/2014 | Mintz |
| 9,051,801 B1 | 6/2015 | Mintz |
| 9,052,034 B1 | 6/2015 | Wegner et al. |
| D740,556 S | 10/2015 | Huber |
| 9,162,261 B1 | 10/2015 | Smith |
| 9,267,266 B2 | 2/2016 | Cutler et al. |
| 9,296,572 B2 | 3/2016 | Houghton et al. |
| 9,309,064 B2 | 4/2016 | Sheesley |
| 9,410,414 B2 | 8/2016 | Tudor |
| D780,883 S | 3/2017 | Schaffner et al. |
| D783,771 S | 4/2017 | Stegemoeller et al. |
| D783,772 S | 4/2017 | Stegemoeller, III et al. |
| 9,624,036 B2 | 4/2017 | Luharuka et al. |
| 9,688,492 B2 | 6/2017 | Stutzman et al. |
| 9,796,318 B1 | 10/2017 | Nolasco |
| 2001/0022308 A1 | 9/2001 | Epp et al. |
| 2001/0038777 A1 | 11/2001 | Cassell |
| 2001/0045338 A1 | 11/2001 | Ransil et al. |
| 2002/0011175 A1* | 1/2002 | Dohr ............ B61D 7/20 105/247 |
| 2002/0134550 A1 | 9/2002 | Leeson et al. |
| 2002/0139643 A1 | 10/2002 | Peltier et al. |
| 2003/0006248 A1 | 1/2003 | Gill et al. |
| 2003/0024971 A1 | 2/2003 | Jones |
| 2003/0111470 A1 | 6/2003 | Fouillet et al. |
| 2003/0145418 A1 | 8/2003 | Ikeda et al. |
| 2003/0156929 A1 | 8/2003 | Russell |
| 2004/0065699 A1 | 4/2004 | Schoer et al. |
| 2004/0074922 A1 | 4/2004 | Bother et al. |
| 2004/0084874 A1 | 5/2004 | McDougall et al. |
| 2004/0206646 A1 | 10/2004 | Goh |
| 2004/0245284 A1 | 12/2004 | Mehus et al. |
| 2005/0158158 A1 | 7/2005 | Porta |
| 2005/0201851 A1 | 9/2005 | Jonkka |
| 2006/0012183 A1 | 1/2006 | Marchiori et al. |
| 2006/0027582 A1 | 2/2006 | Beach |
| 2006/0053582 A1 | 3/2006 | Engel et al. |
| 2006/0091072 A1 | 5/2006 | Schmid et al. |
| 2006/0151058 A1 | 7/2006 | Salaoras et al. |
| 2006/0180062 A1 | 8/2006 | Furrer et al. |
| 2006/0180232 A1 | 8/2006 | Glewwe et al. |
| 2006/0239806 A1 | 10/2006 | Yelton |
| 2006/0267377 A1 | 11/2006 | Lusk et al. |
| 2006/0277783 A1 | 12/2006 | Garton |
| 2006/0289166 A1 | 12/2006 | Stromquist et al. |
| 2007/0096537 A1 | 5/2007 | Hicks |
| 2007/0125543 A1 | 6/2007 | McNeel et al. |
| 2007/0194564 A1 | 8/2007 | Garceau et al. |
| 2008/0008562 A1 | 1/2008 | Beckel et al. |
| 2008/0029546 A1 | 2/2008 | Schuld |
| 2008/0029553 A1 | 2/2008 | Culleton |
| 2008/0058228 A1 | 3/2008 | Wilson |
| 2008/0179054 A1 | 7/2008 | McGough et al. |
| 2008/0179324 A1 | 7/2008 | McGough et al. |
| 2008/0213073 A1 | 9/2008 | Benedict et al. |
| 2008/0226434 A1 | 9/2008 | Smith et al. |
| 2008/0264641 A1 | 10/2008 | Slabaugh et al. |
| 2008/0277423 A1 | 11/2008 | Garton |
| 2008/0315558 A1 | 12/2008 | Cesterino |
| 2009/0003985 A1* | 1/2009 | Lanigan, Sr. ......... B66C 19/007 414/814 |
| 2009/0038242 A1 | 2/2009 | Cope |
| 2009/0078410 A1 | 3/2009 | Krenek et al. |
| 2009/0223143 A1 | 9/2009 | Esposito |
| 2009/0278326 A1 | 11/2009 | Rowland et al. |
| 2010/0021258 A1 | 1/2010 | Kim |
| 2010/0037572 A1 | 2/2010 | Cheng |
| 2010/0038143 A1 | 2/2010 | Burnett et al. |
| 2010/0040446 A1 | 2/2010 | Renyer |
| 2010/0065466 A1 | 3/2010 | Perkins |
| 2010/0072308 A1 | 3/2010 | Hermann et al. |
| 2010/0080681 A1 | 4/2010 | Bain |
| 2010/0108711 A1 | 5/2010 | Wietgrefe |
| 2010/0129193 A1 | 5/2010 | Sherrer |
| 2010/0199668 A1 | 8/2010 | Coustou et al. |
| 2010/0207371 A1 | 8/2010 | Van Houdt et al. |
| 2010/0278621 A1 | 11/2010 | Redekop |
| 2010/0288603 A1 | 11/2010 | Schafer |
| 2010/0320727 A1 | 12/2010 | Haut et al. |
| 2011/0011893 A1 | 1/2011 | Cerny |
| 2011/0017693 A1 | 1/2011 | Thomas |
| 2011/0101040 A1 | 5/2011 | Weissbrod |
| 2011/0109073 A1 | 5/2011 | Williams |
| 2011/0121003 A1 | 5/2011 | Moir |
| 2011/0127178 A1 | 6/2011 | Claussen |
| 2011/0160104 A1 | 6/2011 | Wu et al. |
| 2011/0162838 A1 | 7/2011 | Mackenzie et al. |
| 2011/0168593 A1 | 7/2011 | Neufeld et al. |
| 2011/0222983 A1 | 9/2011 | Dugic et al. |
| 2011/0297702 A1 | 12/2011 | Hildebrandt et al. |
| 2012/0017812 A1 | 1/2012 | Renyer |
| 2012/0090956 A1 | 4/2012 | Brobst |
| 2012/0103848 A1 | 5/2012 | Allegretti et al. |
| 2012/0219391 A1 | 8/2012 | Teichrob et al. |
| 2012/0247335 A1 | 10/2012 | Stutzman et al. |
| 2012/0255539 A1 | 10/2012 | Kolecki |
| 2013/0004272 A1 | 1/2013 | Mintz |
| 2013/0022441 A1 | 1/2013 | Uhryn et al. |
| 2013/0164112 A1* | 6/2013 | Oren ............ B65G 65/23 414/802 |
| 2013/0206415 A1 | 8/2013 | Sheesley |
| 2013/0209204 A1 | 8/2013 | Sheesley |
| 2013/0233545 A1 | 9/2013 | Mahoney |
| 2013/0284729 A1 | 10/2013 | Cook et al. |
| 2013/0309052 A1 | 11/2013 | Luharuka |
| 2013/0323005 A1 | 12/2013 | Rexius et al. |
| 2014/0020765 A1 | 1/2014 | Oren |
| 2014/0020892 A1 | 1/2014 | Oren |
| 2014/0023465 A1 | 1/2014 | Oren et al. |
| 2014/0034662 A1 | 2/2014 | Chalmers et al. |
| 2014/0044507 A1 | 2/2014 | Naizer et al. |
| 2014/0077484 A1 | 3/2014 | Harrell |
| 2014/0083554 A1 | 3/2014 | Harris |
| 2014/0093319 A1 | 4/2014 | Harris et al. |
| 2014/0097182 A1 | 4/2014 | Sheesley |
| 2014/0166647 A1 | 6/2014 | Sheesley |
| 2014/0202590 A1 | 7/2014 | Higgins |
| 2014/0203046 A1 | 7/2014 | Allegretti |
| 2014/0234059 A1 | 8/2014 | Thomeer |
| 2014/0305769 A1 | 10/2014 | Eiden et al. |
| 2014/0321950 A1 | 10/2014 | Krenek et al. |
| 2014/0377042 A1 | 12/2014 | McMahon |
| 2015/0004895 A1 | 1/2015 | Hammers et al. |
| 2015/0069052 A1 | 3/2015 | Allegretti et al. |
| 2015/0079890 A1 | 3/2015 | Stutzman et al. |
| 2015/0086307 A1 | 3/2015 | Stefan |
| 2015/0086308 A1 | 3/2015 | McIver et al. |
| 2015/0107822 A1 | 4/2015 | Tudor |
| 2015/0110565 A1 | 4/2015 | Harris |
| 2015/0115589 A1 | 4/2015 | Thiessen |
| 2015/0159232 A1 | 6/2015 | Zucchi et al. |
| 2015/0209829 A1 | 7/2015 | De Siqueira et al. |
| 2015/0284183 A1 | 10/2015 | Houghton et al. |

(56) References Cited

U.S. PATENT DOCUMENTS

| | | | |
|---|---|---|---|
| 2016/0148813 A1 | 5/2016 | Rogers et al. | |
| 2016/0177678 A1 | 6/2016 | Morris et al. | |
| 2016/0185522 A1 | 6/2016 | Herman et al. | |
| 2016/0273355 A1 | 9/2016 | Gosney et al. | |
| 2016/0280480 A1 | 9/2016 | Smith et al. | |
| 2017/0129721 A1 | 5/2017 | Harris et al. | |
| 2017/0217353 A1 | 8/2017 | Vander Pol | |
| 2017/0274813 A1* | 9/2017 | Eiden | B65G 65/42 |
| 2018/0002119 A1* | 1/2018 | Heide | B65G 63/045 |
| 2018/0009401 A1 | 1/2018 | Miller et al. | |

FOREIGN PATENT DOCUMENTS

| | | |
|---|---|---|
| CN | 2075632 | 4/1991 |
| CN | 1329562 | 1/2002 |
| CN | 2517684 | 10/2002 |
| CN | 1635965 | 7/2005 |
| CN | 2913250 | 6/2007 |
| CN | 201161588 | 12/2008 |
| CN | 101823630 | 9/2010 |
| CN | 102101595 | 6/2011 |
| CN | 102114985 | 7/2011 |
| CN | 203033469 | 7/2013 |
| CN | 203580948 | 5/2014 |
| DE | 4008147 | 9/1990 |
| DE | 20317967 | 3/2004 |
| EP | 0016977 | 10/1980 |
| EP | 322283 | 6/1989 |
| EP | 0997607 | 5/2000 |
| EP | 1598288 | 11/2005 |
| EP | 1795467 | 6/2007 |
| GB | 1000621 | 8/1965 |
| GB | 1333976 | 10/1973 |
| GB | 2066220 | 7/1981 |
| GB | 2204847 | 11/1988 |
| JP | S4871029 | 9/1973 |
| JP | S4876041 | 9/1973 |
| JP | S58161888 | 10/1983 |
| JP | 11034729 | 2/1999 |
| JP | 2007084151 | 4/2007 |
| NL | 8105283 | 6/1983 |
| NO | 2007057398 | 5/2007 |
| WO | 2003024815 | 3/2003 |
| WO | 2008012513 | 1/2008 |
| WO | 2009087338 | 7/2009 |

OTHER PUBLICATIONS

OSHA-NIOSH, Hazard Alert: Worker Exposure to Silica during Hydraulic Fracturing, Jun. 2012.
Tremoglie, Michael P., Legal NewsLine, OSHA, NIOSH issue tracking health alert (/stories/510527440-oshaniosh-issue-fracking-health-alert), Jun. 25, 2012.
Beckwith, Robin, Proppants: Where in the World, Journal of Petroleum Technology, Apr. 2011.
Final Office Action dated Feb. 27, 2018 for co-pending U.S. Appl. No. 15/143,942.
Yergin, Daniel, The Quest: Energy, Security, and the Remaking of the Modern World, 2011.
Gold, Russell, The Boom: How Fracking Ignited the American Energy Revolution and Changed the World, 2014.
Yergin, Daniel, Stepping on the Gas, Wall Street Journal, Apr. 2, 2011.
Raimi, Daniel et al., Dunn County and Watford City, North Dakota: A case study of the fiscal effects of Bakken shale development, Duke University Energy Initiative, May 2016.
Local Economic Impacts Related to Marcellus Shale Development, The Center for Rural Pennyslvania, Sep. 2014.
Eagle Ford Shale Task Force Report, Railroad Commission of Texas, Convened and Chaired by David Porter, Mar. 2013.
*Sandbox Logistics LLC et al* v. *Grit Energy Solutions LLC*, 3:16-cv-00012, 73.Parties' P.R. 4-3 Joint Claim Construction and Prehearing Statement by Oren Technologies LLC, SandBox Enterprises LLC, SandBox Logistics LLC, Nov. 17, 2016.
Beard, Tim, Fracture Design in Horizontal Shale Wells—Data Gathering to Implementation, EPA Hydraulic Fracturing Workshop, Mar. 10-11, 2011.
Economic Impact of the Eagle Ford Shale, Center for Community and Business Research at the University of Texas at San Antonio's Institute for Economic Development, Sep. 2014.
Kelsey, Timothy W. et al., Economic Impacts of Marcellus Shale in Pennsylvania: Employment and Income in 2009, The Marcellus Shale Education & Training Center, Aug. 2011.
2006 Montana Commercial Vehicle Size and Weight and Safety Trucker's Handbook, Montana Department of Transportation Motor Carrier Services Division, Fifth Edition, Jun. 2010.
Budzynski, Brian W., Never Meant to Take the Weight, Roads & Bridges, Apr. 2015.
Interstate Weight Limits, 23 C.F.R. § 658, Apr. 1, 2011.
VIN Requirements, 49 C.F.R. § 565, Oct. 1, 2011.
Benson, Mary Ellen et al., Frac Sand in the United States—A Geological and Industry Overview, U.S. Department of the Interior, U.S. Geological Survey, 2015-2017.
Beekman, Thomas J. et al., Transportation Impacts of the Wisconsin Fracture Sand Industry, Wisconsin Department of Transportation, Mar. 2013.
U.S. Silica Company, Material Safety Data Sheet, Jan. 2011.
Texas Transportation Code, Chapter 621, General Provisions Relating to Vehicle Size and Weight (Sec. 621.101 effective Sep. 1, 2005 and Section 621.403 effective Sep. 1, 1995).
Garner, Dwight, Visions of an Age When Oil Isn't King, New York Times, Sep. 20, 2011.
Non-Final Office Action dated Sep. 8, 2017 for co-pending U.S. Appl. No. 15/475,354.
Non-Final Office Action dated Sep. 8, 2017 for co-pending U.S. Appl. No. 15/143,942.
International Search Report and Written Opinion for PCT/US17/34603 dated Aug. 22, 2017.
Non-Final Office Action dated Aug. 30, 2017 for co-pending U.S. Appl. No. 14/943,182.
Non-Final Office Action dated Aug. 4, 2017 for co-pending U.S. Appl. No. 13/625,675.
Randy Lafollette, Key Considerations for Hydraulic Fracturing of Gas Shales, May 12, 2010.
Case No. 4:17-cv-00589, Plaintiffs' P.R. 3-1 and 3-2 Infringement Contentions and Disclosures, Jun. 8, 2017.
Final Office Action dated Oct. 13, 2017 for co-pending U.S. Appl. No. 15/398,950.
Non-Final Office Action dated Sep. 21, 2017 for co-pending U.S. Appl. No. 15/413,822.
Non-Final Office Action dated Oct. 5, 2017 for co-pending U.S. Appl. No. 14/848,447.
Final Office Action dated Sep. 21, 2017 for co-pending U.S. Appl. No. 14/922,836.
Non-Final Office Action dated Sep. 27, 2017 for co-pending U.S. Appl. No. 14/996,362.
Non-Final Office Action dated Sep. 28, 2017 for co-pending U.S. Appl. No. 13/628,702.
Arrows Up, Inc., Jumbo BTS—Bulk Transport System, Aug. 1, 2014.
Arrows Up, Inc., Reusable Packaging Association, Member Spotlight John Allegretti, President & CEO, Arrows Up, Inc., Jun. 23, 2016.
Seed Today, Arrows Up, Inc. Bulk Transport System (BTS), Country Journal Publishing Co., Decatur, IL, Mar. 2, 2011.
SeedQuest, Arrows Up, Inc. launches innovative bulk transport system for see, Barrington, IL, Mar. 2, 2011.
Monster Tanks, Inc., Sand Monster Website, http://monstertanksinc.com/sandmonster.html, 2012.
Solaris Oilfield Infrastructure, Mobile Sand Silo System, 2016.
Final Office Action dated Sep. 27, 2016 for co-pending U.S. Appl. No. 13/555,635.
Non-Final Office Action dated Mar. 23, 2016 for co-pending U.S. Appl. No. 13/555,635.

(56) References Cited

OTHER PUBLICATIONS

Final Office Action dated Jul. 30, 2015 for co-pending U.S. Appl. No. 13/555,635.
Non-Final Office Action dated Oct. 22, 2014 for co-pending U.S. Appl. No. 13/555,635.
Final Office Action dated Jun. 21, 2016 for co-pending U.S. Appl. No. 13/628,702.
Non-Final Office Action dated Feb. 23, 2016 for co-pending U.S. Appl. No. 13/628,702.
Final Office Action dated Sep. 22, 2015 for co-pending U.S. Appl. No. 13/628,702.
Non-Final Office Action dated Jul. 28, 2015 for co-pending U.S. Appl. No. 13/628,702.
Final Office Action dated Mar. 24, 2015 for co-pending U.S. Appl. No. 13/628,702.
Non-Final Office Action dated Sep. 18, 2014 for co-pending U.S. Appl. No. 13/628,702.
Final Office Action dated Jun. 27, 2016 for co-pending U.S. Appl. No. 14/831,924.
Non-Final Office Action dated Feb. 16, 2016 for co-pending U.S. Appl. No. 14/831,924.
Final Office Action dated Jun. 27, 2016 for co-pending U.S. Appl. No. 14/923,920.
Non-Final Office Action dated Feb. 9, 2016 for co-pending U.S. Appl. No. 14/923,920.
Final Office Action dated Sep. 15, 2016 for co-pending U.S. Appl. No. 14/943,111.
Non-Final Office Action dated Apr. 5, 2016 for co-pending U.S. Appl. No. 14/943,111.
Final Office Action dated Jul. 18, 2016 for co-pending U.S. Appl. No. 14/948,494.
Non-Final Office Action dated Apr. 8, 2016 for co-pending U.S. Appl. No. 14/948,494.
Non-Final Office Action dated Sep. 6, 2016 for co-pending U.S. Appl. No. 15/144,296.
Non-Final Office Action dated Jul. 25, 2016 for co-pending U.S. Appl. No. 13/660,855.
Final Office Action dated Apr. 28, 2016 for co-pending U.S. Appl. No. 13/660,855.
Non-Final Office Action dated Oct. 6, 2015 for co-pending U.S. Appl. No. 13/660,855.
Final Office Action dated Aug. 6, 2015 for co-pending U.S. Appl. No. 13/660,855.
Non-Final Office Action dated Apr. 29, 2015 for co-pending U.S. Appl. No. 13/660,855.
Final Office Action dated Dec. 17, 2014 for co-pending U.S. Appl. No. 13/660,855.
Non-Final Office Action dated Sep. 4, 2014 for co-pending U.S. Appl. No. 13/660,855.
Final Office Action dated Sep. 24, 2013 for co-pending U.S. Appl. No. 13/660,855.
Non-Final Office Action dated May 14, 2013 for co-pending U.S. Appl. No. 13/660,855.
Non-Final Office Action dated Jul. 5, 2016 for co-pending U.S. Appl. No. 14/996,362.
Non-Final Office Action dated Jul. 6, 2016 for co-pending U.S. Appl. No. 15/144,450.
Final Office Action dated Sep. 29, 2016 for co-pending U.S. Appl. No. 13/768,962.
Non-Final Office Action dated Apr. 5, 2016 for co-pending U.S. Appl. No. 13/768,962.
Final Office Action dated Oct. 9, 2015 for co-pending U.S. Appl. No. 13/768,962.
Non-Final Office Action dated May 1, 2015 for co-pending U.S. Appl. No. 13/768,962.
Non-Final Office Action dated Jul. 18, 2016 for co-pending U.S. Appl. No. 15/152,744.
Non-Final Office Action dated Apr. 13, 2016 for co-pending U.S. Appl. No. 14/738,485.
Non-Final Office Action dated Sep. 7, 2016 for co-pending U.S. Appl. No. 14/841,942.
Final Office Action dated May 12, 2016 for co-pending U.S. Appl. No. 14/841,942.
Non-Final Office Action dated Nov. 30, 2015 for co-pending U.S. Appl. No. 14/841,942.
Non-Final Office Action dated Jul. 21, 2016 for co-pending U.S. Appl. No. 15/083,596.
Non-Final Office Action dated Aug. 19, 2016 for co-pending U.S. Appl. No. 15/084,611.
Non-Final Office Action dated Sep. 6, 2016 for co-pending U.S. Appl. No. 15/143,942.
Final Office Action dated Sep. 1, 2016 for co-pending U.S. Appl. No. 14/848,447.
Non-Final Office Action dated Apr. 8, 2016 for co-pending U.S. Appl. No. 14/848,447.
Final Office Action dated Jan. 22, 2018 for co-pending U.S. Appl. No. 13/628,702.
Final Office Action dated Jan. 25, 2018 for co-pending U.S. Appl. No. 15/602,666.
Final Office Action dated Feb. 6, 2018 for co-pending U.S. Appl. No. 15/475,354.
Non-Final Office Action dated Feb. 9, 2018 for co-pending U.S. Appl. No. 15/587,926.
Non-Final Office Action dated Feb. 15, 2018 for co-pending U.S. Appl. No. 14/922,836.
Final Office Action dated Dec. 27, 2017 for co-pending U.S. Appl. No. 14/943,182.
International Search Report for related International Application No. PCT/US2012/066639, dated Feb. 25, 2013.
International Search Report for related International Application No. PCT/US2013/035442, dated Jun. 23, 2013.
International Search Report for related International Application No. PCT/US2013/032819, dated May 23, 2013.
International Search Report for related International Application No. PCT/US2013/049028, dated Mar. 4, 2014.
International Preliminary Report on Patentability for PCT/US2012/066639, dated Feb. 26, 2013.
International Preliminary Report on Patentability for PCT/US2013/032819, dated Sep. 23, 2014.
International Search Report for PCT/US2015/012990, dated May 6, 2015. (15 pages).
FS-35 Desert Frac-Sanders. NOV (National Oilwell Varco). Mar. 19, 2012. (https://web.archive.org/web/20120319070423/http://www.nov.com/Well_Service_and_Completion/Frac_Sand_Handling_Equipment/Frac_Sanders/FS-35.aspx).
File History for U.S. Appl. No. 61/538,616, Robert A. Harris, filed Sep. 23, 2011. (21 pages).
International Search Report for PCT/US2015/024810, dated Jul. 8, 2015. (13 pages).
European Search Report for Application No. 15167039.5, dated Sep. 8, 2015. (7 pages).
SandBox Logistics, "Mine to Wellhead Logistics," Houston, TX, May, 2011.
SandBox Logistics, LLC, screenshots from video made in Apr. 2013 and publicly shown in May 2013, Arnegard, North Dakota.
International Search Report for PCT/US15/35635, dated Oct. 30, 2015. (12 pages).
PCT International Search Report for PCT/US15/49074, dated Dec. 17, 2015. (11 pages).
PCT International Search Report for PCT/US15/57601, dated May 6, 2016. (11 pages).
SandBox Logistics, LLC, screenshots from video dated Sep. 19, 2013.
SandBox Logistics, LLC, screenshots from video dated Aug. 22, 2014.
SandBox Logistics, LLC, screenshots from video dated Oct. 11, 2011.
SandBox Logistics, LLC, screenshots from video dated Apr. 10, 2011.
Grit Energy Solutions, LLC, Fidelity, Screenshots from video dated May 16, 2014.

(56) References Cited

OTHER PUBLICATIONS

Grit Energy Solutions, LLC, Gate, Screenshots from video dated Dec. 6, 2013, https://www.youtube.com/user/gritstack.
Grit Energy Solutions, LLC, Screen, Screenshots from video dated Dec. 6, 2013, https://www.youtube.com/user/gritstack.
Grit Energy Solutions, LLC, The Grit Stack System—Live Frac, Screenshots from video dated Jun. 15, 2015, https://www.youtube.com/user/gritstack.
Grit Energy Solutions, LLC, The Grit Stack System, Screenshots from video dated Feb. 7, 2014, https://www.youtube.com/user/gritstack.
Frac Sand Primer by Brian D. Olmen, Kelrick, LLC, from Hydraulic Fracturing by Michael Berry Smith and Carl Montgomery (CRC Press, Dec. 16, 2015), p. 384.
Premier Silica LLC, Sands Application in the Energy Market, Irving, TX, Copyright 2016.
Getty, John, Montana Tech; ASTM International, Overview of Proppants and Existing Standards and Practices, Jacksonville, FL, Jan. 29, 2013.
Non-Final Office Action dated May 13, 2016 for co-pending U.S. Appl. No. 14/986,826.
Final Office Action dated Sep. 15, 2016 for co-pending U.S. Appl. No. 14/922,836.
Non-Final Office Action dated Feb. 4, 2016 for co-pending U.S. Appl. No. 14/922,836.
Final Office Action dated Aug. 25, 2016 for co-pending U.S. Appl. No. 14/927,614.
Non-Final Office Action dated Mar. 1, 2016 for co-pending U.S. Appl. No. 14/927,614.
Non-Final Office Action dated Apr. 29, 2016 for co-pending U.S. Appl. No. 14/943,182.
Final Office Action dated Sep. 15, 2016 for co-pending U.S. Appl. No. 14/882,973.
Non-Final Office Action dated Feb. 11, 2016 for co-pending U.S. Appl. No. 14/882,973.
Non-Final Office Action dated Aug. 11, 2016 for co-pending U.S. Appl. No. 13/625,675.
Final Office Action dated Nov. 11, 2015 for co-pending U.S. Appl. No. 13/625,675.
Non-Final Office Action dated Mar. 11, 2015 for co-pending U.S. Appl. No. 13/625,675.
Non-Final Office Action dated Oct. 27, 2016 for co-pending U.S. Appl. No. 15/219,676.
Non-Final Office Action dated Nov. 9, 2016 for co-pending U.S. Appl. No. 14/948,494.
Final Office Action dated Nov. 4, 2016 for co-pending U.S. Appl. No. 14/738,485.
Non-Final Office Action dated Dec. 28, 2016 for co-pending U.S. Appl. No. 13/628,702.
Non-Final Office Action dated Jan. 13, 2017 for co-pending U.S. Appl. No. 14/923,920.
Final Office Action dated Jan. 12, 2017 for co-pending U.S. Appl. No. 14/841,942.
Non-Final Office Action dated Dec. 23, 2016 for co-pending U.S. Appl. No. 14/485,686.
Non-Final Office Action dated Jan. 27, 2017 for co-pending U.S. Appl. No. 14/485,687.
Non-Final Office Action dated Dec. 20, 2016 for co-pending U.S. Appl. No. 14/831,924.
Final Office Action dated Jan. 19, 2017 for co-pending U.S. Appl. No. 13/660,855.
Final Office Action dated Nov. 25, 2016 for co-pending U.S. Appl. No. 15/152,744.
Non-Final Office Action dated Dec. 15, 2016 for co-pending U.S. Appl. No. 14/848,447.
Non-Final Office Action dated Dec. 9, 2016 for co-pending U.S. Appl. No. 14/927,614.
International Search Report for PCT Application No. PCT/US2016/050859 dated Dec. 9, 2016.
Non-Final Office Action dated Feb. 24, 2017 for co-pending U.S. Appl. No. 14/943,182.
Non-Final Office Action dated Feb. 14, 2017 for co-pending U.S. Appl. No. 14/943,111.
Final Office Action dated Mar. 7, 2017 for co-pending U.S. Appl. No. 15/144,296.
Non-Final Office Action dated Apr. 6, 2017 for co-pending U.S. Appl. No. 13/768,962.
Non-Final Office Action dated Mar. 6, 2017 for co-pending U.S. Appl. No. 15/152,744.
Non-Final Office Action dated Apr. 3, 2017 for co-pending U.S. Appl. No. 13/555,635.
International Search Report and Written Opinion for PCT/US2017/012271, dated May 22, 2017.
Non-Final Office Action dated Apr. 24, 2017 for co-pending U.S. Appl. No. 14/738,485.
Final Office Action dated May 4, 2017 for co-pending U.S. Appl. No. 15/143,942.
Final Office Action dated May 30, 2017 for co-pending U.S. Appl. No. 13/625,675.
Final Office Action dated Apr. 19, 2017 for co-pending U.S. Appl. No. 15/219,640.
Non-Final Office Action dated Jun. 1, 2017 for co-pending U.S. Appl. No. 15/219,640.
Final Office Action dated May 2, 2017 for co-pending U.S. Appl. No. 15/219,676.
Non-Final Office Action dated May 10, 2017 for co-pending U.S. Appl. No. 14/882,973.
Final Office Action dated Jun. 1, 2017 for co-pending U.S. Appl. No. 13/628,702.
Final Office Action dated Jul. 3, 2017 for co-pending U.S. Appl. No. 14/923,920.
Non-Final Office Action dated Jun. 28, 2017 for co-pending U.S. Appl. No. 15/589,185.
Final Office Action dated Jun. 7, 2017 for co-pending U.S. Appl. No. 14/848,447.
Final Office Action dated Jun. 28, 2017 for co-pending U.S. Appl. No. 14/485,687.
Final Office Action dated Jun. 6, 2017 for co-pending U.S. Appl. No. 14/927,614.
Final Office Action dated Jun. 21, 2017 for co-pending U.S. Appl. No. 14/943,182.
Non-Final Office Action dated Jul. 26, 2017 for co-pending U.S. Appl. No. 15/463,201.
Final Office Action dated Jul. 27, 2017 for co-pending U.S. Appl. No. 14/738,485.
Non-Final Office Action dated Aug. 3, 2017 for co-pending U.S. Appl. No. 15/219,676.
Beckwith, Robin, Proppants: Where in the World, Proppant Shortage, JPT, Apr. 2011 (6 pages).
Kullman, John, The Complicated World of Proppant Selection . . . , South Dakota School of Mines & Technology, Oct. 2011 (65 pages).
Lafollette, Randy, Key Considerations for Hydraulic Fracturing of Gas Shales, BJ Services Company, Sep. 9, 2010 (53 pages).
WW Trailers Inc., Model GN2040EZ datasheet, Portland, OR, Jan. 2007 (4 pages).
WW Trailers Inc., Model GN204S9A datasheet, Portland, OR, Jan. 2007 (4 pages).
Itsumi Nagahama, English translation of Japan Unexamined Application No. S4871029, Dec. 14, 1971.
Non-Final Office Action dated Apr. 26, 2018 for co-pending U.S. Appl. No. 15/616,783.
Final Office Action dated Apr. 23, 2018 for co-pending U.S. Appl. No. 14/848,447.
Final Office Action dated Mar. 16, 2018 for co-pending U.S. Appl. No. 14/996,362.
Final Office Action dated Mar. 14, 2018 for co-pending U.S. Appl. No. 15/144,450.
ISO 1496-1: International Standard, Series 1 Freight Containers—Specification and Testing—Part 1, General Cargo Containers, Fifth Edition, Aug. 15, 1990.

(56) References Cited

OTHER PUBLICATIONS

ISO 6346: International Standard, Freight Containers—Coding, Identification and Marking, Third Edition, Dec. 1, 1995.
ISO/IEC 15416: International Standard, Information Technology—Automatic Identification and Data Capture Techniques—Bar Code Print Quality Test Specification—Linear Symbols, First Edition, Aug. 15, 2000.
Hoel, Lester A., Giuliano, Genevieve and Meyer, Michael D., Portions of Intermodal Transportation: Moving Freight in a Global Economy, Copyright Eno Transportation Foundation, 2011.
International Organization for Standardization, ISO 668:1995(E).
International Organization for Standardization, ISO 668:1995(E)/Amd.1:2005(E).
International Organization for Standardization, ISO 668:1995(E)/Amd.2:2005(E).
International Organization for Standardization, ISO 1496-1:1990/Amd.1:1993(E).
International Organization for Standardization, ISO 1496-1:1990/Amd.2:1998(E).
International Organization for Standardization, ISO 1496-1:1990/Amd.3:2005(E).
International Organization for Standardization, ISO 1496-1:1990/Amd.4:2006(E).
International Organization for Standardization, ISO 1496-1:1990/Amd.5:2006(E).
Rastikian, K. et al., Modelling of sugar drying in a countercurrent cascading rotary dryer from slationary profiles of temperature and moisture, Journal of Food Engineering 41 (1999).

* cited by examiner

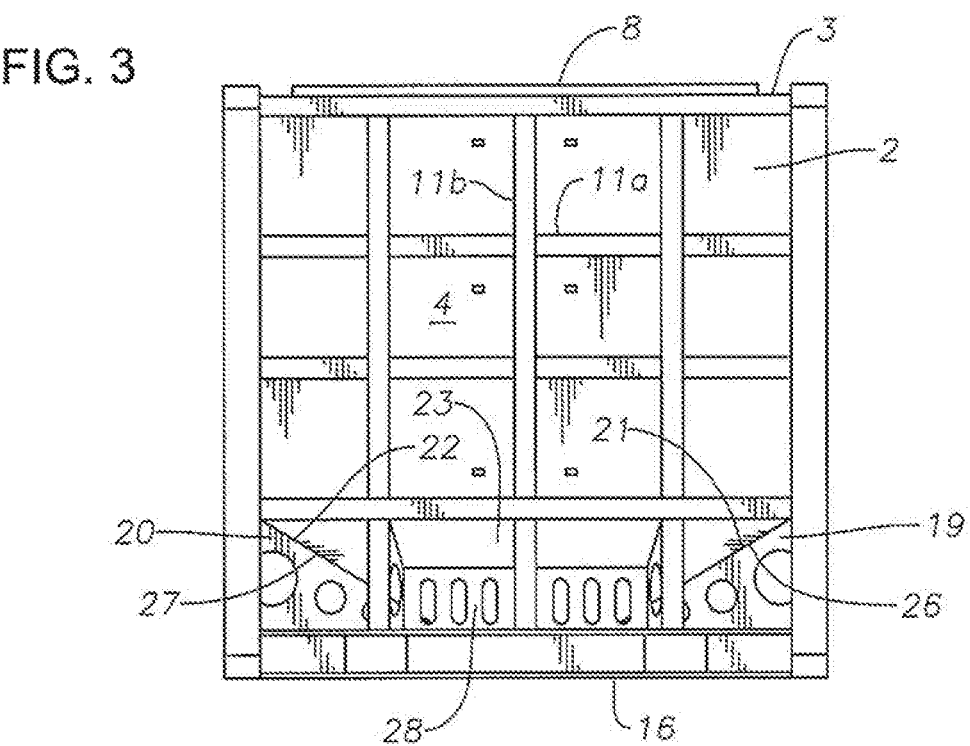
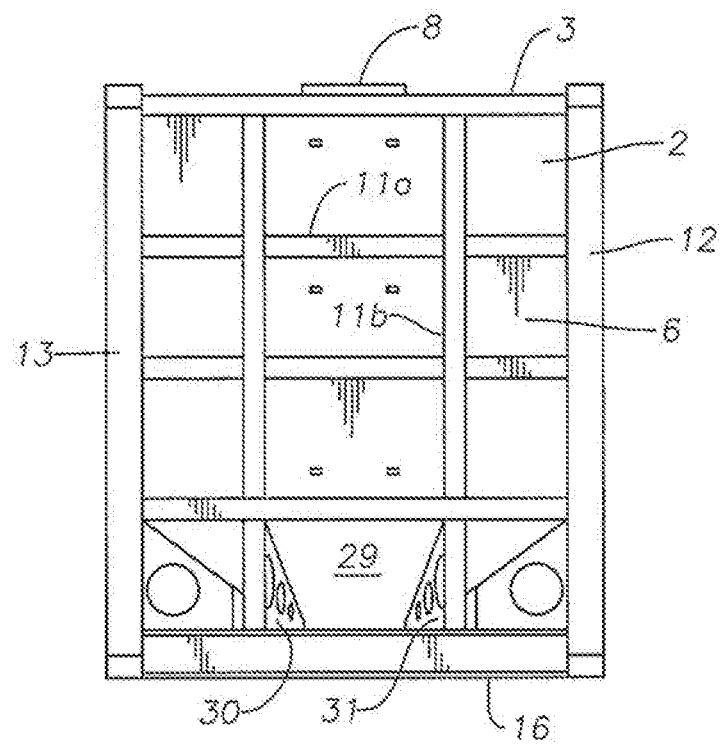

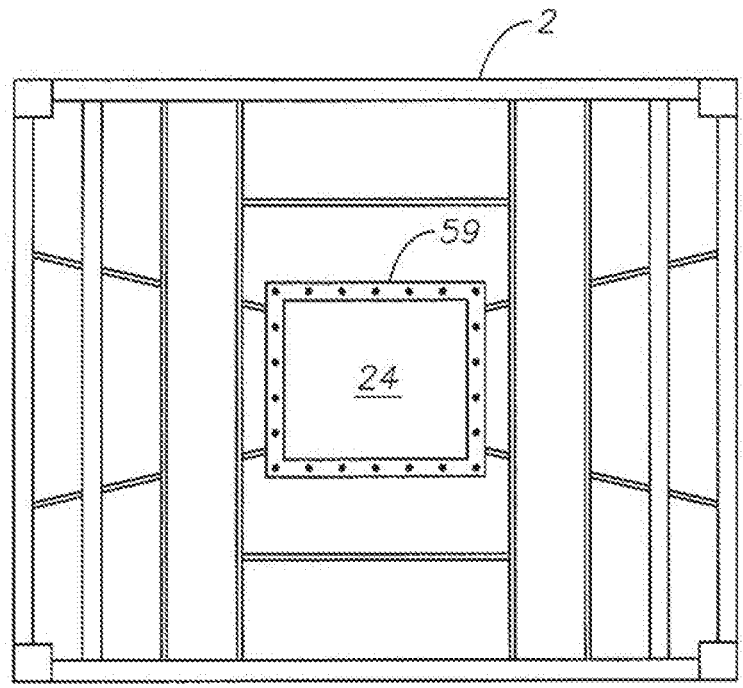
FIG. 9
FIG. 10
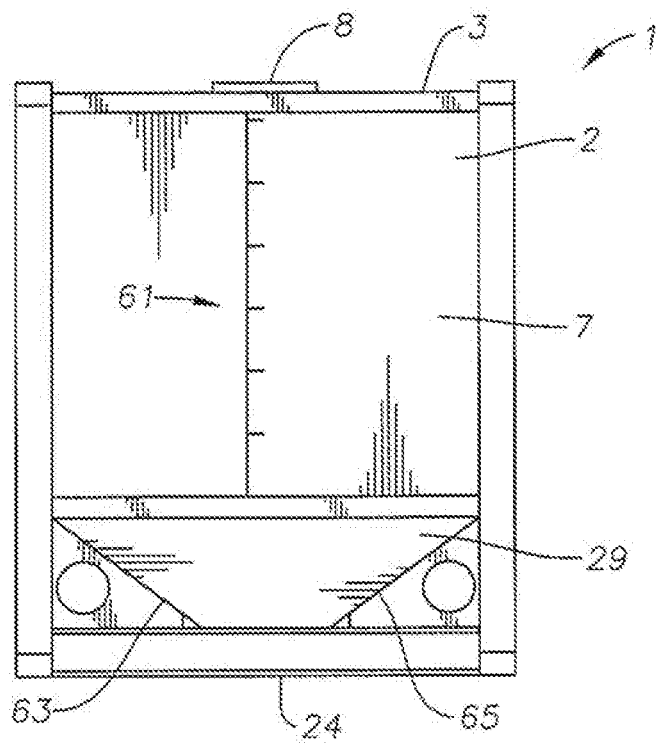

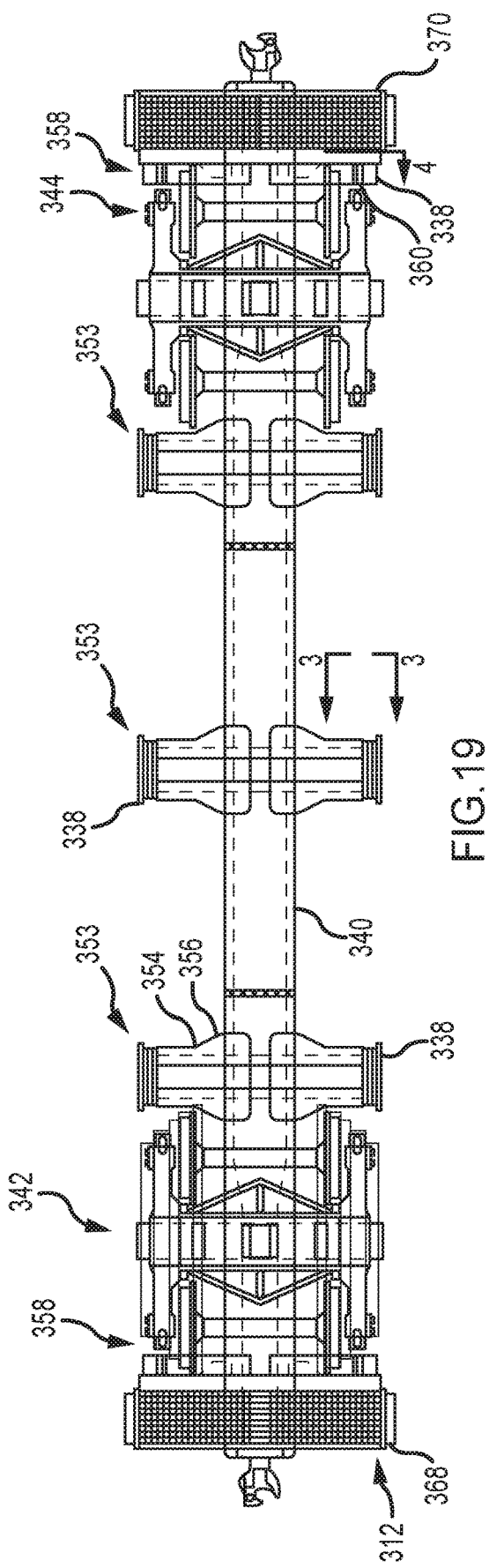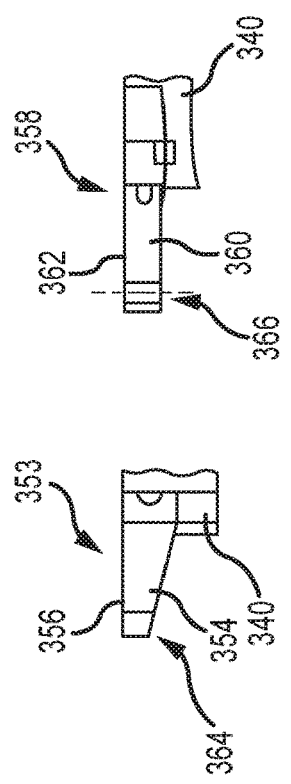

APPARATUS FOR THE TRANSPORT AND STORAGE OF PROPPANT

CROSS-REFERENCE TO RELATED APPLICATIONS

This application claims the benefit of, and is a divisional of U.S. patent application Ser. No. 14/738,485, filed Jun. 12, 2015, titled "Apparatus for the Transport and Storage of Proppant," which is a continuation-in-part of U.S. patent application Ser. No. 13/768,962, filed Feb. 15, 2013, titled "Support Apparatus for Moving Proppant from a Container in a Proppant Discharge System," now U.S. Pat. No. 9,771,224, issued Sep. 26, 2017, which is a continuation-in-part of U.S. patent application Ser. No. 13/628,702, filed Sep. 27, 2012, titled "Proppant Discharge System and a Container for Use in Such a Proppant Discharge System," which is a continuation in part of U.S. patent application Ser. No. 13/555,635, filed Jul. 23, 2012, titled "Proppant Discharge System Having a Container and the Process for Providing Proppant to a Well Site," now U.S. Pat. No. 9,718,610, issued Aug. 1, 2017, all of which are incorporated herein by reference in their entireties. U.S. patent application Ser. No. 14/738,485 further claims priority to and the benefit of U.S. Provisional Application No. 62/012,153, filed Jun. 13, 2014, titled "Process and System for Supplying Proppant from a Mine to a Transport Vehicle," U.S. Provisional Application No. 62/012,165, filed Jun. 13, 2014, titled "Apparatus for the Transport and Storage of Proppant," and U.S. Provisional Application No. 62/139,323, filed on Mar. 27, 2015, titled "Spine Car for Transporting Proppant Containers," all of which are incorporated herein by reference in their entireties.

BACKGROUND OF THE INVENTION

1. Field of the Invention

The present invention relates to the oil and gas industry and, more particularly, to the transport and storage of proppant.

2. Description of Related Art

Hydraulic fracturing is the propagation of fractions in a rock layer caused by the presence of pressurized fluid. Hydraulic fractures may form naturally, in the case of veins or dikes, or may be man-made in order to release petroleum, natural gas, coal seam gas, or other substances for extraction. Fracturing is done from a wellbore drilled into reservoir rock formations. The energy from the injection of a highly-pressurized fracking fluid creates new channels in the rock which can increase the extraction rates and ultimate recovery of fossil fuels. The fracture width is typically maintained after the injection by introducing a proppant into the injected fluid. Proppant is a material, such as grains of sand, ceramic, or other particulates, that prevents the fractures from closing when the injection is stopped.

A dominant proppant is silica sand, made up of ancient weathered quartz, the most common mineral in the Earth's continental crust. Unlike common sand, which often feels gritty when rubbed between the fingers, sand used as a proppant tends to roll to the touch as a result of its round, spherical shape and tightly-graded particle distribution. Sand quality is a function of both deposit and processing. Grain size can be a key factor, as any given proppant must reliably fall within certain mesh ranges, subject to downhole conditions and completion design. Generally, coarser proppant allows for higher flow capacity due to the larger pore spaces between grains. It may break down, however, or crush more readily under stress due to the relatively fewer grain-to-grain contact points to bear the stress often incurred in deep oil- and gas-bearing formations.

BRIEF SUMMARY OF THE INVENTION

Applicant has recognized a number of problems in the prior art. For example, Applicant has recognized that, in any hydraulic fracturing operation, a large amount of proppant is required, and it can be difficult to effectively store the proppant at the fracturing sites. Additionally, Applicant has recognized the difficulty in effectively transporting the proppant to the desired location. Proppant may be hauled to the desired locations on the back of trucks and clumped onsite. Under such circumstances, the proppant is exposed to adverse weather conditions. This may degrade the quality of the proppant during its storage. Additionally, the maintenance of proppant in containers at the hydraulic fracturing site requires a large capital investment in storage facilities. Typically, the unloading of such storage facilities is carried out on a facility-by-facility basis. As such, there is a need to be able to effectively transport the proppant to and store the proppant in a desired location adjacent to the hydraulic fracturing location.

With the development and acceptance of the well stimulation methodology known as "hydraulic fracturing," a unique logistics challenge has been created in delivering the massive quantities of proppant from domestic sand mines to the wellhead. This logistics challenge affects every stakeholder up-and-down the logistics chain. In particular, this includes sand mine owners, railroads, trans-loading facilities, oil-field service companies, trucking companies and exploration and production companies. As such, Applicant has recognized a need for facilitating the ability to quickly and inexpensively off-load proppant from rail cars so as to enable railroads to improve the velocity, turn-around and revenue-generating capacity of the rail-car fleet.

Applicant further has recognized that limited storage at trans-loading facilities has severely limited many of the current facilities' ability to operate efficiently. Most trans-load facilities are forced to off-load rail hopper cars by bringing in trucks (i.e. pneumatics) along the rail siding, and conveying sand directly from rail to truck. This requires an intense coordination effort on the part of the trans-loader as well as the trucking community. Long truck lines are commonplace, and demurrage fees (i.e. waiting time charged by trucking companies) amount to hundreds of millions of dollars nationwide. As such, Applicant further has recognized that the throughput of these trans-loading terminals is reduced greatly, which costs the terminal meaningful revenue.

Additionally, Applicant has recognized that trans-load terminal locations are not able to move from one area of the shale pay to another, and a potential loss of the investment in such immobile silos can often scare investment capital away from these types of future projects so as to further exacerbate the logistics chain problem. As such, a need has developed for a portable, inexpensive storage and delivery solution for proppant.

Furthermore, Applicant has recognized that service companies (such as fracturing companies) are held captive by the current proppant delivery process. This is the result, in part, of inefficient trans-load facilities and pneumatic (bulk) truck deliveries. A service company cannot frac a well if it does not have a supply of proppant. Thus, Applicant has recognized that pressure pumps, coiled tubing, and other well stimulation equipment sit idle due to the lack of required proppant at the well-site. "Screening-Out" or running out of proppant may occur at well locations due to the lack of control over what is happening up-stream in the proppant logistics chain.

Applicant further has recognized that an improper arrangement of plates extending to the discharge opening of a container creates conflicting problems in the delivery of proppant. For example, if the funnel was at an angle that was too great, then it would occupy too much space within the interior of the container. As such, the desired ability to transport between 45,000 pounds and 48,000 pounds of proppant was compromised. Although the steep inclination of the funnel would allow for the proper discharge of all of the proppant from the interior of the container, the containers were found to be unable to contain the desired amount of proppant. On the other hand, if the angle of the funnel is too shallow, then the proppant could not be discharged properly from the bottom discharge opening. It was found that a certain amount of proppant would be retained within the interior volume of the container after discharge. As such, the full amount of the proppant could not be delivered, by a conveyor, to the wellsite. Additionally, if the angle of the funnel was too shallow, certain bridging effects would occur with the proppant within the container. As such, this could block the flow of proppant properly moving outwardly of the discharge opening. Although a shallow angled funnel would allow the container to receive the desired amount of proppant, the shallowness of the angle of the funnel would actually work against the ability of the container to properly discharge the desired amount of proppant. As such, Applicant recognized the need to provide a properly configured funnel so as to maximize the amount of proppant contained within the container while, at the same time, assuring that all of the proppant within the container would be properly discharged by gravity discharge onto a conveyor.

Embodiments of the invention provide for the enhanced transport and storage of proppant. Apparatus embodiments comprise a container having a top wall, a pair of end walls and a pair of sidewalls. The pair of side walls extend between the pair of end walls. The container has a bottom discharge opening. The container has a funnel extending from the pair of sidewalls and from the pair of end walls toward the bottom discharge opening. In embodiments, the funnel has sides extending an angle of greater than 25° with respect to horizontal.

In embodiments, the funnel includes a pair of side plates extending respectively from the pair of side walls toward the bottom discharge opening. The funnel also includes a pair of end plates extending respectively from the pair of end walls toward the bottom discharge opening. According to embodiments, each of the pair of side plates extends at an angle of greater than 30° with respect to the horizontal. In particular, each of the pair of side plates can extend at an angle of approximately 38° with respect to the horizontal. In embodiments, each of the pair of end plates extends at an angle of less than 37° with respect to the horizontal. In particular, each of the pair of end plates can extend at an angle of approximately 31° with respect to horizontal. The funnel can be formed of a stainless steel material.

The top wall has an opening formed therein. In embodiments, this opening has a length substantially greater than one-half of the length of the top wall. The opening has a width less than one-half of the width of the top wall. A hatch is hingedly connected to the top wall. The hatch has an area greater than an area of the opening. The hatch is movable between an open position and a closed position. In embodiments, the interior volume of the container is approximately 600 cubic feet. As such, in embodiments the container is configured so as to contain between 45,000 and 48,000 pounds of proppant.

The bottom discharge opening has a gate cooperative therewith. The gate is movable between a first position closing the bottom discharge opening and a second position at least partially opening the bottom discharge opening. Each of the pair of end walls extends downwardly from the top wall toward an upper edge of the funnel. Each of the pair of sidewalls extends downwardly from the top wall toward another upper edge of the funnel. A frame is affixed to the outer surface of the pair of sidewalls and affixed to an outer surface of the pair of end walls. This frame includes a plurality of horizontal beams and a plurality of vertical beams. The plurality of horizontal beams and plurality of vertical beams are arranged in a cross-hatched configuration with respect to the sidewalls and the end walls of the container. A plurality of receptacles are positioned at each corner of the frame. This plurality of receptacles are suitable for receiving a pin therein so as to allow the container to be positioned on a support.

The transport vehicle can be a vehicle that can be used in commercial roadway systems, railroad systems, or proppant supply or discharge stations. Embodiments of the invention include a method for supplying proppant to a transport vehicle. This process can include the steps of: (1) forming a proppant supply station; (2) forming a track in a circuit form such that a portion of the track is adjacent the proppant supply station; (3) forming a proppant discharge station in a location away from the proppant supply station; and (4) moving a trolley along the track between the proppant supply station and the proppant discharge station. In embodiments, the track extends to a location adjacent to the proppant discharge station. The trolley then can carry an empty proppant container to the proppant supply station. The trolley then can carry a filled proppant container to the proppant discharge station.

According to embodiments, the method further includes forming a proppant transport pathway in a location away from the proppant discharge station. This proppant transport pathway is suitable for allowing a proppant-hauling vehicle to move therealong. A lifting apparatus can be positioned in a location between the proppant transport pathway and the proppant discharge station. The filled proppant container is moved from a location adjacent to the proppant discharge station to a location between the proppant transport pathway and the proppant discharge station. The filled proppant container is loaded from the location adjacent to the proppant transport pathway onto the proppant-hauling vehicle. This step of loading can include lifting the filled proppant container from the location adjacent the proppant transport pathway by using the lifting apparatus, and moving the lifted filled proppant container to a bed of the vehicle on the proppant transport pathway.

In embodiments of the method, a container transport pathway is formed in a location away from the proppant discharge station. The container transport pathway is suitable for allowing an empty container-hauling vehicle to move therealong. A lifting apparatus is positioned in a location between the container transport pathway and the proppant discharge station. An empty proppant container can be moved on the empty container-hauling vehicle along the container transport pathway to a location adjacent to the lifting apparatus. The lifting apparatus serves to lift the empty proppant container from the empty container-hauling vehicle. The lifted empty proppant container can be moved to a location between the container transport pathway and the track.

According to embodiments, the proppant supply station includes one or more silos positioned above the track. Proppant is gravity discharged from the silo into the empty proppant container on the trolley. Proppant is supplied from a pile of proppant at the mine to the silo. The proppant is dried and then separated by grain size.

According to embodiments, the lifting apparatus is a gantry crane. This gantry crane has a portion extending above the proppant discharge station and another portion extending above the proppant transport pathway. The step of moving the filled proppant container can include the steps of lifting the filled proppant container from the trolley, moving the lifted filled proppant container along the gantry crane to a desired location, and depositing the filled proppant container onto the earth or on top of another filled proppant container location below the gantry crane in the location between the proppant transport pathway and the proppant discharge station.

Additionally, the deposited filled proppant container can be lifted from the location between the proppant transport pathway and the proppant discharge station by the gantry crane. The lifted filled proppant container is moved to a location above the proppant transport pathway. The filled proppant containers then are deposited onto the proppant-hauling vehicle. The proppant-hauling vehicle then is moved, along with the filled proppant container, along the proppant transport pathway to a desired fracturing location.

Additionally, embodiments serve to move empty containers. The step of moving the empty proppant containers can include lifting the empty proppant container from the empty container-hauling vehicle by the gantry crane, moving the lifted empty proppant container along the gantry crane to a desired location, and depositing the empty proppant container onto the earth or onto a top of another empty proppant container in the location between the container transport pathway and the track. In particular, the empty proppant container is lifted from the location between the container transport pathway and the track by the gantry crane. The gantry crane moves the empty proppant container to a location above the track and then deposits the empty container upon the trolley on the track. The trolley can be moved with the deposited empty proppant container thereon to the proppant supply station.

In embodiments, the proppant hauling vehicle can be a truck or a railcar. If a truck is used, then the step of depositing can include depositing the filled proppant container onto the bed of a chassis of the truck, and then moving the truck, along with the filled proppant container, along the road to the desired location. Additionally, if the proppant hauling vehicle is a railcar, then the filled proppant container can be deposited onto the bed of the railcar, and then the railcar can be moved, along with the filled proppant container, along the railroad track to a desired location.

According to embodiments, the container transport pathway also can be a road (and can be the same road as the proppant transport pathway). The empty container-hauling vehicle also can be a truck. The truck can be moved, along with the empty proppant container, along to the road to a location below the gantry crane. The empty proppant container can be lifted from the bed of the chassis of the truck by the gantry crane. In those circumstances where the proppant hauling vehicle is a railcar, then the filled proppant container can be deposited onto the bed of the railcar and the railcar is moved, along with the filled proppant container, along the railroad tracks to the desired location. Additionally, the railcar can be used so as to move empty proppant containers to a location below the gantry crane. As such, the gantry crane can lift the empty proppant containers from the bed of the railcar.

Embodiments also include a proppant delivery system that comprises a track, a container-hauling trolley movably positioned on the track, a proppant supply station positioned adjacent to a portion of the track, a proppant discharge station positioned adjacent to another portion of the track, a container transport pathway extending in spaced relationship to the track, and a crane having a portion adjacent to the proppant discharge station and another portion adjacent to the container transport pathway. The container-hauling trolley can be movable along the track to a location adjacent to the proppant supply station. In addition, the container-trolley can be movable along the track to a location adjacent to the proppant discharge station. The crane is suitable for moving a proppant container from the proppant discharge station toward the container transport pathway.

In system embodiments, the crane can be a gantry crane having one portion located directly above the proppant discharge station and another portion located above the container transport pathway. The container transport pathway can be either a railroad track or a road. A container transport vehicle is movably positioned on the railroad track or the road. The container transport vehicle is movable between a location adjacent to the crane and a location at a well that uses the proppant from the proppant container. The proppant supply station can be a silo that is positioned above the track. The silo is suitable for gravity discharge of proppant from the silo into the container on the container-hauling trolley.

BRIEF DESCRIPTION OF THE FIGURES

FIG. 3 is a further side elevational view of an apparatus for the transport and storage of proppant showing, in particular, the configuration of the funnel;

FIG. 4 is an end view of an apparatus for the transport and storage of proppant according to an embodiment of the invention;

FIG. 9 is a bottom view of an apparatus according to an embodiment of the invention;

FIG. 10 is a side elevational view showing a side view of an embodiment apparatus with indicia on the side thereof;

FIG. 19 is an plan view of the spine car of FIG. 18 according to an embodiment of the invention;

FIG. 20 is a side view of a bolster provided on the spine car of FIG. 19 and taken along line 3-3;

FIG. 21 is a side view of a bolster provided on the spine car of FIG. 19 and taken along line 4-4;

DETAILED DESCRIPTION OF THE INVENTION

Figure 1:
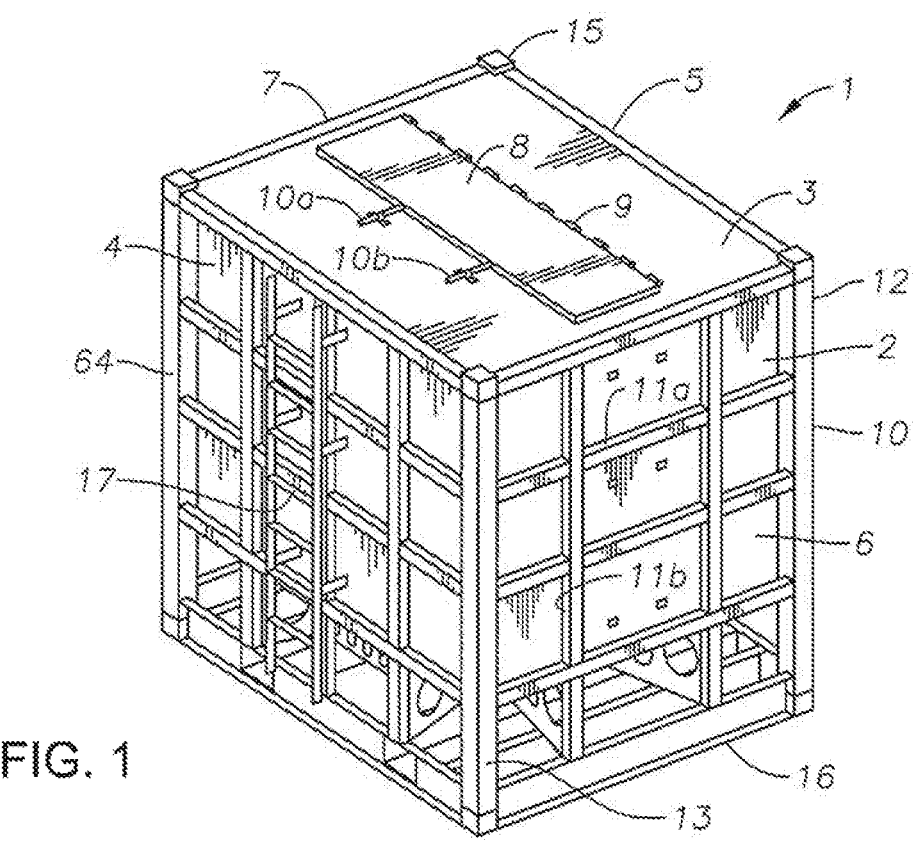
FIG. 1 is a perspective view of an apparatus for the transport and storage of proppant according to an embodiment of the invention.

FIG. 1 shows an exemplary apparatus 1 for the transport and storage of proppant. The apparatus 1 includes a container 2. The container 2 has a top wall 3, a pair of side walls 4 and 5 and a pair of end walls 6 and 7. The pair of side walls 4 and 5 extend between the pair of end walls 6 and 7. The container 2 has a bottom discharge opening (not shown) located below the pair of side walls 4 and 5 and below the pair of end walls 6 and 7. A hatch 8 is hingedly mounted to the top wall 3 so as to cover an opening in the top wall 3.

In the example shown in FIG. 1, the top wall 3 is of a generally planar surface, though it will be understood that the top wall can include one or more surfaces positioned at various angles. The hatch 8 is connected by hinges 9 to the top wall 3. Latches 10a and 10b are used to secure the hatch 8 over the opening in the top wall 3. In normal use, the hatch 8 will have a liner or gasket affixed therearound such that when the hatch 8 is in the closed position (as shown in FIG. 1), the hatch 8 will form a liquid-tight seal over the opening formed in the top wall 3.

The side walls 4 and 5 and the end walls 6 and 7 define a rectangular configuration. A frame 10 is configured around the exterior surfaces of the side walls 4 and 5 and the end walls 6 and 7. The frame 10 includes horizontal members 11a and vertical members 11b. The horizontal members 11a and the vertical members 11b form a cross-hatched configuration with respect to the side walls 4 and 5 and the end walls 6 and 7. In particular, the horizontal members 11a and the vertical members 11b were in the nature of square tubing that will bear against the outer surfaces of the respective walls. As such, the frame 10 contributes to structural integrity to the apparatus 1. It can be seen that there are corner posts 12, 13, 14, and 15 that are located at the corners between the side walls and the end walls. These corner posts 12, 13, 14, and 15 enhance the structural integrity of the container 2 at the corners thereof.

The container 12 includes a bottom 16. The bottom 16 is in the nature of a rectangular structure. Suitable horizontal structural members extend between the corner posts 12, 13, 14, and 15 at the bottom 16.

In FIG. 1, it can be seen that there is a ladder 17 that is affixed to the side wall 4. The ladder 17 is configured so as to extend vertically. The upper portion of the ladder 17 will be adjacent to the top plate 3. As such, a worker can have easy access to the hatch 8 for purposes of opening or closing the hatch 8.

Figure 2:
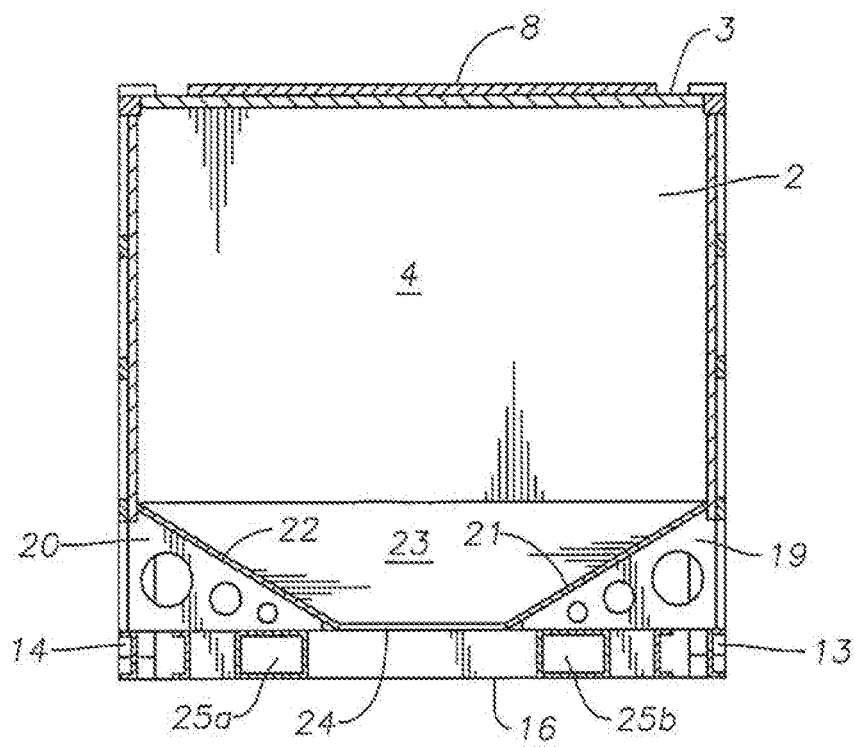
FIG. 2 is a side elevational view of an apparatus for the transport and storage of proppant with the frame members removed.

FIG. 2 illustrates an example of the interior of the container 2. As can be seen, the container 2 can include corner posts 13 and 14. The side wall 4 will extend between the corner posts 13 and 14. The top plate 3 is mounted to a top of the corner posts 13 and 14. The hatch 8 is illustrated in its closed position on the top plate 3.

In FIG. 2, it can be seen that there are gussets 19 and 20. Gussets 19 and 20 serve to support end plates on respective surfaces 21 and 22 thereof. Each of the gussets 19 and 20 has holes formed therethrough. The holes help reduce the weight of the gussets 19 and 20 while, at the same time, preserving the structural integrity of the gussets. As will be described hereinafter, a side plate 23 is illustrated as extending toward the bottom 16 of the container 2.

The end plates and the side plates form a funnel adjacent to the bottom 16 of the container 12. This funnel is directed toward a bottom discharge opening 24 at the bottom 16. The angle of the side plates and end plates helps to assure that the entire contents within the interior of the container 12 discharge through the bottom discharge opening 24 while, at the same time, assuring that a maximum amount of proppant can be contained within the interior volume of the container 12. In embodiments, this volume will be between 45,000 pounds and 48,000 pounds of proppant. In particular, the angle defined by the surfaces 21 and 22 of gussets 19 and 20 for the support of the end plates, can be at an angle of greater than 25° with respect to the horizontal. In particular, the pair of end plates can extend in an angle of less than 37° with respect to the horizontal. In an embodiment the present invention, the end plates extend at an angle of approximately 31° with respect to horizontal. Similarly, the side plates 23 also can extend at an angle of greater than 25° with respect to horizontal. The pair of side plates can extend at an angle of greater than 30° with respect to horizontal. In an embodiment the present invention, each of the pair of side plates extends at an angle of 38° with respect to the horizontal. It was found that this configuration serves to assure that all of the proppant is discharged from the interior of the container. In FIG. 2, it can be seen that there are a pair of forklift sleeves 25a and 25b formed at the bottom 16. As such, the forks of a forklift truck can be received within the sleeves 25a and 25b so as to allow a forklift truck to lift and to manipulate the container 2.

FIG. 3 further illustrates aspects of the container 2 according to an embodiment of the invention. In particular, in FIG. 3, the end plates 26 and 27 are illustrated as positioned on the surfaces 21 and 22 associated with the gussets 19 and 20. The end plates 26 and 27 are illustrated in a slightly curved configuration. As such, they form the funnel as used for the discharge of proppant. Similarly, FIG. 3 illustrates the side plate 23 as extending between the end plates 26 and 27. Another gusset 28 extends from the bottom 16 of the container 2 so as to provide structural support for the side plate 23. It should be noted that the other side of container 2 can have a similar configuration.

FIG. 3 further shows the arrangement of the horizontal members 11a and the vertical members 11b that are arranged in a cross-hatched configuration against the sidewall 4. Each of the vertical members 11b extends between the top wall 3 and the bottom 16.

FIG. 4 shows an end view showing the end wall 6 of container 2. The end wall 6 extends downwardly toward the funnel 29 located adjacent to the bottom 16. Gussets 30 and 31 serve to support the side plates of the funnel 29. The end wall 6 also includes horizontal members 11a and vertical members 11b. The horizontal members 11a and the vertical members 11b are arranged in a cross-hatched configuration. In particular, the horizontal members 11a can extend between the corner posts 12 and 13. The vertical members can extend from the top wall 3 toward the bottom 16. The opposite end of the container 2 will have a similar configuration.

Figure 5:
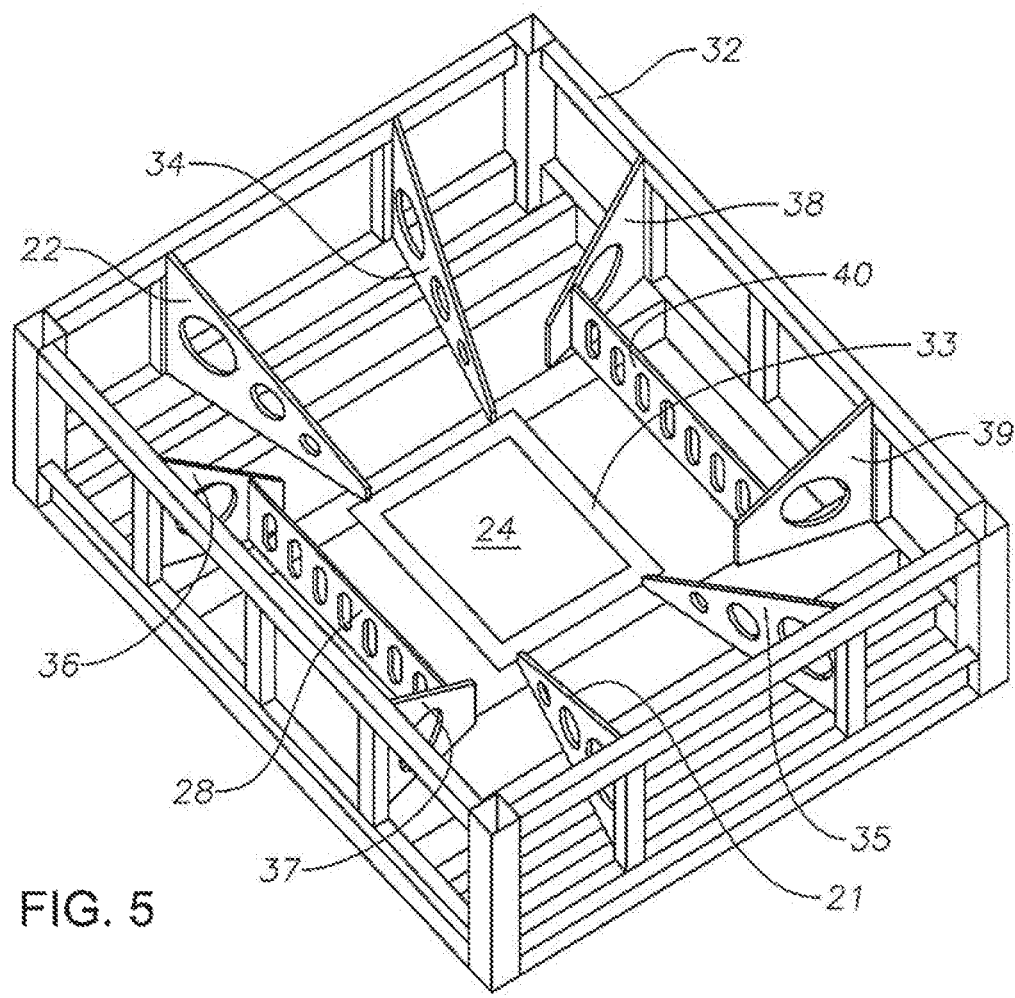
FIG. 5 is a perspective view showing the construction of the base of an apparatus for the transport and storage of proppant according to an embodiment of the invention.

FIG. 5 shows the bottom structure 32 of the apparatus 1 according to embodiments of the present invention. In particular, the bottom structure 32 includes the bottom discharge opening 24. A rectangular-shaped reinforcing plate 33 is affixed around the bottom discharge opening 24 so as to provide structural integrity thereto. FIG. 5 further shows a pair of gussets 22 and 34 associated with one of the bottom plates. Another pair of gussets 21 and 35 is associated with the other end plate. A pair of gussets 36 and 37 serves to support one of the side plates. Similarly, a pair of gussets 38 and 39 serves to support another of the side plates. A further supporting gusset structure 28 is illustrated as extending between gussets 36 and 37. The arrangement of gussets 36 and 37, along with the gusset 28, forms a rectangular structure for the support of the side plate thereon in a solid and stable configuration. Similarly, there is another gusset 40 which extends between gussets 38 and 39 in spaced relation to the outer surfaces of the bottom structure 32. This arrangement of gussets has been found to optimize the structural integrity of the side plates and end plates for the support of the heavy weight of the proppant within the interior of the container.

Figure 6:
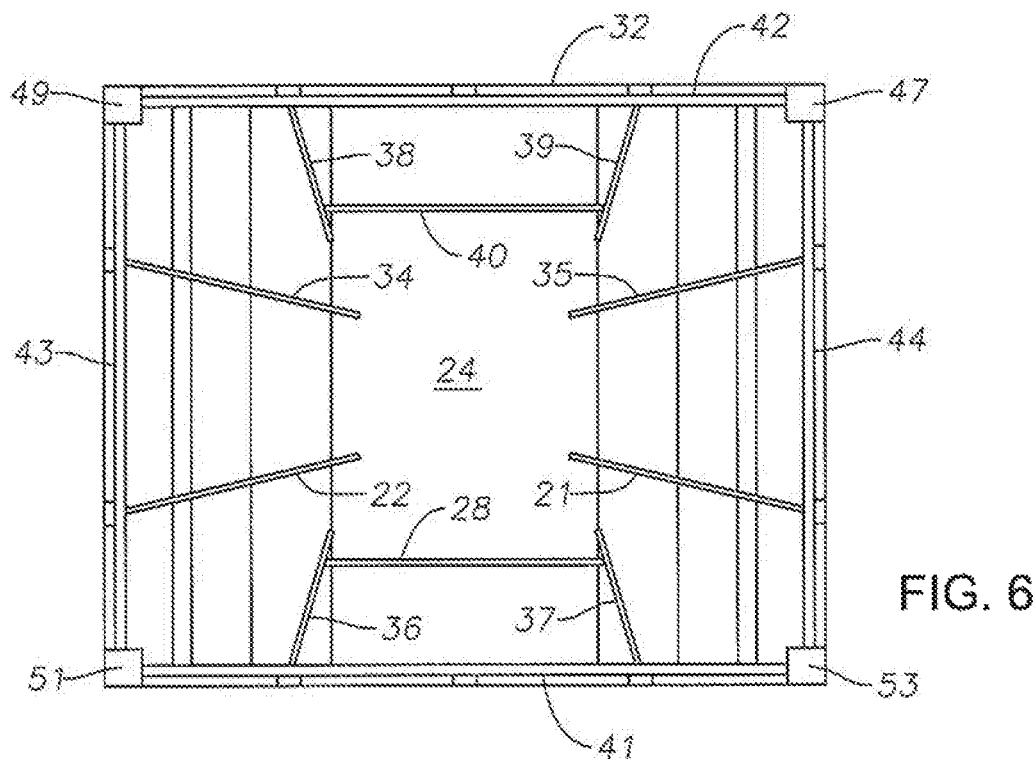
FIG. 6 is a plan view showing the interior of an apparatus for the transport and storage of proppant with the side plates and end plates removed.

FIG. 6 is a further illustration showing an example of the bottom structure 32 of the apparatus 1 of embodiments of the present invention. In particular, in FIG. 6, it can be seen that gussets 36 and 37 extend from a side 41 of the bottom structure 32. The cross gusset 28 is affixed to and extends between gussets 36 and 37. The gussets 38 and 39 extend from a side 42 of the bottom structure 32. The cross gusset 40 is affixed to and extends between gussets 38 and 39. The gussets 22 and 34 extend from a side 43 of the bottom structure 32. Similarly, gussets 21 and 35 extend from an opposite side 44 of the bottom structure 32. These arrangements of gussets extend toward the bottom discharge opening 24.

The structure in FIG. 6 reinforces the strength of the container 2 in several respects. Fundamentally, the arrangement of the square tubing of the corner posts 12, 13, 14 and 15 provides strength at the corner of the container. Furthermore, the arrangement of the various vertical members 11b and the horizontal members 11a further reinforces the strength of the frame 10. The gussets are arranged so as to be generally positioned centrally of each of the sides of the bottom structure. As such, in the area where strength is needed most, these gussets cooperate with the sides of the bottom structure so as to enhance the structural integrity. The use of the cross gussets 28 and 40 further avoids deflection of the connected gussets so as further to reinforce the strength of the side plates residing thereon.

In FIG. 6, it can be seen that there are receptacles 47, 49, 51, and 53 formed at each of the corners of the bottom structure 32. Receptacles 47, 49, 51, and 53 are configured so as to receive the pins associated with an underlying structure. As will be described hereinafter, the apparatus 1 is suitable for being placed upon a support structure, such as a cradle. As such, in order to assure the proper location of the container 2 on the support structure, the pins on the support structure will align with the receptacles 47, 49, 51 and 53 so as to assure that the container 2 is properly positioned over an underlying conveyor. As such, the bottom discharge opening 24 is assured of being positioned in a proper location. Furthermore, the cooperation between the pins of the support structure and the receptacles 47, 49, 51, and 53 reduces the effects of vibration on the discharge of proppant. This avoids the creation of potentially toxic dust clouds from the proppant that is released through the bottom discharge opening 24. As such, these receptacles 47, 49, 51, and 53 unexpectedly provide the combination of both accurate positioning of the container to upon the support structure while, at the same time, minimize the potentially toxic production of dust and silica particles during the release of proppant from the container 2.

Figure 7:
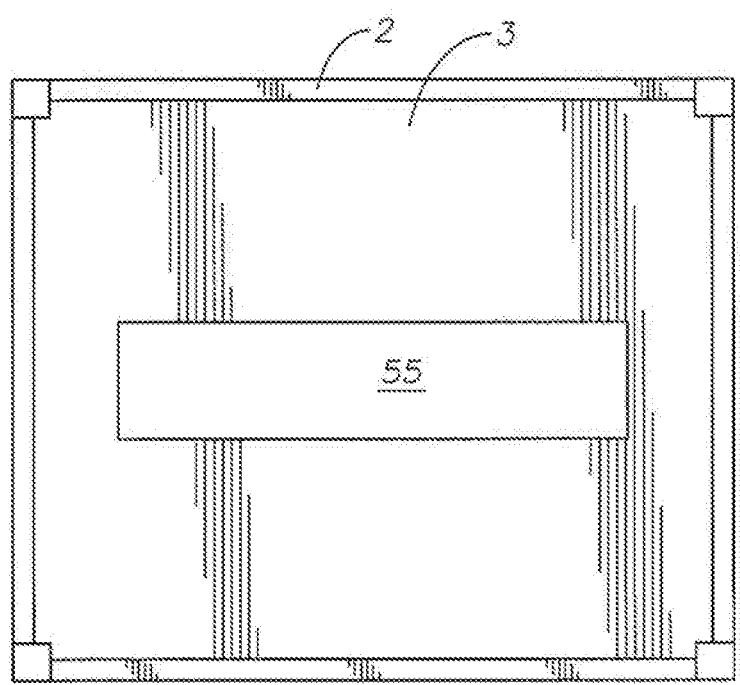
FIG. 7 is a plan view of an apparatus according to an embodiment of the invention.

FIG. 7 illustrates an example of the top wall 3 of the container 2 of embodiments of the present invention. In particular, the opening 55 is illustrated as formed in the top wall 3. The opening 55 can have a length dimension which is substantially greater than one-half of the length of the top wall 3. The width of the opening 55 is substantially less than the width of the top wall 3. Ultimately, this elongated configuration of the opening 55 assures that proppant can be discharged properly and quickly into the interior volume of the container 2. The elongated nature of the opening 55 avoids the problems of restricted openings, such as small portholes, that could be formed on the top wall 3. The hatch 8 can be placed over the opening 55. The hatch 8 can have an area slightly greater than the area of the opening 55 to assure that the contents of the container 2 are retained properly therein in a liquid-tight manner. As such, potential damaging effects of liquid penetration through the hatch 8 is effectively avoided. Furthermore, the placement of the hatch 8 over the opening 55 further avoids the release of potentially toxic dust and silica particles from the interior of the container 2.

Figure 8:
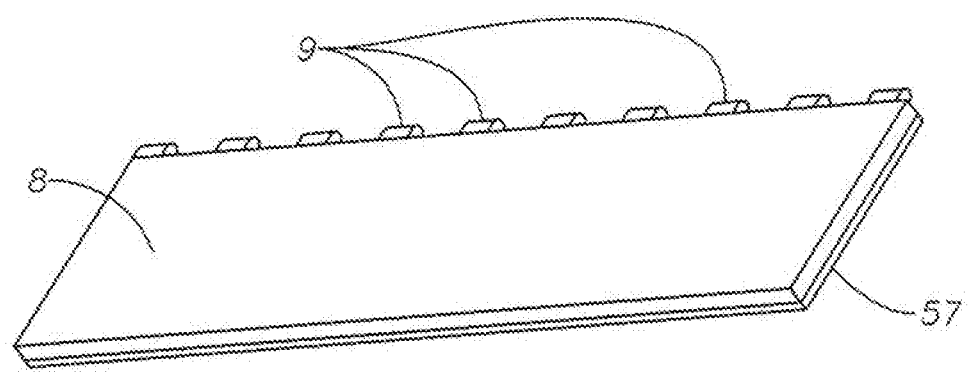
FIG. 8 is an isolated perspective view showing the hatch as applied to the opening at the top of an apparatus according to an embodiment of the invention.

FIG. 8 illustrates an exemplary hatch 8. The hatch 8 has hinges 9 on one side thereof. A liner material 57 is affixed around the periphery of the hatch 8. This liner material can be of a rubber, elastomeric or polymeric material. As such, when the hatch 8 is properly closed over the opening 55, the contents of the container 2 are sealed within the interior of the container.

FIG. 9 illustrates an example of a bottom view of the container 2 according to an embodiment of the invention. In particular, there is a reinforcing plate 59 positioned around the discharge opening 24. The reinforcing plate 59 is of an open rectangular configuration. As such, this reinforcing plate 59 enhances the structural integrity of the side plates and end plates during the discharge of proppant. As will be described hereinafter, a sliding gate mechanism can be placed adjacent to the bottom discharge opening 24 so as to allow for the release of contents from the interior of the container 2.

FIG. 10 is a side view of the apparatus 1 according to an embodiment and shows, in particular, a series of graduations 61 formed on the end wall 7. These graduation 61 are indicative of the volume of proppant within the interior of the container 2. Although the side walls and the end walls of the container 2 are opaque, the level of proppant within the interior of the container can easily be determined by tapping on the end wall 7. The change in sound will correspond to a level of the graduations 61. As such, the user is able to properly determine whether there is any proppant remaining within the container and whether all of the proppant has been discharged from the container. FIG. 10 further shows the orientation of side plates 63 and 65. The side plates 63 and 65 converge from the funnel 23 toward the bottom discharge opening 24.

As was stated previously, the angle of the side plates and end plates contributes to avoiding the problems of retaining proppant within the interior of the container while, at the same time, allowing a maximum amount of proppant to be received within the container. In an embodiment the present invention, the container 2 will have a length of 118 inches and a width of 96 inches. The apparatus 1 is particularly configured so as to be placed upon a railcar or on a trailer, though one skilled in the art, after reading this specification, will understand that other modes of transportation are permissible as well. In order to transport the apparatus 1 on highways, certain weight restrictions (as recited hereinabove) must be addressed. In order to comply with weight restrictions on roads, the container 2 should contain no more than 48,000 pounds of proppant. Ultimately, the total weight of the container 2 and the proppant therein should be no greater than 52,000 pounds. As such, it is necessary to configure the bottom structure, along with the end plates and side plates, such that approximately 48,000 pounds of proppant can be contained within the container. Experiments with various configurations and orientations of side plates and end plates have been carried out to determine the configuration of such side plates and end plates.

Example 1

Experiments were conducted with a container in which the side plates had an angle of 30° and the end plates had an angle of 37°. The container had a tare weight of 5,560 pounds. The container was filled with proppant such that the gross weight of the container and the proppant was 43,460 pounds. As such, the total capacity of such container was 37,900 pounds. If the sand was "hand-packed", then the total capacity of sand is 43,900 pounds. The container had an internal cubic capacity of 512 cubic feet.

During experiments, it was found that this orientation of side plates and end plates effectively discharged approximately all of the proppant from the container. Generally, however, the container was capable of transporting only 37,900 pounds of sand. As such, the capacity of the container was substantially less than optimal. Because the maximum amount of proppant is desired for every container, it was found that this configuration and orientation of side plates and end plates was insufficient.

Example 2

The container was modified so that the side plates extended at a 20° angle to horizontal and the end plates extended at 25° angle of the horizontal. The total weight of such container was 5,420 pounds. The internal cubic capacity of such container was 554 cubic feet. As such, only an insufficient amount of proppant could be received in such a container. During experiments with such a configuration, it was found that 4,120 pounds of proppant remained within the container. As such, this orientation of side plates and end plates was found to be ineffective in discharging all of the contents from the container. As a result, less than desired amount of proppant was available for use.

Example 3

Another test was carried out on a container in which the side plates were oriented at a 20° angle with respect to horizontal and the end plates were at a 25° angle with respect to horizontal. The total weight of the container was 5,380 pounds. The gross weight of the container and the sand therein was 46,900 pounds. The container had the capacity of 41,520 pounds. The internal cubic capacity of such a container was 554 feet. It was found that this orientation of such side plates and end plates resulted in less than necessary amount of proppant being contained.

Example 4

In a further test conducted, the side plates were oriented at a 25° angle with respect to horizontal and the end plate was arranged at a 31° angle with respect to horizontal. This resulted in an internal cubic capacity of the container of 536 cubic feet. The total weight of the container was 5,480 pounds. Unfortunately, this orientation of relatively steep plates minimized the capacity of the container. As such, substantially less than 41,000 pounds of proppant could be included in the container.

Example 5

The container was modified such that the side plate extended at an angle of 38° to horizontal and the end plate extended at an angle of 31° to horizontal. The total weight of such container was 6,200 pounds. A gross weight of the container with the sand therein was 52,000 pounds. As such, the amount of sand within the container was 46,500 pounds. The internal cubic capacity of the container was 600 cubic feet. In experiments with this configuration, it was found that all the proppant was discharged from the interior of the container, as desired. Additionally, the amount of proppant within the container (i.e. 46,500 pounds) was optimal. In other words, this amount of proppant satisfied that needs for proppant delivery while, at the same time, assured that the equipment used to transport such equipment complied with highway regulations. As such, it was discovered that this arrangement of end plates and side plates optimized the discharge of proppant while, at the same time, enhanced the capacity of the container to transport proppant.

Figure 11:
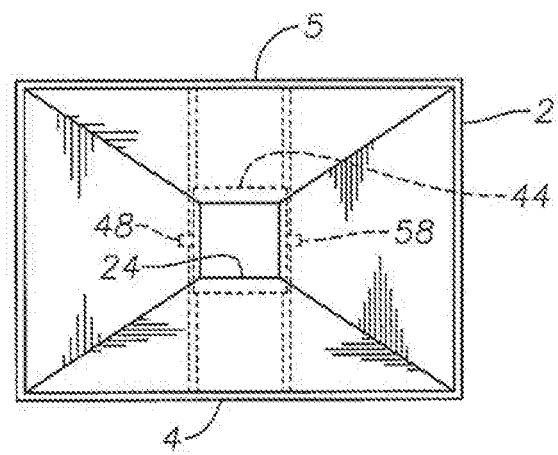
FIG. 11 shows an internal view of an embodiment apparatus with a gate located at the bottom of the apparatus.

FIG. 11 illustrates a configuration of the container 2 of the present invention with a gate 44 positioned at the bottom discharge opening 24 of the container 2. The gate 44 has a pair of pins 48 and 58 extending outwardly therefrom. The gate 44 is shown in its closed position. An actuator can be used so as to move the gate 44 from the position shown in FIG. 11 in a direction toward either of the side walls 4 or 5. Pins 48 and 58 are illustrated as extending outwardly of the sides of the gate 44. As such, a suitable actuator, such as a hydraulic piston-and-cylinder arrangement, can be connected to these pins so as to achieve the requisite movement of the gate 44 from the closed position to the open position.

Figure 12:
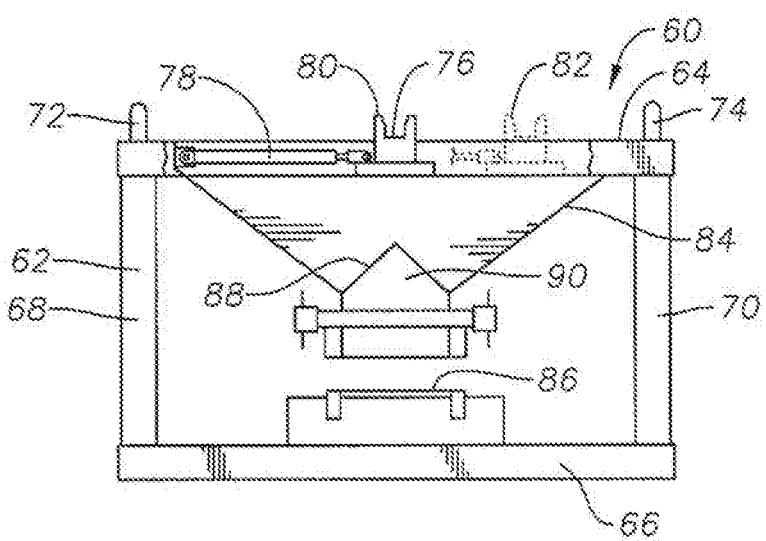
FIG. 12 is an end view showing a support apparatus as used for the discharge of contents from an apparatus according to an embodiment of the invention.

FIG. 12 is an end view showing an exemplary support structure 60 as used in embodiments of the proppant discharge system of the present invention. The support structure 60 has a frame 62 which forms a top surface 64, a bottom surface 66, and sides 68 and 70. The top 64 of the frame 62 has a surface upon which the container 10 can be placed. Suitable pin connections 72 and 74 extend upwardly from the top surface 64 so as to engage corresponding receptacles on the container 10. These pins 72 and 74 can be utilized so as to assure that the container 10 is positioned properly upon the support structure 60.

A receptacle 76 is positioned at or adjacent to the top surface 64. The actuator 78 is affixed to the frame 62 and extends to the receptacle 76. As can be seen, the receptacle 76 has a slot formed in the top end thereof. The slot of the receptacle 76 is suitable for receiving one of the pins 48 and 58 of the gate 44 of the container 10. Once the receptacle 76 receives the pin 48 therein, the actuator 78 can be actuated so as to move the receptacle (and its received pin) from the first position 80 to a second position 82. When the receptacle 82 (along with the pin received therein) is moved to the second position 82, the gate 44 will be opened so that the proppant can be discharged through the bottom discharge opening 24 of the container 2. Since pins 48 and 58 are symmetrically placed, and since the container 2 is rather symmetrical, the support structure 60 is particularly adapted to the variety of orientations with the container 2 can be placed upon the top surface 64.

Figure 13:
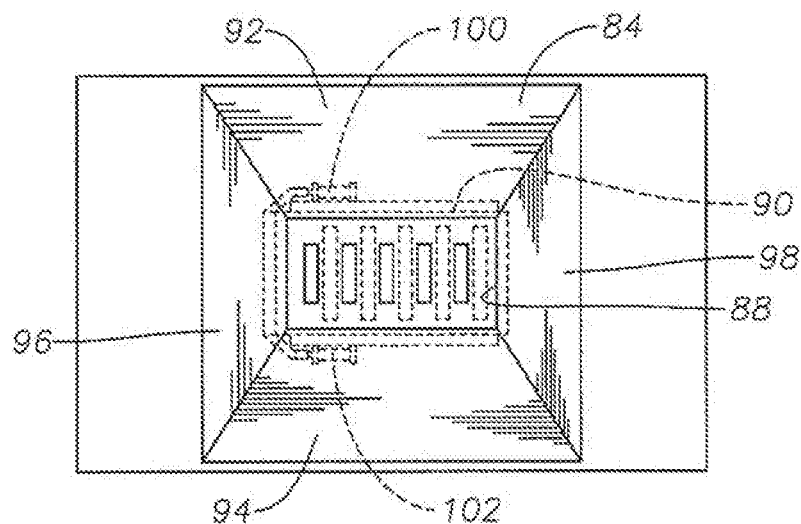
FIG. 13 is a plan view of the support structure as used for the discharge of proppant from the interior of an apparatus according to an embodiment of the invention.

In FIG. 13, there is a hopper 84 that is positioned below the top surface 64. Hopper 84 serves to receive a portion of the proppant as discharged through the bottom discharge opening 24 of the container 2 when the gate 44 is in the open position. As such, the hopper 84 can be utilized so as to properly meter the proppant onto the conveyor 86 (shown in FIG. 14). Conveyor 86 is located below the opening 88 of the hopper 84.

As can be seen in FIG. 13, hopper 84 has an opening 88 of a generally inverted V-shaped configuration. There is a metering gate 90 that is mated with the opening 88 and also has a V-shaped configuration. The metering gate 90 can be moved a small distance so as to allow for the selected and controlled discharge of proppant from the hopper 84 onto the conveyor 86.

Figure 14:
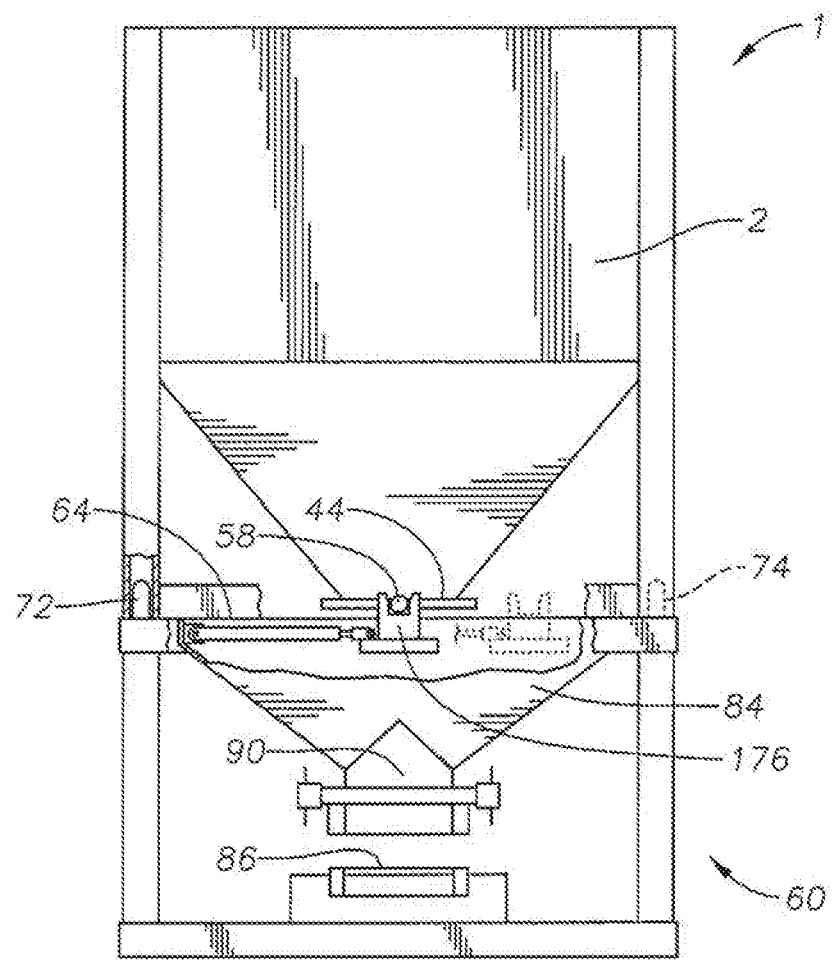
FIG. 14 shows an embodiment apparatus as applied to the support structure of FIGS. 12 and 13.

FIG. 14 shows the interior of the hopper 84. Hopper 84 includes side walls 92 and 94 and end walls 96 and 98 (shown in FIG. 13). The walls 92, 94, 96 and 98 are formed into a funnel-like shape so as to move the proppant downwardly toward the metering gate 90. In FIG. 13, it can be seen that the opening 88 of the hopper 84 has a plurality of slots formed therein. Similarly, the metering gate 90 has a plurality of slots formed therethrough. The structures between the slots are substantially solid. As such, when the slots of the metering gate 90 are aligned, with the slots of the opening 88, then proppant can be discharged onto the underlying conveyor 86. A small movement of the metering gate 90 in one direction or another, will block the flow of the proppant through the slots of the opening 88 of hopper 84. As such, very small actuators 100 and 102 can be used so as to achieve the proper metering of the proppant onto the conveyor. If a low flow rate of proppant is desired, then the actuators 100 and 102 will move the metering gate 90 only a small distance. If a greater flow rate is required, then the actuators 100 and 102 will move the metering gate 90 so that the slots of the metering gate 90 fully correspond with the slots of the opening 88 so as to achieve a maximum flow of proppant from the hopper 84 down to the conveyor.

Figure 15:
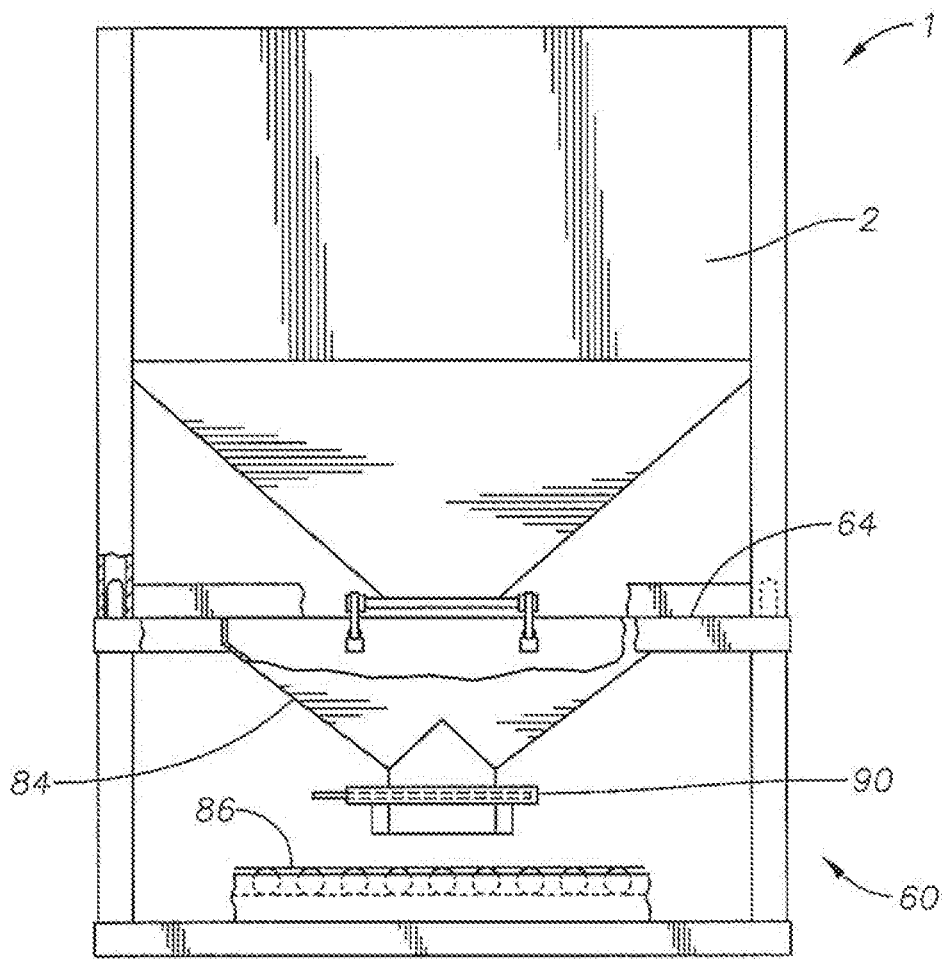
FIG. 15 is a side view showing the application of an embodiment apparatus to a support structure.

FIG. 15 shows the container 2 as placed upon the top surface 64 of the support structure 60. In normal use, a forklift can be utilized so as to properly position the container 2 in a proper position upon the pins 72 and 74 of the support structure 60. Initially, the gate 24 of the container 2 will be closed. Additionally, the metering gate 90 can also be closed. When the container 2 is properly positioned, the gate 44 can be moved to an open position so that the proppant is discharged into the hopper 84. The hopper 84 can then be filled with proppant. When it is desired to move the proppant from the hopper 84, along the conveyor, to the desired destination, then the metering gate 90 can be opened so as to achieve the desired flow rate of proppant through the opening 88 of the hopper 84.

Figure 16:
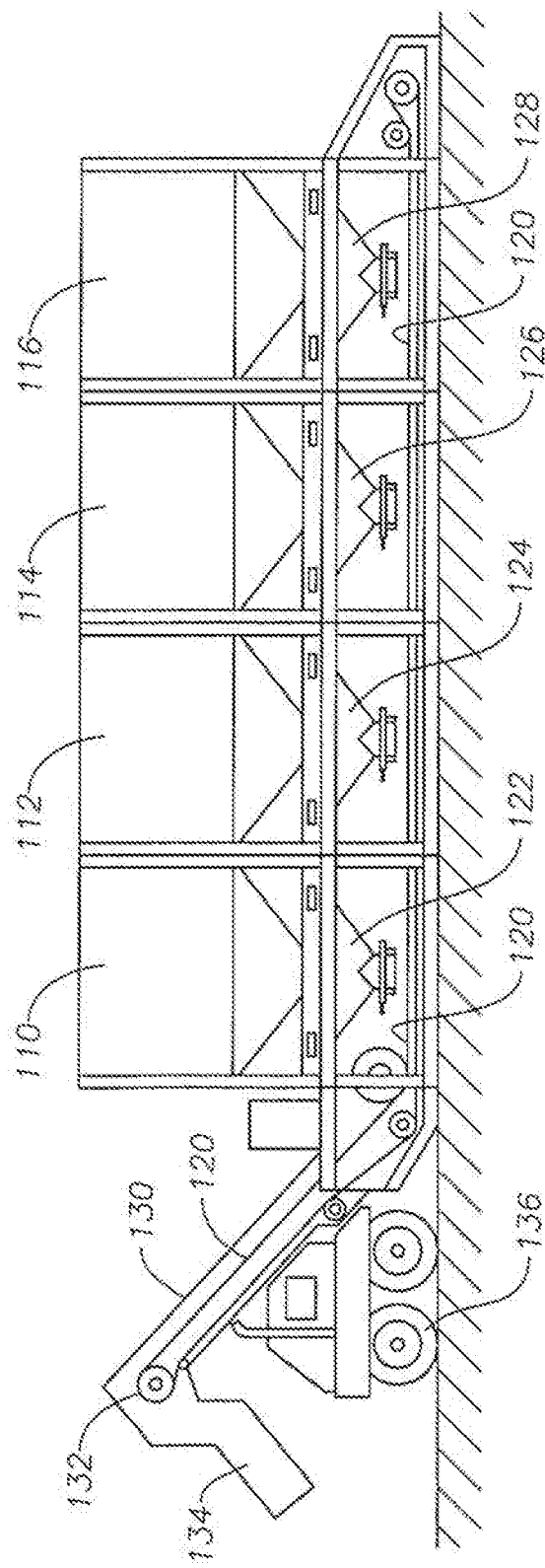
FIG. 16 is a side elevational view of an embodiment system employing an embodiment apparatus for the discharge of proppant.

FIG. 16 shows a side view in which the container 2 is placed upon the top surface 64 of the support structure 60. The conveyor 120 is illustrated as extending longitudinally. As such, when the proppant passes through the metering gate 90 associated with the hopper 84, any proppant within the interior volume of the container 2 can be delivered, in a controlled manner, onto the conveyor 120.

Figure 17:
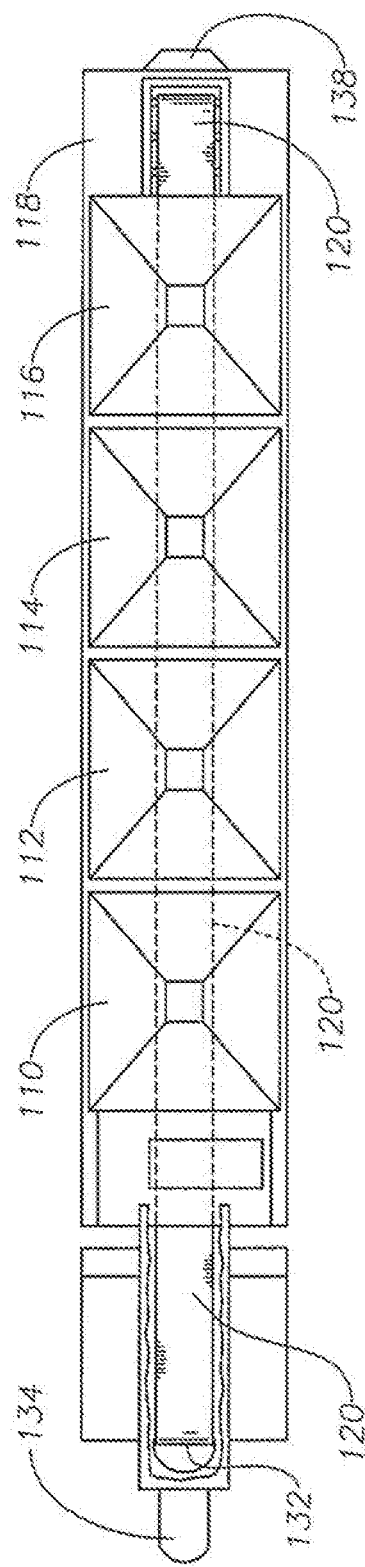
FIG. 17 is a plan view of an embodiment apparatus as used for the discharge of proppant from the interior of the containers.

FIGS. 16 and 17 illustrate exemplary containers 110, 112, 114 and 116 as placed upon the support structure 118. The support structure 118 has a sufficient length so as to accommodate the containers 110, 112, 114 and 116. It can be seen that the conveyor 120 is arranged beneath the top surface of the support structure 118 and below the respective hoppers 122, 124, 126 and 128 below the respective containers 110, 112, 114 and 116. The conveyor 120 is an endless conveyor that is suitably wound around sheaves and idlers so as to travel a desired path. The proppant that is discharged from the containers 110, 112, 114 and 116 is discharged onto the conveyor 120 so as to travel therealong and along upwardly extending section 130. The end 132 of the conveyor 120 will open to a chute 134. The chute 134 can be directed toward the desired purposes at the fracturing site. As such, the array of containers 110, 112, 114 and 116 can be configured so as to replace existing storage facilities at the fracturing site. The support structure 118, along with the conveyor 120, can be easily transportable by a truck upon a roadway because of the use of the wheels 136. The forward end 138 can be suitably connected to a truck so as to allow for the easy transport of the system of the present invention.

FIG. 17 illustrates an exemplary placement of the containers 110, 112, 114 and 116 upon the support structure 118. The end 138 includes a suitable hitch connection for attachment to a truck. The conveyor 120 extends below the containers 110, 112, 114 and 116 so as to deliver the proppant to the chute 134. The chute 134 is suitably pivotable in cooperation with the end 132 of the conveyor 120 so as to allow for the controlled and directed discharge of the proppant to the desired location.

In embodiments, the container 2 is manufactured as a single unit. The gate 44 of the container 2 is specifically engineered to align with the actuator 78 located on the conveying system, as will be discussed more thoroughly below. The actuator is hydraulically controlled and accepts the pin 48 which is attached to the gate 44. When the actuator 70 is activated, the gate 44 moves horizontally so as to allow for the discharge of proppant therefrom.

In embodiments, the container can be specifically applied for transport via rail. In particular, the railcar can be designed so as to accommodate up to four containers 2. As such, the railcar can carry approximately 180,000 pounds of proppant when the four containers are placed on the railcar. The railcar can be similar to current inter-modal railcars that carry twenty foot, forty foot and fifty-three foot inter-modal containers. The railcar would include typical inter-modal load-locks which are evenly spaced down to chassis of the railcar. The container should be constructed of materials wide enough to keep the overall loaded weight of the container under currently regulated railroad weight guidelines. Additionally, it must be strong enough to bear the load of the loaded container. This development allows sand mines to load proppant directly into a container 2 to speed up the loading process. It also eliminates the need to build a silo storage at the mine site. Once the container arrives at its designated location or region, trans-load processes to pneumatic trailers, silos or flat storage, are thus eliminated.

In addition, embodiments of the invention include improved delivery system that can be used at the well-site. The support structure 60 includes a fabricated steel frame upon which multiple containers can be positioned. The containers lock into receptacles that secure the containers to the frame. The container will then sit above a conveying system that delivers the proppant from the container as the gate is opened to a master-conveying belt. The cradle is outfitted with a hydraulic system which can control the opening and closing of the gates. The containers of embodiments of the present invention can be combined as an attachment or cartridge compatible with existing devices known as SAND KINGS™, SAND CHIEFS™ and SAND DRAGONS™. By replacing existing hoppers on these devices with the removable containers of the present invention, even greater efficiencies can be attained in the proppant delivery process.

The conveying system of embodiments of the present invention is an alternative method of delivering proppant from the container to the blender belt for the mixing unit once delivered to the well-site. The conveying system of the present invention provides all of the functionality commonly seen in the SAND MASTER™, SAND KING™, SAND DRAGON™, SAND MOVE™, etc. As such, embodiments allow the flow of sand to be metered onto the conveyor belt through a hydraulic system of flow gates. The container first is lifted into position onto the support structure. The bottom flow gate is received by the receptacle of the hydraulic actuator so as to create a lock between the pin of the gate and the hydraulic system. The hydraulic system then opens the flow gate and the proppant so as to gravity-feed into a hopper located on the support structure. Another set of flow gates associated with the hopper system are then opened by way of another hydraulic system. This allows the proppant to be metered and to flow onto a conveyor belt. The conveyor belt then can deliver the proppant to the blender or the T-Belt. The proppant then can be mixed with other materials in the blender.

Currently, expensive pneumatic bulk trucks are utilized in the delivery of proppant to a well-site. Once on-site, the trucker employs a power take-off unit to "blow" the sand into the sand storage devices. This delivery often takes over one (1) hour to complete. By delivering sand to the well in the ten-foot containers of the present invention, the use of expensive pieces of specialized equipment is eliminated. The container can ride on a standard flatbed, step-deck, low-boy, or other more commonly-used trailer. As such, the embodiment methods are able to tap into a much larger universe of available trucking capacity. This can reduce the transportation costs to the well. While pneumatic trailer deliveries are priced in "round trip" miles, the delivery of the container by a more common piece of equipment (capable of getting a "back-haul") significantly reduces the overall transportation cost. As an example, there is a great need for parts, tools and other wellhead equipment to be taken off the well-site for repair or return to a manufacturer or rental company. The flatbed trailer, now empty, has the ability to accept that load while it is on-site rather than calling in another trucking company to provide that service. The reduced need for "hot-shot" service is another significant value to the service company and ultimately the exploration and production company.

In terms of returning empty containers to the sand distribution facilities, a total of four (4) empty containers can be returned by a single flatbed trailer. This provides a 4:1 level of efficiency in removing the containers from the well-site. Additionally, a forty foot container chassis can be used in the movement of both empty and full containers. The support structure, just like the containers, can be delivered to the well-site by a typical flatbed truck. The support structure could be towed via truck to the site in manner similar to any other trailer.

In addition, because embodiments of the invention employ the ten-foot ISO containers, there is a small footprint for the ISO containers relative to the capacity of sand that they can store. When the containers are stacked three high, the containers can store approximately 135,000 pounds in a footprint of eighty square feet. The available space at the wellhead, and in potential proppant trans-loading facilities, can be extremely limited. As such, embodiments lessen the footprint that is required for a given amount of proppant at such a location.

Because environmental and safety concerns surrounding well-site operations is becoming an increasing concern, it is relevant that embodiments reduce the amount of particulate matter that is released into the air. Proppant currently is delivered to the frac site via pneumatic trailers. Pneumatic pressure is used to pressurize the trailer and then "blow" the material into a sand storage unit. This process creates an immense amount of particulate matter than can then be inhaled by personnel at the frac-site. Additionally, while blowing the sand into the sand storage facility, the sand storage facility must vent the pressurized air to the atmosphere. This creates an even greater exposure to particulate matter. The constant need to take delivery of proppant on-site creates a constant environment of dust and small particles in the air. Because embodiments eliminate pneumatic deliveries, methods significantly reduce the amount of particulate matter at the frac site. The gravity-feed delivery method from the container to the blender greatly improves the safety of well-site personnel. Moreover, embodiments reduce trucking emissions by reducing the amount of trucks that are being used or waiting. The safety at the wellhead is improved by reducing such truck traffic.

Additional Details on Spine Cars

Figure 18:
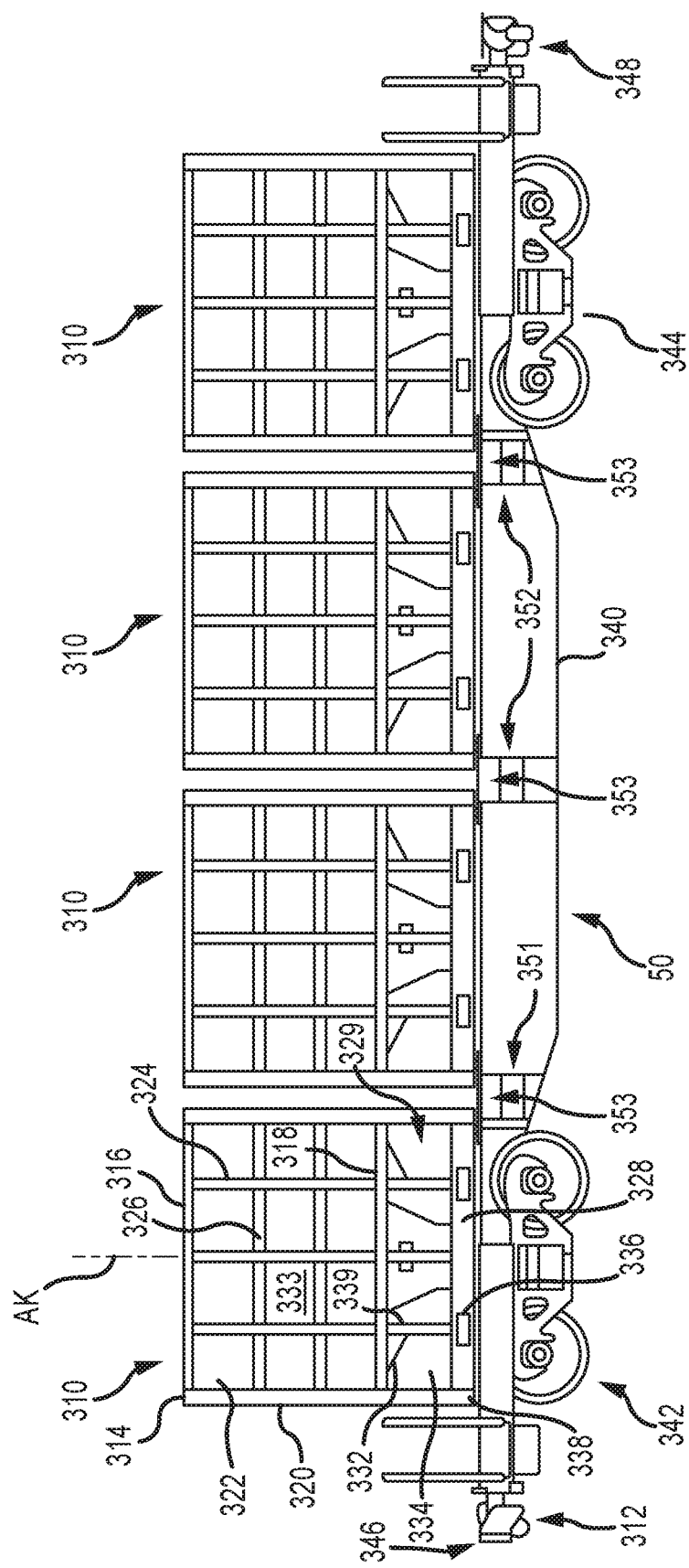
FIG. 18 is a view of a spine car with proppant containers mounted thereon according to an embodiment of the invention.

Shown in a side view in FIG. 18 are examples of containers 310 for housing, shipping, and distributing a flowable material, such as proppant used in wellbore operations. It will be understood that the containers 310 shown in FIG. 18 can be, for example, structured substantially similarly to container 2 discussed elsewhere in the specification, including with reference to FIG. 1 for example. The same is true for containers 110, 112, 114, and 116 discussed with reference to FIGS. 16 and 17. For purposes of discussing FIGS. 18 and 19, however, Applicant makes reference to container 310. The containers 310 are shown set onto a railcar 312 for transportation along a railway (not shown). While a total of four containers 310 are illustrated on the railcar 312, a greater or lesser number of containers 310 can be on the railcar 312. Each of the example containers 310 includes a frame 314 that includes upper joists 316, which are elongate members shown joined end-to-end to define a rectangle at an upper end of frame 312. In the illustrated embodiment, the containers 310 are box-like members having side surfaces and an upper surface, and where the surfaces generally are rectangular and planar. Lower joists 318, similar to upper joists 316, are shown disposed axially away from upper joists 216. Elongate vertical posts 320 connect to the upper and lower joists 316, 318 at corners formed where the members of the joists 316, 318 join end to end. Planar sidewalls 322 span across the space formed between the adjacent joists 316, 318 and adjacent posts 320. In the example of FIG. 18, adjacent sidewalls 322 join at their respective vertical edges.

Further provided on the containers 310 are vertical support ribs 324 shown extending along the outer surfaces of the sidewalls 322 between the upper and lower joists 316, 318; ribs 324 are laterally spaced apart from one another and the posts 320. Horizontal support ribs 326 are depicted that horizontally extend between adjacent posts 320 and that are vertically spaced apart from one another. In the example of FIG. 18, the horizontal support ribs 326 are disposed generally transverse to the horizontal support ribs 324, and are set between the vertical support ribs 324 and the sidewalls 322. Support ribs 324, 326 are elongate members that are laterally spaced apart from one another and in an example provide structural support for the sidewalls 322 and resist radially projecting outward forces resulting from flowable material, such as proppant, contained within the sidewalls 322.

A lower end of the frame 314 includes a girder 328, which includes a series of elongate members that are joined end-to-end to form a generally rectangular assembly. The lower ends of the posts 320 connect to the girder 328 at corners of the girder 328 defined where the members are joined. As shown in FIG. 18, the girder 328 is spaced axially away from the lower joists 318 on a side opposite from the upper joists 316. Lower ends of the sidewalls 322 terminate at the lower joists 318 thereby defining a space 329 between the lower joists 318 and girder 328. Vertical beams 330 are provided along the periphery of the space 329 and which extend vertically between the lower joists 318 and girder 328. Connected to the lower ends of the sidewalls 322 is a lower wall 332, which slopes downward with distance away from the sidewalls 322 to create a generally frusto-conical configuration. The combination of the sidewalls 322 and lower wall 332 define a container 333 for the storage and transportation of flowable material, e.g., proppant and the like. An opening, discussed above is optionally formed axially through the lower wall 332 for allowing material to flow from the container 333. An optional hatch, discussed above, is provided in the opening for selectively dispensing material contained from within the container 333. Support webs 334 are shown disposed in the space 329 and at angular locations around an axis $A_X$ of the container 333 and that provide support for the lower wall 332. Upper surfaces of the support webs 334 depend axially downward with distance away from the sidewalls 322 along a path complementary to the slope of the lower wall 332. The support webs 334 are generally planar and have elongate sides oriented generally vertically, and which extend radially from axis $A_X$. Further illustrated in FIG. 18 are openings formed laterally through the girder 328 that define slots 336, and which selectively receive tines of a forklift therein so that the containers 310 can be lifted and moved, such as to and from the railcar 312. Example materials for the components of the containers 310 include metals, metal alloys, composites, and combinations thereof.

Still referring to FIG. 18, the example of the railcar 312 illustrated is what is commonly referred to as a "spine car", and which includes an elongated spine member 340 oriented along the length of the railcar 312. Further included with the railcar 312 are forward and rear wheels 342, 344 shown mounted to a lower surface of the spine member 340 so the railcar 312 can negotiate along rails. Forward and rear couplers 346, 348 are illustrated provided respectively on the forward and aft ends of the spine member 340 and for coupling to other railcars. As shown, a height of the spine member 340 increases at a mid-section 350 of the spine member 340. Reinforcing structures $351_1$, $351_2$, 352 are strategically located on the spine member 340 at locations where the height of the spine member 340 increases, and approximately at a center of the spine member 340. Alternatively, the reinforcing structures $351_1$, $351_2$, 352 span the length of the spine member 340 where adjacent mounting posts 338 are disposed.

FIG. 19 illustrates in a plan view an example of the railcar 312 without the containers 310 (FIG. 18) mounted thereon. In this example, different positions of the forward wheels 342 are illustrated in phantom view and depict a pivotal range of motion of the forward wheels 342. Here bolsters 353 are shown mounted on an upper surface of the spine member 340, where the bolsters 353 extend generally transverse to the spine member 340 and project outward past the lateral sides of the spine member 340. Bolsters 353 each include an elongate cross beam 354 that transversely couples to the spine member 340 and which provides structural support on which the containers 310 are selectively mounted. Optional top plates 356 mount on an upper surface on opposing ends of each cross beam 354, and on a side opposite the spine member 340. Each top plate 356 as illustrated is generally planar, and has a width that increases at a distance away from opposing ends of each cross beam 354. The wider and narrower portions of the top plates 356 are wider than the cross beam 354. The top plates 356 on each cross beam 354 are spaced laterally away from one another. The mounting posts 338 attach to upper surfaces of the top plates and are located proximate the outer terminal ends of the cross beams 354. Additional bolsters 358 are shown on the spine member 340, and which are proximate to opposing ends of the spine member 340. Bolsters 358 each include an elongate beam 360 mounted to the spine member 340 and oriented generally transverse to the spine member 340; where opposing ends of the beam 360 extends outward past lateral sides of the spine member 340. The beam 360 has a generally consistent width along its length. A top plate 362 is provided on the beam 360 and on which mounting posts 338 are attached.

FIG. 19, shown in a side view is an example of an end of bolster 353 taken along lines 3-3. In this example beam 354 has a vertical thickness that increases proximate its attachment to spine member 340, thereby enhancing structural support for mounting cargo thereon. Further illustrated is an example of a receptacle 364 that projects axially through an end of beam 354 and that selectively receives the mounting posts 338. FIG. 21 shows in side view an example of an end of bolster 358 taken along lines 4-4. Here, bolster 358 has a generally constant thickness along its length, and includes a receptacle 366 proximate its terminal end. Referring back to FIG. 19, landings are provided on opposing ends of the spine member 340 and past bolters 348. Grates 368, 370 are provided on the landings for supporting operational personnel when on the railcar 312.

In one example, the containers 310 have sides with a length of about 310 feet in length and are about 10 feet in height. Alternatively, the railcar 312 has a gross rail load of 263,000 pounds. An example design specification of the railcar 312 is provided in "AAR Specifications for Design, Fabrication, and Construction of Freight Cars, M-1001", which is incorporated herein in its entirety. In an alternative, limiting dimensions are designed to AAR Plate B. Optionally, the railcar 312 is designed to comply with AAR Interchange Rules and D.O.T. requirements and hast light weighing and stenciling requirements of AAR Interchange Rule 70. In an example, parts of the railcar 312 are made and assembled using gauges and templates for interchangeability. The following are optional dimensions, length over end sills—45'-10½"; width over end sills—8'-6½", extreme width over end handgrabs—9'-5½"; length over coupler pulling faces—49'-2"; length over strikers—46'-6½"; truck gauge—4'-8½"; length center to center of bolsters (truck centers)—32'-2"; truck wheel base—5'-10"; total wheel base—38'-0"; height top of rail to top of end ladder stile—6'-3½"; extreme height to top of sand container—13'-1¼"; height top of rail to center of couplers—2'-10½"; gross rail load—263,000 pounds; load limit (4×55,000 lb containers)—220,000 pounds; light weight of car (estimated) 43,000 pounds; curve negotiability radius: uncoupled—150'; coupled to like car—151'; coupled to 40' base car—175'. Truck castings can be 110-ton, 16" center bowl, and spring grouping suitable for a 286,000 pound gross rail load in accordance with AAR M-976. However, trucks can be sprung for 263,000 pound gross rail load. Side frames can be AAR M-201 Grade B+ cast steel in accordance with AAR Specifications M-203 and M-210. The side frames can be narrow pedestal type and have integral unit brake beam guides. Column guides can have wear plates secured with SAE J429 Grade 8 fasteners. Bolsters can be AAR M-201 Grade B+ cast steel in accordance with AAR Specification M-202 and M-210, with 1¾ inch×16 inch finished bowl, with 2 inch welded steel vertical wear ring, designed for loose manganese steel or polymer horizontal wear plate. The center plate bearing surface can be machined. Roller bearing adapters can be for 6½"×9" Class K bearings and narrow pedestal side frames. Examples exist without heat indicators. The thrust shoulders can be hardened. Roller bearings can be NFL type for 6½"×9" journals. Axles can have a nominal 100-ton capacity with 6½"×9" journals, in accordance with AAR Specification M-101, latest revision, Class K, Grade F. Wheels in an example are 36", AAR H-36 or CH-36, one wear, Class C. Side bearings can be constant contact metal cap long travel type, and optionally attached to bolster with SAE J429 Grade 8 bolts and IFI-100 Grade C locknuts. Center pins in an example are 1¾" diameter A36 steel.

In a further optional embodiment, the center sill is a fishbelly box type with the bottom cover plate at the center is ½ inch ASTM A572 GR50 steel with Charpy V-notch 15 ft-lb at −20° F. The bottom cover plate at the ends can be ¾ inch ASTM A572 GR50 steel with Charpy V-notch 15 ft-lb at −20° F. The top cover can be ⅞ inch ASTM A572 GR50 steel from striker to striker. In an embodiment, the webs at the ends are ⅝ inch ASTM A572 GR60 steel with Charpy V-notch 15 ft-lb at −20° F.; and the webs in the center are 5/16 inch ASTM A572 GR50 steel. Center sill separators at pedestals can be ½ inch ASTM A572 GR50 steel plate. Body bolsters in one example are built-up welded design consisting of double webs of ⅜ inch ASTM A572 GR50. Top cover plates are optionally ⅜ inch ASTM A572 GR60 steel with a Charpy V-Notch value of 15 ft-lb at −20° F. and extend just past the truck side bearings. Alternatively, bottom cover plates are of ⅜ inch ASTM A572 GR50. Bolster tie plates can be ASTM A572 GR50 steel, welded to bottom cover plates and center sill flanges. In an alternative, web stiffeners are ASTM A572 GR50 steel located at critical changes in section on bolsters. Pedestals, can be at three locations per car, are built-up weld design, with 5/16 inch ASTM A572 GR50 steel pedestal webs welded to center sill and pedestal end plate. Pedestals are optionally cantilevered off of the center sill. In an example, pedestal top cover plates are ⅜ inch ASTM A572 GR50 steel and extend from pedestal end plate to center sill top cover plate and are welded to pedestal webs and top of center sill. Pedestal bottom cover plates can be ⅜ inch ASTM A572 GR50 steel and extend from center sill web to pedestal end plates and are welded to crossbearer webs. Pedestal Top cover plate can be reinforced with ⅝ inch ASTM A572 GR50 in the area where the IBC connectors connect the container to the pedestal. In one example, crossties two per car are provided that are fabricated from 3/8 ASTM A572 GR50 steel extending from center sill web to end sill, and which are welded to center sill and end sill webs and flanges. End sills can be formed from 5/16 inch ASTM A572 GR50 steel and are welded to center sill and crossties. Body side bearings are optionally provided that are 5 inch wide of forged steel to Brinell hardness 277-341 and are secured to steel fillers and bolster bottom cover plates with two (2) ¾ inch Grade 8 square neck plow bolts, ASTM F-436 hardened washers and ASTM A563 Grade C hex nuts, torqued to 300 ft-lbs. Nut can be tack welded to bolt after torquing. Pedestals can be reinforced for jacking fully loaded car off the trucks. Couplers can be bottom operating AAR EF511CE Reduced Slack of Grade E steel. In an example, coupler release rigging is standard for bottom operating coupler, and yokes can be SY45AE of Grade E steel. Draft gear carriers can be lockbolted to center sill, and draft gears can be AAR M-901E with Y44 followers. In an example, design and installation of the brake system is in accordance with AAR Standards S-400, S-401, S-475 and AAR Field Manual Rule 88 A.2.r; and can be tested in accordance with AAR Standard S-486. The car can be equipped with one 40% empty load device with downstream proportioning valve. Extra strong steel pipe may be used for all piping except for short nipples which are Sch 40. Piping can be secured to underframe of car with wedge type pipe anchors. In an example, maximum unsupported span is 8'-0". Individual pipes can be formed to accurate shape before application to car. Pipe connections can be made with either adjustable (swivel) socket welded fittings or all welded couplings. In angle cock embodiments, connections can be screw type. Branch pipe tee can be an all-welded application for 1¼" pipe and bolted flange fitting for 1" pipe. Braking ratio can be in accordance with D.O.T. requirements and AAR Interchange Rules. Optionally included is an AAR 1993 Group N handbrake that is vertical wheel, non-spin, quick release type (long handle) with 1966 bell crank. Ten inch by twelve inch (10"×12") cylinder piston travel for the brake can be in accordance with Rule 3 of the AAR Interchange Rules. Group E double acting slack adjuster with double jaws can be applied. Example brake shoes are two inch (2") high-friction composition type, AAR H-4 designation. Example brake beams are AAR Standard No. 24, angle corrected, with metal shoe rejection lugs. In an embodiment, brake pins are C1050 steel turned or drop forged and induction hardened to Rockwell C60-63 to a depth of 0.080"-0.100", where minimum diameter of pins can be 1³⁄₃₂". Brake pins can be secured with ⅜" standard cotter keys. Brake shoe keys can be forged steel spring type.

Further example embodiments include truck levers and connections that are forged steel design. Body levers can be fabricated by car builder from 1" flame cut ASTM A36 steel. Example brake rods are ⅞ inch diameter ASTM A36 steel and brake rod supports can be the closed loop design equipped with non-metallic wear protectors. An example stainless steel badge plate is provided at one per car, showing brake lever dimensions and cylinder size is applied to car in a visible location near air brake cylinder. Ball type angle cocks can be used that are threaded onto a nipple which is secured to brake pipe with a socket weld by screwed coupling. An example release rod has a ½ inch diameter ASTM A36 steel with closed loop ends and arranged for in-line operation of the brake cylinder release valve. Brake reservoir can be an all welded fabricated design. Brake beam wear plates can be all metal type UW-116. Safety appliances can comply with AAR and FRA requirements and the first car may be inspected by an FRA inspector. Handholds can be ¾" round bar forgings of ASTM A576 GR1015 steel. Ladders can have handholds fastened to L2×2×3/16 ASTM A36 steel stiles with ⅝ inch fasteners. Ladder assemblies can be fastened to car body with lockbolts or threaded bolts and nuts as applicable. Sill steps can be ½ inch×2 inch ASTM A36 steel and optionally located at each corner of car and fastened to side sill with ⅝ inch fasteners. End platforms are in one example 19½"× 100" and are mounted on both ends of the car. Steel surfaces can be cleaned free of rust, scale, dirt, grease, and moisture. The sides, ends, and underframes can be blasted to a commercial quality finish (SSPC SP-6) before painting. Air valves, hand brakes, slack adjusters, etc., are optionally not removed during blasting but are adequately protected. Metal-to-metal lap joints or surfaces which are inaccessible and open to the atmosphere after assembly can be painted with weldable primer before assembling. Exterior surfaces of sides and ends can be painted with waterborne acrylic emulsion, four mils minimum dry-film thickness. All paints can be lead free in accordance with Gunderson paint specifications for all railcars. The reporting marks and car numbers can be steel stamped on the BL side of the center sill inboard of the no. 2 axle and on the side sill at the BR corner of the car. Stenciling can be in accordance with AAR Manual of Standards and Recommended Practices, Section "L", and the customer's requirements and can be based on 263,000 pound gross rail load. Adhesive backed decals can be manufactured in accordance with AAR Specification M-947. Trucks, as received from truck manufacturer, can have one (1) coat of primer and can be stenciled with customer's reporting marks and car number on the right hand tension member of the side frames. Route card boards, two per car, can be all metal type welded to the car side. Route card boards can be painted same color as exterior car body. Railcar 12 can be equipped with two (2) AEI (Automatic Equipment Identification) tags. Bolts and nuts can be threaded to coarse thread series in accordance with the Unified Screw Thread Standard Class 2A External and Class 2B Internal Threads for Class 2 fit of the American Standard for Screw Threads. Bolt heads can be in accordance with American Standard Regular Hexagon. Nuts can be American Standard per ASTM Specification A563 GR A or stronger, unless otherwise specified. High-strength bolts can be ASTM Specification A325 or stronger, unless otherwise specified. Self-locking nuts meeting AAR Specification M-922 can be used on bolts securing control valve, combined reservoirs, brake cylinder, retainer valve, and angle cock "U" bolts to car body supports. Self-locking cap screws meeting AAR Specification M-922 can be used for securing all flanged pipe fittings on reservoir, ABDW valve, brake cylinder and retainer valve. Riveting and lock bolting applications can be in accordance with Chapter V of the AAR Manual of Standards and Recommended Practices, Section C—Part II. Welding practice can be in accordance with Chapter V of the AAR Manual of Standards and Recommended Practices, Section C—Part II.

Additional Details on Transportation

Figure 22:
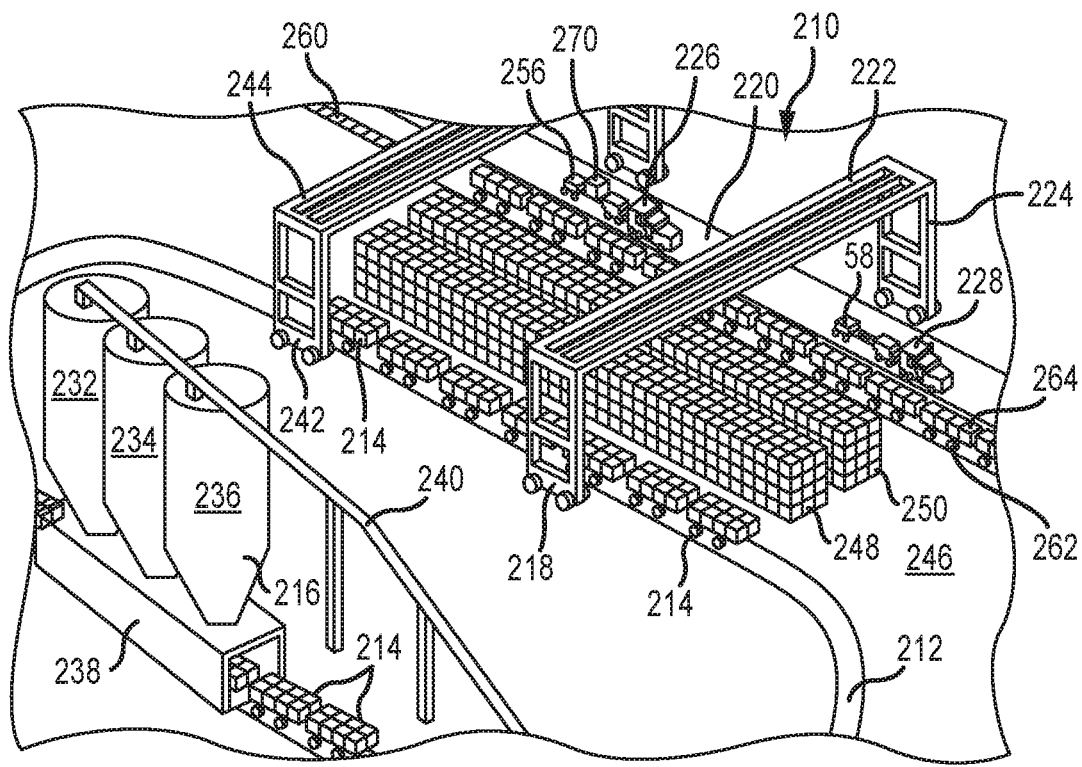
FIG. 22 is a perspective view of a system for the delivery of proppant in accordance with an embodiment of the invention.

Referring to FIG. 22, there is shown the proppant delivery system 210 in accordance with an embodiment of the invention. The proppant delivery 210 includes a track 212 formed in the nature of a circuit. A container-hauling trolley 214 is movably positioned on the track 212. A proppant supply station 216 is positioned on the track 212. The container-hauling trolley 214 is movable along the track 212 to a location below the proppant supply station 216. A proppant discharge station 218 is positioned adjacent to another portion of the track 212. The container-hauling trolley 214 is movable on the track to a location adjacent to the proppant discharge station 218. A proppant transport pathway 220 extends in spaced relationship to the track 212. A crane 222 has a portion adjacent to the proppant discharge station 218 and another portion adjacent to the container transport pathway 220. The crane 222 is suitable for moving a proppant container from the proppant discharge station 218 toward the container transport pathway 20.

In the exemplary embodiment of FIG. 22, the crane is a gantry crane 224. As such, the gantry crane 224 has one portion located directly above the proppant discharge station 218 and another portion located above the container transport pathway 220.

The container transport pathway is illustrated in FIG. 22 in the form of a road. A plurality of trucks 226 and 228 are movably positioned on the container transport pathway 220. The trucks 226 and 228 are movable between a location below the gantry crane 224 to a location at a well that uses the proppant from the proppant container. Truck 226 is illustrated as having a container 230 positioned thereon.

The proppant supply station 216 includes a plurality of silos 232, 234 and 236 that are arranged above a loading bay 238. The loading bay 238 is positioned over the track 212. Various trolleys 214 are illustrated as passing through the interior of the loading bay 238. Each of the trolleys 214 includes a plurality of containers thereon. Each of the containers on the trolleys 214 will open at the upper end thereof. As such, proppant in the silos 232, 234 and 236 can be directed, by gravity discharge, into each of the proppant containers on the trolleys 214.

A conveyor 240 can extend from a location away from the track 212 toward the upper end of each of the silos 232, 234 and 236. As such, conveyor 240 can be utilized so as to deliver bulk amounts of dry proppant into the silos. As such, the proppant can be stored in the silo for as long as required. When a demand for proppant is required, then the trolley 214 can move along the track 212 so as to move into the loading bay 238. The silos 232, 234 and 236 can then be opened so as to deliver proppant into each of the containers on the trolleys. After the containers are filled, they can move along the track 212 toward the proppant discharge station 218. Typically, the conveyor 240 will transfer the dried proppant from a drying process and a grain separation process toward the silos. As such, the processes proppant is rapidly containerized so as to avoid any damaging exposure to the elements.

It can be seen in FIG. 22 that there is another proppant discharge station 242 that is provided. In other words, there is another gantry crane 244 that is provided at the proppant discharge station 242. The gantry crane 244 has one portion that overlies the track 212 and another portion that overlies the container transport pathway 220. As such, the gantry crane 244 can suitably lift a container from the trolley 214 and either move the trolley to a location on the earth 46 or to a location on top of another container on the inventory stack of containers 248. The gantry crane 244 can also be used so as to move the empty container 230 from the truck 226 onto an inventory stack of empty containers 250. It can also be used so as to place such a container on to the earth. As such, the area beneath the gantry cranes 224 and 244 will include an inventory stack of proppant-filled containers 244 and an inventory stack of empty containers 250. The inventory stack of filled containers 248 and is located adjacent to the track 212. The inventory stack 50 of empty containers is illustrated as located closer to the container transport pathway 220. Importantly, in the present invention, these inventory stacks 248 and 250 can be interchangeable depending on the desires and requirements of the particular system employed. The proppant, after it is mined, dried and grain sized separated, can remain stored in the inventory stack 250 so as to avoid exposure to the elements.

The truck 226 is utilized for the delivery of empty proppant containers. As such, there is an empty container 230 located on a forward portion of the bed of the chassis of the truck 226 and empty container 252 located on a rearward portion of the chassis of the truck 226. Because the containers 230 and 256 are empty, the truck 226 can be utilized so as to haul a pair of containers, and possibly more containers. Once the container is filled, however, the truck 228 will have the container 258 positioned forward of the rear wheels of the bed of the chassis of the truck 228. As such, truck 228 can be utilized so as to deliver a filled container to a well site. The chassis of truck 228 can be of a type described in U.S. Design Pat. Nos. D694,670 and D688,597. This chassis was further described in co-pending U.S. patent application Ser. No. 13/854,405, to the present application.

These gantry cranes 224 and 244 can span significant distances. As such, they can be configured so as to extend for the distance between the track 212 and the container transport pathway 20. Additionally, each of the gantries 224 and 244 is supported on wheels. As such, they can be suitably moved so as to grasp any of the containers in the stacks 248 and 250 therebelow. If necessary, the gantry 244 can be utilized so as to remove and stack empty containers into the stack 250. The gantry 224 can be utilized so as to move filled containers into the inventory stack 248. The gantry 224 can further be utilized so as to remove a filled container from the trolley 214 at the discharge station 218 and to move the container from the trolley 214 to the inventory stack 248 of filled containers. The gantry 224 could also be utilized so as to remove an empty container 230 from the chassis of the truck 226 so as to place such a container on the inventory stack 250 of empty containers. Also, each of the gantries 224 and 244 can be configured or interchanges so as to carry out any or all of the above operations. In fact, in the concept of the present invention, a single gantry could be utilized for all of the purposes intended herein.

In FIG. 22, it can be seen that there is a railroad track 260 that is positioned adjacent to the container transport pathway 220. The railroad tracks 260 have a plurality of railcars 262 rollably positioned thereon. As such, within the concept of the present invention, each of the railcars 262 can be utilized so as to carry containers 264 on the bed thereof. This type of railcar was shown in U.S. Design Pat. No. D703,585 to the present applicant. As such, either the gantries 224 and 244 can be suitably moved, or the railcars can be moved, so that either the filled containers can be placed on the railcars or the empty containers can be removed from the railcars. By way of example, the gantry 244 can be utilized so as to lift an empty container from the railcar and place such an empty container on the inventory stack 250. The gantry 244 also can be utilized so as to move such an empty container from the inventory stack 250 to a trolley 214. As such, the container would be suitable for movement by the trolley 214 to a location within the proppant supply station 216. Additionally, the gantry 224 could be utilized so as to remove the filled container from one of the trolleys 244 and place the filled container on the inventory stack 248. Gantry 224 can also be utilized so as to remove the filled container from the inventory stack 48 and to place the container onto the railcar 262.

In embodiments, the container transport pathway 220 can be utilized for either the delivery of empty proppant containers and/or for the delivery of filled proppant containers to the well site. If necessary, separate pathways could be utilized for the purpose of delivery of the empty proppant containers and for the delivery of filled containers. Similarly, the railroad tracks 60 can be utilized either for the delivery of empty proppant containers or delivery of filled proppant containers to the well site. Additionally, or alternatively, a separate rail line 60 could also be used for these alternate purposes.

Figure 23:
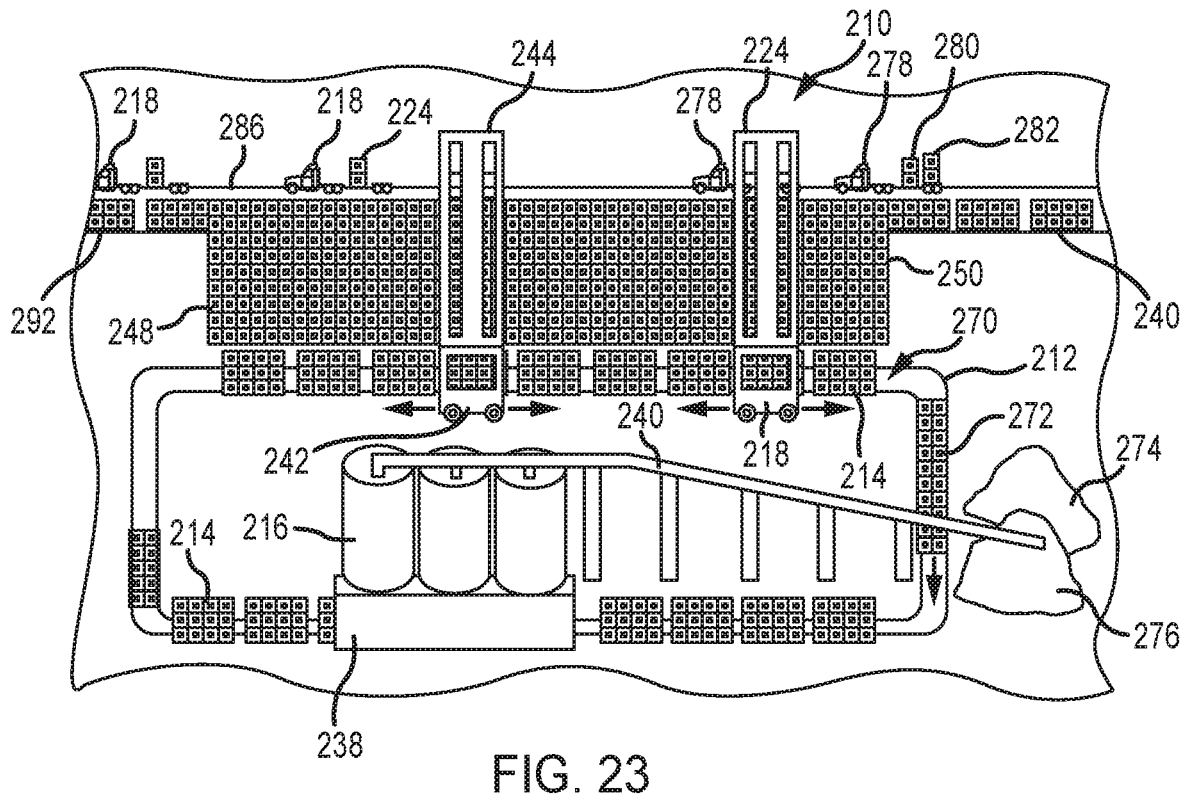
FIG. 23 is a diagrammatic illustration of a proppant delivery system according to an embodiment of the invention.

FIG. 23 is another view showing the operation of embodiments. In particular, the system 210 includes a track 212. It can be seen that the track 212 is in the form of a circuit which extends from the proppant supply station 16 to the proppant discharge stations 218 and 242. Each of the trolleys 214 is illustrated as positioned on the track 212. In FIG. 23, the arrow 270 illustrates the direction of travel of the trolleys 214. In particular, the trolley 272 having an unfilled container travels along the track 212 so as to enter the loading bay 238. Proppant is discharged from the silos of the proppant supply station 216 into the empty containers on the trolley 272. As such, trolley 272 can move along the track 212 so as to enter the proppant discharge station 242. As a result, the gantry 244 can be utilized so as to lift the filled proppant containers from the trolley 272 and place the proppant containers on the inventory stack 248.

In FIG. 23, a proppant processing plant 271 is shown. The proppant processing plant 271 will process the raw proppant, dry the proppant, and separate proppant in accordance with grain size and quality. The processed proppant is delivered to a pile 276 along a conveyor 273. The raw proppant pile 274 is shown also in FIG. 23. This raw proppant can be transported to the proppant processing plant along another conveyor. The processed proppant pile 276 is positioned adjacent to the track 212. Conveyor 240 is utilized so as to deliver the processed proppant into each of the silos 216. The processed proppant can further be dried in the silos 216. The raw unprocessed proppant pile 274 can be delivered to a location adjacent the proppant processing plant 271.

In FIG. 23, there are piles of proppant 274 and 276 that have been created at the mine site in a location adjacent to the track 212. Conveyor 240 is utilized so as to deliver the bulk proppant from the piles 274 and 276 into each of the silos 216. The bulk proppant 274 and 276 can be delivered by railcars to such a location.

FIG. 23 further shows a truck 278. Truck 278 has empty proppant containers 280 and 282 on the chassis thereof. Once again, because the containers 280 and 282 are empty, the truck 278 can be utilized for the purpose of delivering more than one empty proppant container. The gantry 224 is utilized so as to remove the empty containers 280 and 282 from the chassis of the truck 278 and to place such empty containers on the inventory stack 250 of empty containers. Truck 78 will then have an empty chassis. Truck 278 can then move to the proppant discharge station 242 such that the gantry 224 can load a filled container of proppant from the inventory stack 228 onto the bed of the chassis of the truck. Truck 278 is now illustrated as having a filled container 284 positioned on the bed of the chassis of the truck. Since the filled container 284 is extremely heavy, the truck 278 is only capable of transporting a single container. This filled container is illustrated as located centrally on the bed of the trailer forward to the rear wheels. Truck 278 is then illustrated as moving along the road 86 toward the mine with a filled container of proppant.

FIG. 23 further shows that there is a railcar 290 with several empty proppant containers thereon. Once again, the gantry 224 can be utilized so as to remove the empty container from the railcar 290 and place such an empty container on the inventory stack 50. The railcar then can moved to the discharge station 242 such that the gantry 244 can place a filled container of proppant from the inventory stack 248 onto the bed of the railroad car 290. The railroad car 290 can then move along the track 292 toward an intended destination.

If necessary in embodiments, each of the gantries 224 and 244, or only one of the gantries 224 and 244, can be utilized so as to deliver an empty proppant container from a vehicle on the roadway 220 directly to the trolley 214. Also, each of the gantries 224 and 244 could be utilized so as to deliver a filled container of proppant from the trolley 214 directly onto the bed of the chassis of the truck or the bed of the railroad car. This situation would occur when supplies of the inventory containers are exhausted.

In embodiments, the gantries 224 and 244 are intermodal gantry cranes that are used to manipulate empty and full proppant containers. These proppant containers can be moved to and from truck beds, railcars, trolley cars, full inventory stacks, and empty inventory stacks. The track 212 is a small loop track that guides the trolleys carrying the empty proppant containers into a loading bay to be loaded and then moves the filled proppant containers below the gantry cranes. As such, the full proppant containers are positioned so that they can be moved to the inventory stack of filled containers. The silos are used to hold the final product of proppant before the product is loaded into the proppant containers. Each of the railcars can be in the nature of a specialized railcar for a specific use in transporting four or more proppant containers on each railroad car. The trailers can be specialized chassis trailers that can be each utilized for transporting two or more empty proppant containers or a single full proppant container. The proppant containers described herein are of a type shown in U.S. Design Pat. Nos. D688,772, D688,351, D688,349, and D688,350. This type of container is also shown in U.S. Pat. Nos. 8,622,251 and 8,505,780, all to the present applicant.

In embodiments, as the empty proppant containers arrive back from the field by either railcar or by truck, the railcars or trucks are positioned on the track or road that runs underneath the gantry cranes. The cranes remove the empty containers from the trucks or railcars to the empty inventory stack. Once the empty containers are removed from the railcars or trucks, the gantry cranes will begin to reload the railcars or trucks from the inventory stack of full containers. The train or trucks will depart from the proppant mine once they are completely reloaded. The filling of the proppant containers by the use of the trolleys can occur simultaneous to the above-described process. A constant flow of empty proppant containers are guided into the loading bay that are filled with proppant from the silos. Once filled, the proppant containers exit the loading bay, and then travel around the trolley track until they are positioned underneath the gantry cranes. These filled proppant containers are then removed from the trolley cars, placed onto the inventory stack of filled containers, and then replaced by empty proppant containers from the inventory stack of empty containers. The replacement empty containers are sent to the loading bay along the track and the trolleys so as to repeat the process.

Figure 24:
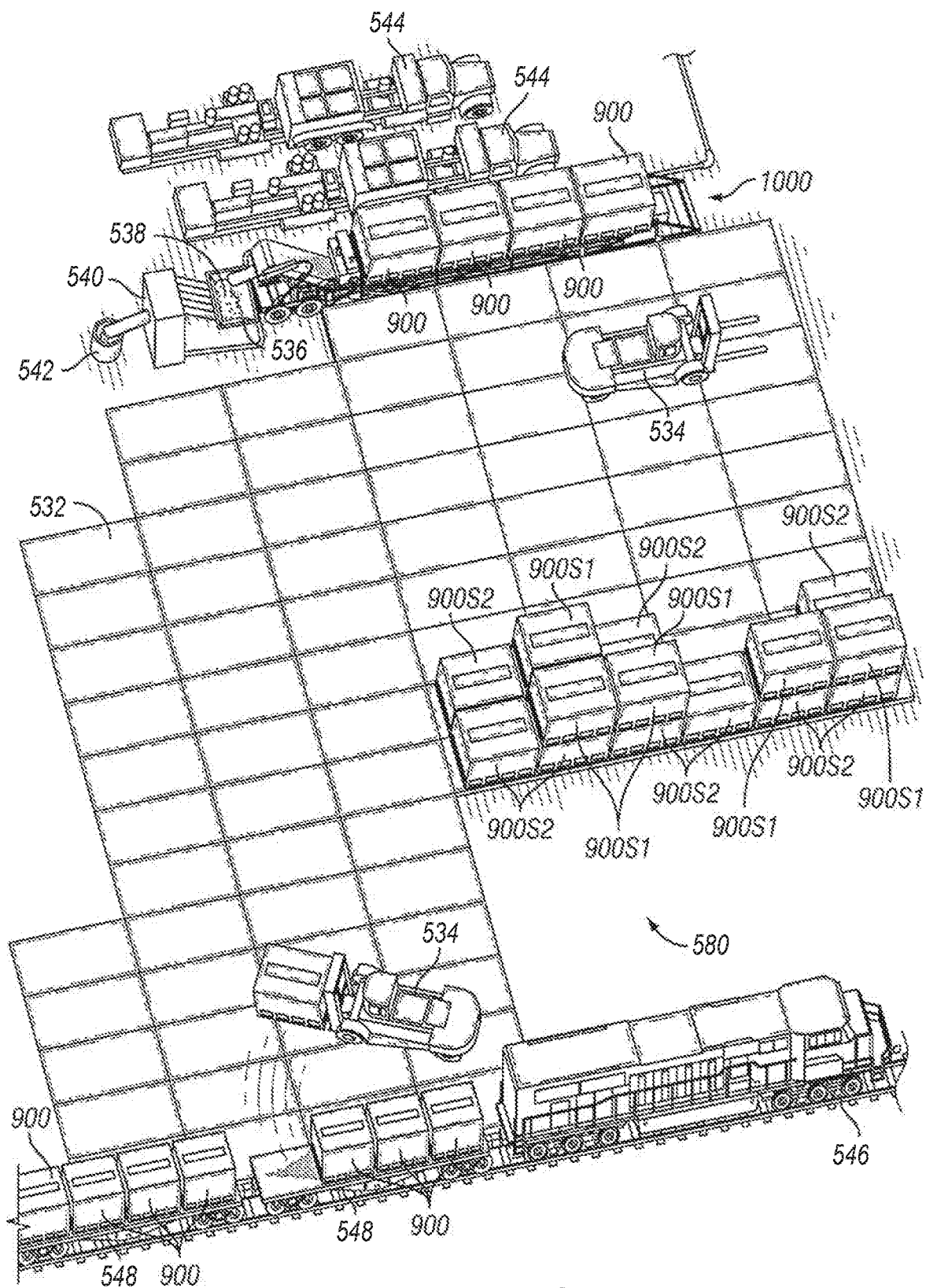
FIG. 24 is an environmental perspective view of a well site for fracking using an embodiment of the system and method according to the present invention.

Embodiments of methods and systems are illustrated at an exemplary well site 530 in FIG. 24. FIG. 24, for example, includes a removable floor 532 made of wooden pallets to facilitate the use of heavy machinery, including one or more forklifts 534, cranes 535, or other hydraulic movers, for loading and unloading containers 900 off of the railroad 46 or eighteen-wheeler trucks 544. The railcars 548 are specially designed to accommodate four containers 900 in a side-by-side arrangement, for example, and containing proppant. The containers 900 are stackable; at the well site 530, containers 900S1 can be stacked on top of other containers 900S2 so as to reduce the footprint of containers 900 at the well site 530 to thereby maximize the space available. Containers 900 can be stacked up to three-high, for example, at the well site 530. Because all the proppant 538 is containerized, the logistics problems of the prior art where trucks and trains would demurrage and to unload proppant 538 at the well site 530 is eliminated. The well sites 530 also can include blenders 536 for combining proppant 538, which can comprise mined silica sand, but potentially comprise coated or treated sand, ceramic, or bauxite, with fracking fluids generally of a proprietary blend. The well site also can include fracking machinery 540 to pump the proppant 538 and other fracking fluids into the wellbore 542 at high pressure. Embodiments of systems, for example, can result in the transfer of fracking sand for depositing into a blender 36 or other desired location at the well site 30 with a reduced risk of the production and release of silica dust 50 into the air.

Figure 25A:
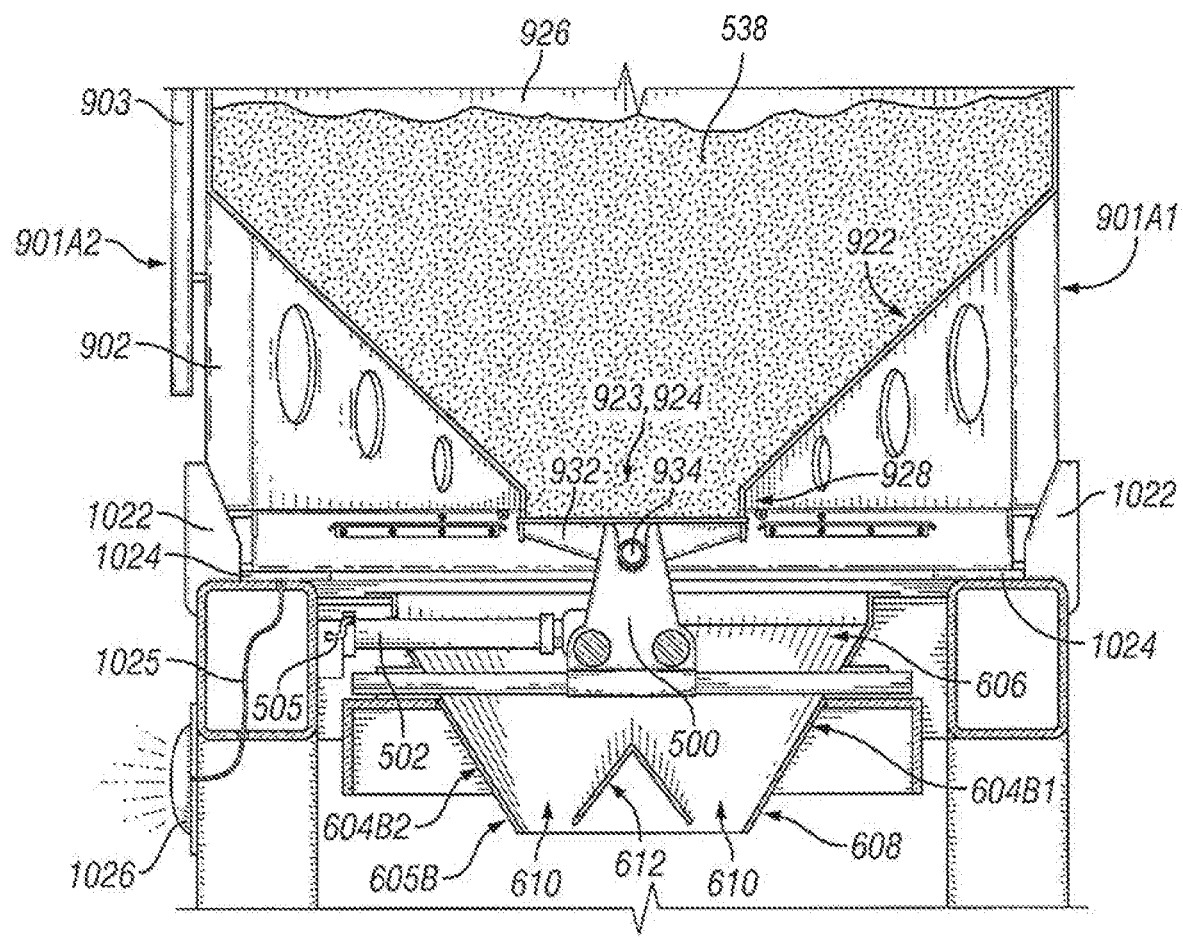
FIG. 25A is a fragmented perspective view of a container having proppant for fracking positioned on a conveyor according to an embodiment of a system and method of the present invention.
Figure 25B:
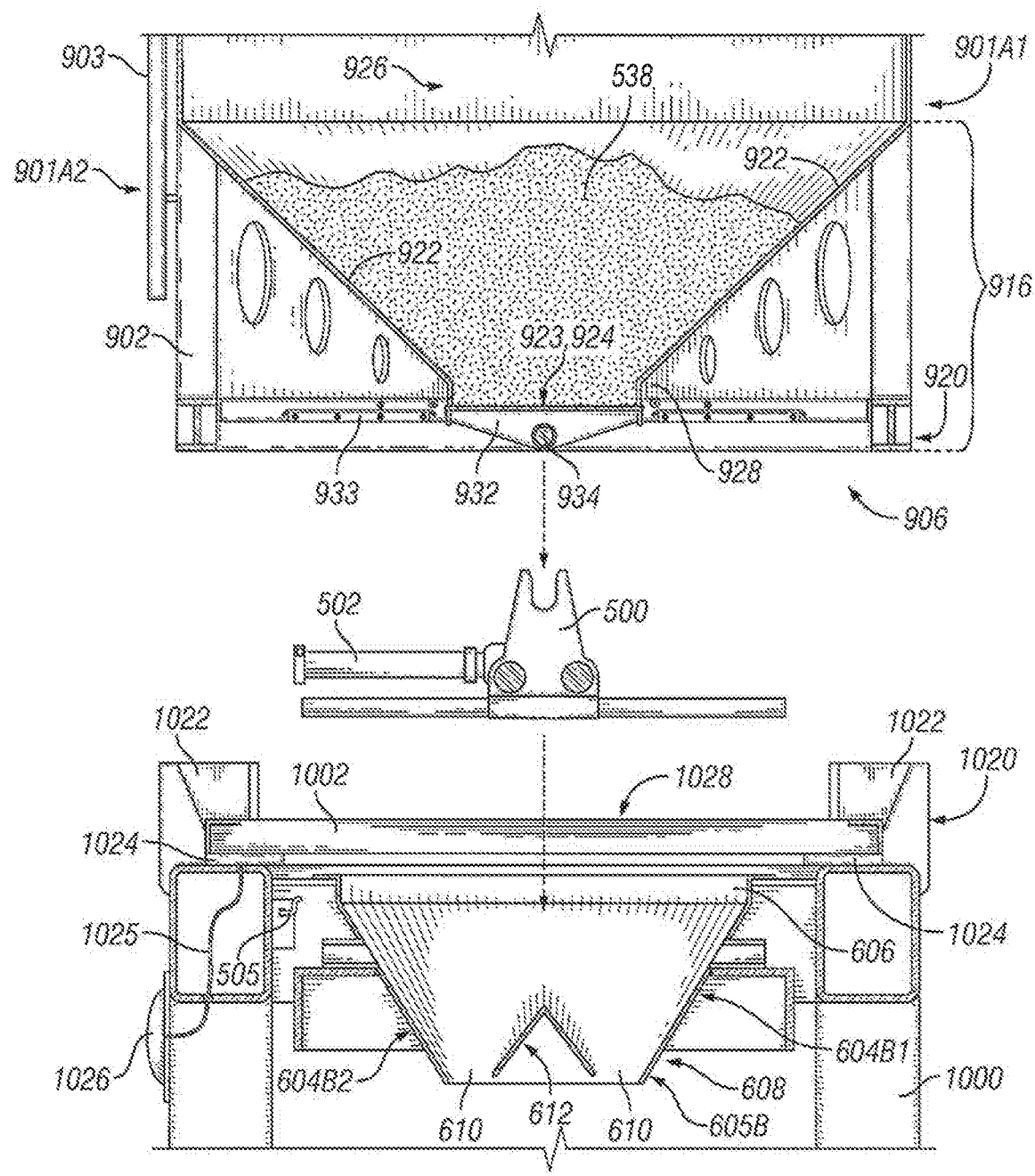
FIG. 25B is an exploded perspective view of FIG. 5A of a container having proppant for fracking positioned on the conveyor according to an embodiment of a system and method of the present invention.
Figure 25C:
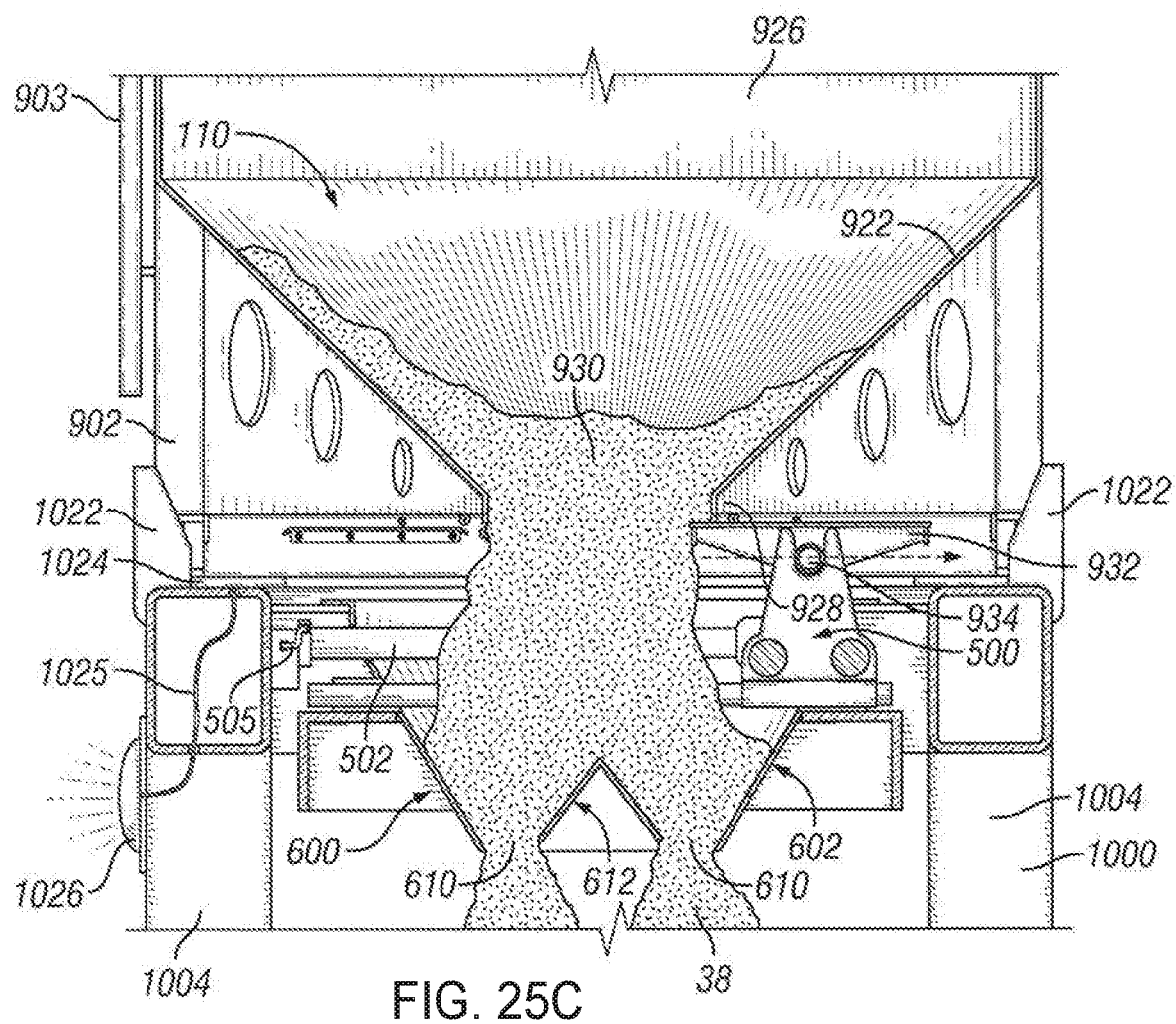
FIG. 25C is a fragmented perspective view of a container having proppant for fracking positioned on a conveyor according to an embodiment of a the system and method of the present invention with portions of the container shown in break-away for clarity.

FIGS. 25A-25C illustrate exemplary cross-section views of containers. Specifics of the funnel structure were discussed above, though various other details are discussed with respect to FIGS. 25A-25C. The funnel structure 918 comprises a plurality of inclined lower inner portions 922 of the container 900. The plurality of inclined lower inner portions 922 is roughly in the center 923 of the bottom 906 and has an opening or openings 924. The plurality of inclined lower inner portions 922 is designed to ensure that when proppant 538 is directed out of the container 900, proppant 5538 flows from the container 900 until it is substantially empty. The inclined lower inner portions 922 of each respective container 900 are inclined inwardly from inner walls 926 of the respective container 900 toward a bottom 906 of the container at an angle 928 of about 31 degrees to about 37 degrees relative to a horizontal plane 920 of the bottom of each respective container 900 when each respective container 900 is level. Experiments, as discussed more thoroughly above, have shown that this angle 928 is particularly effective in the full release of proppant 38 from the interior of the container 900. Any remaining proppant 38 in the container 900, for example, could risk posing a threat to workers in the vicinity of the container 900 during transport of the container 900 to another location. Additionally, because the plurality of inclined lower inner portions 922 is inclined in this respect, proppant 38 does not rush directly out of the interior, as it may otherwise do. Rather, proppant 38 flows along the plurality of inclined lower inner portions 922, creating a sink hole or a funnel 930, toward the one or more openings 924 so as to reduce the production and release of silica dust 50 as proppant 38 flows from the container 900.

A flow gate 932 is positioned within tracks 933 located on the bottom 906 over or adjacent the opening or openings 924 of the inclined lower inner portions 922 of each respective container 900, as shown in FIGS. 9D-9E. The flow gate 932 can be planar and is designed to cover the opening or openings 924. The flow gate 932 may be a metering gate or another structure capable of controlling the flow of proppant 538 from the opening or openings 924 that is known to a person skilled in the art. The flow gate 932 includes a handle 934 positioned outwardly from the flow gate 932. Referring to FIGS. 25A-25C, in an embodiment of the system, for example, the handle 934 of the flow gate 932 is designed to sit in the one or more forks 500 of the conveyor 1000, such that an actuator 502 connected to the forks 500 can move the flow gate 932 to enhance opening or closing the one or more openings 924 of the container 900. For a container 900 of this size and magnitude that holds approximately two tons of proppant 538, the actuator 502 can be hydraulically- or electrically-controlled to enhance opening and closing of the flow gate 932. If hydraulics are used, for example, a plurality of hydraulic pressure hoses 503 can connect the actuator to the one or more engines 710. If electronics are used, for example, a plurality of wires 505 can be used to connect the actuator to the one or more engines 710. Wireless connections are also contemplated. A person of skill in the art would understand the various connections to engines 710 and controls 1017 available for powering the actuator 502. The flow gate 932 can be controlled remotely via the internet, or locally on the well site 530, either by an operator or a machine. This flow gate 932 also controls the rate at which proppant 38 flows from the container 900 to reduce the production and release of silica dust 550 associated with the proppant 538 into the air at the one or more openings 924.

As can be seen in FIGS. 24, 25A, 25C, 26A-62C, the one or more compartments 1002 of the conveyor 1000 can include corners 1022, tracks, lock-and-key connections, and female-and-male connections, for example. These corners 1022, for example, can be made of steel or other similar material. The container 900 need not fit tightly onto each compartment 1002. Instead, for example, the corners 1022 need only to guide the container 900 into position into the compartment 1002 such that the container 900 will not fall off of the conveyor 1000. Alternatively, the container 900 may fit tightly on the compartment 1002. The sheer weight of the container 900, however, would usually prevent the container 900 from moving once it is positioned on the compartment 1002, even without any such corners 1022, and the compartment 1002 need not have any such corners 1022 as described herein. In an embodiment of a system, and as shown in FIG. 24, for example, a forklift 534, crane 535, or other heavy machinery lifts a container 900 having proppant 38 up and over the top of the respective compartment 1002 of the conveyor 1000, comprising steel corners 1022 extending vertically from each respective corner of each respective compartment 1002 of the conveyor 1000, and lowers the container 900 having proppant 538 into place onto the conveyor 1000. The corners 1022 of the compartment 1002 guide the container 900 into place. Referring to FIG. 25C, the respective corners 1022 of the compartments have a plurality of load cells 1024 for determining the weight of each container 900 on each respective compartment 1002 of the conveyor 1000. In an embodiment of the present invention, for example, a load cell 1024 is positioned in each of the four corners of the compartment 1002. These load cells 1024 inform an operator or machine how much proppant 38 is left in the respective container 900 by its weight so the operator or machine knows when to replace the respective empty container 900 with another container 900 filled with proppant 38 at a well site 30. The respective load cells 1024 are in electric or wireless communication via wires 1025 or wirelessly with a light 1026 to indicate to the operator or machine that the container 900 is positioned properly onto the compartment 1002. When a container 900 is positioned properly on the compartment 1002, for example, the light 1026 may change from red to green, for example. It should be understood that a forklift 534 need not lift the respective container 900 up and over the corners 1022 of the compartment 1002 of the conveyor 1000 if alternative structures are used instead of corners 1022. In this way, the forklift 34 could, for example, lift the container 900 up to the height of the top surface 1020 of the conveyor 1000 and slide the container 900 onto the respective compartment 1002.

The conveyor 1000, having a plurality of compartments 1002 adapted to receive containers 900, also can have a plurality of openings 1028 in the top surface 1020 of the conveyor 1000. The plurality of openings 1028 is positioned beneath the respective plurality of containers 900 on the conveyor 1000 such that proppant 538 flowing from each respective container 900 will pass through each respective opening 1028. Each opening 1028 has one or more forks 500 positioned above or adjacent the opening or openings 1028, the one or more forks 500 adapted to receive a handle 934 of a flow gate 932 of a container 900 to engage, contact, or communicate with the corresponding handle 934 of the flow gate 932 of the container 900, as shown in an embodiment depicted in FIGS. 25A-25C. The handle 934 of the flow gate 932, the one or more forks 500, or both, are in electric or wireless communication with the light 1026, along with the respective load cells 1024 of the corners 1022 via wires 1025 or wirelessly, to indicate to an operator or machine that the container 900 is in proper position when the handle 934 of the flow gate 932 is aligned or situated in the one or more forks 500 of the compartment 1002. The variety of connections or contacts to secure or place the container 900 onto the top surface 1020 of the conveyor 1000, such that the actuator 502 can operate the flow gate 932 of the container 900, will be apparent to a person having skill in the art.

Embodiments of the conveyor 1000, for example, also can include a plurality of conveyor hoppers 600 positioned adjacent or beneath the plurality of openings 1028 in the top surface 1020 of the conveyor 1000. The plurality of conveyor hoppers 600 is positioned such that when containers 900 are placed onto the conveyor 1000, each respective conveyor hopper 600 is beneath the flow gate 932 of the one or more openings 924 of each respective container 900. As shown in FIGS. 25A-25C and FIGS. 26A-26C, each respective conveyor hopper 600 can include a plurality of inclined sides 602 to form a receptacle or funnel structure for proppant 38 to pass into and through as proppant 538 is discharged from each respective container 900 when in operation. The plurality of inclined sides 602 can include a pair of short sides 604A1, 604A2 and a pair of long sides 604B1, 604B2. Based on experimental results, the short sides 604A1-A2 can have a funnel angle 605A or slope of approximately 35 to 40 degrees relative to a horizontal plane 1020, including, for example, 38 degrees, and the long sides 604B1-B2 can have a funnel angle 605B or slope of approximately 28 to 33 degrees relative to a horizontal plane 1020, including, for example, 31 degrees, to maximize the capacity of the conveyor hopper 600 and the flow of proppant 538 from the conveyor hopper 600.

Figure 26A:
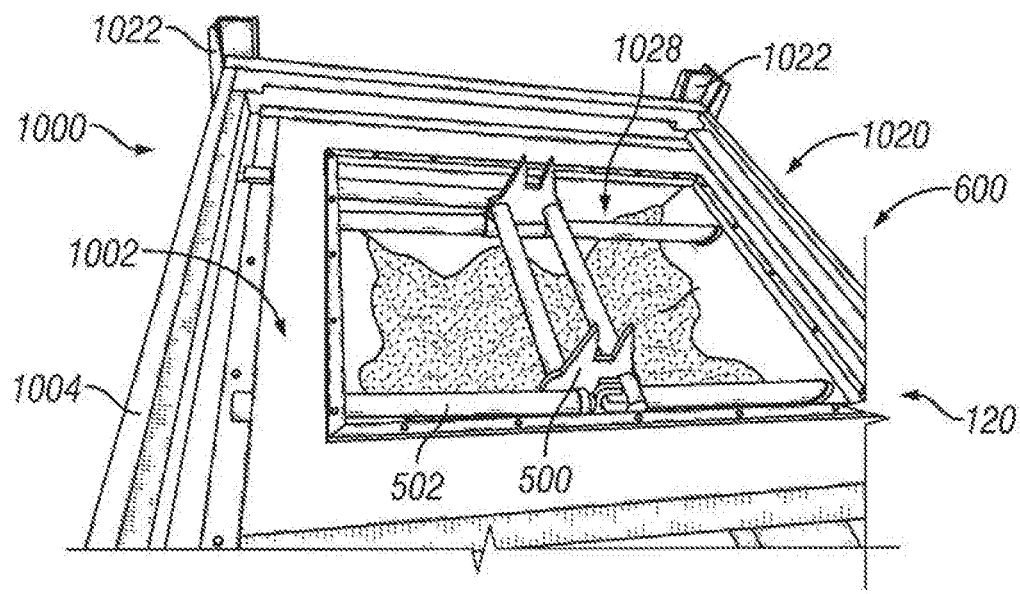
FIG. 26A is a fragmented perspective view of a conveyor hopper substantially full of proppant for fracking according to an embodiment of a system and method of the present invention.
Figure 26B:
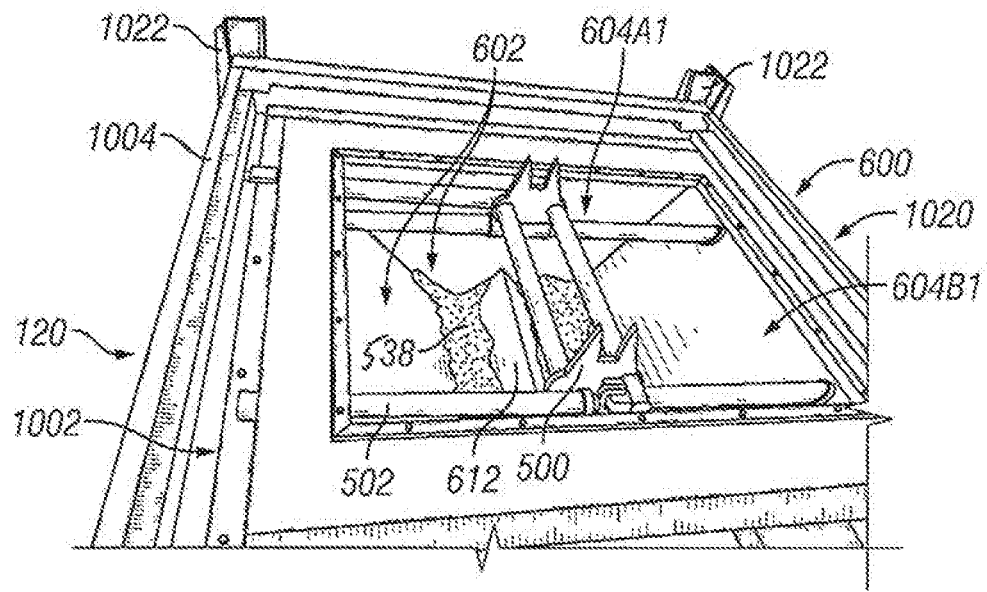
FIG. 26B is a fragmented perspective view of a conveyor hopper partially full of proppant for fracking according to an embodiment of a system and method of the present invention.
Figure 26C:
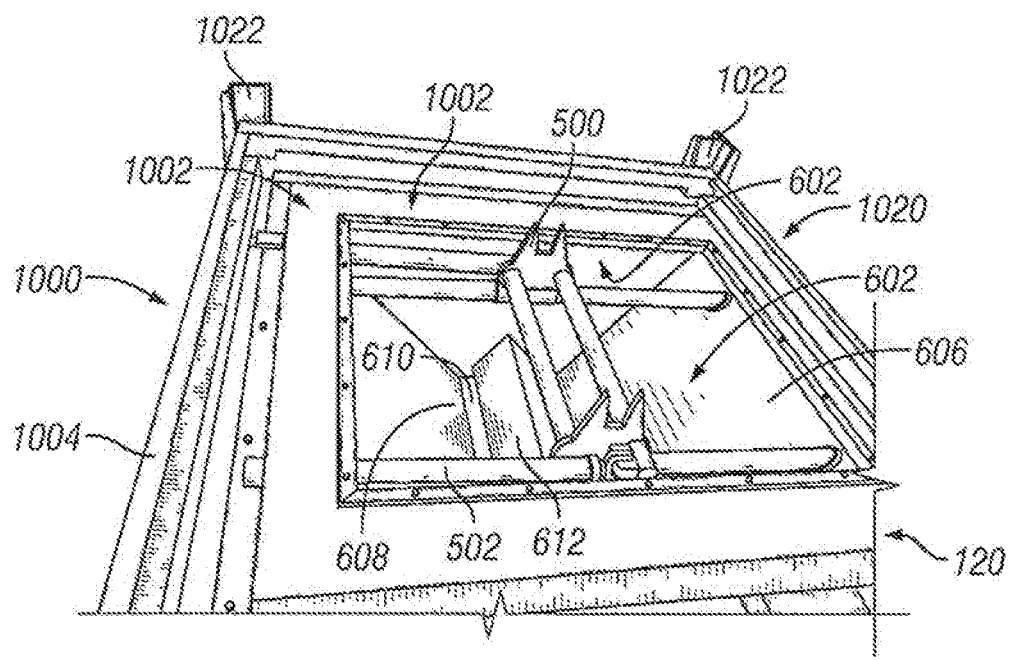
FIG. 26C is a fragmented perspective view of a conveyor hopper without proppant according to an embodiment of a system and method of the present invention.
Figure 27A:
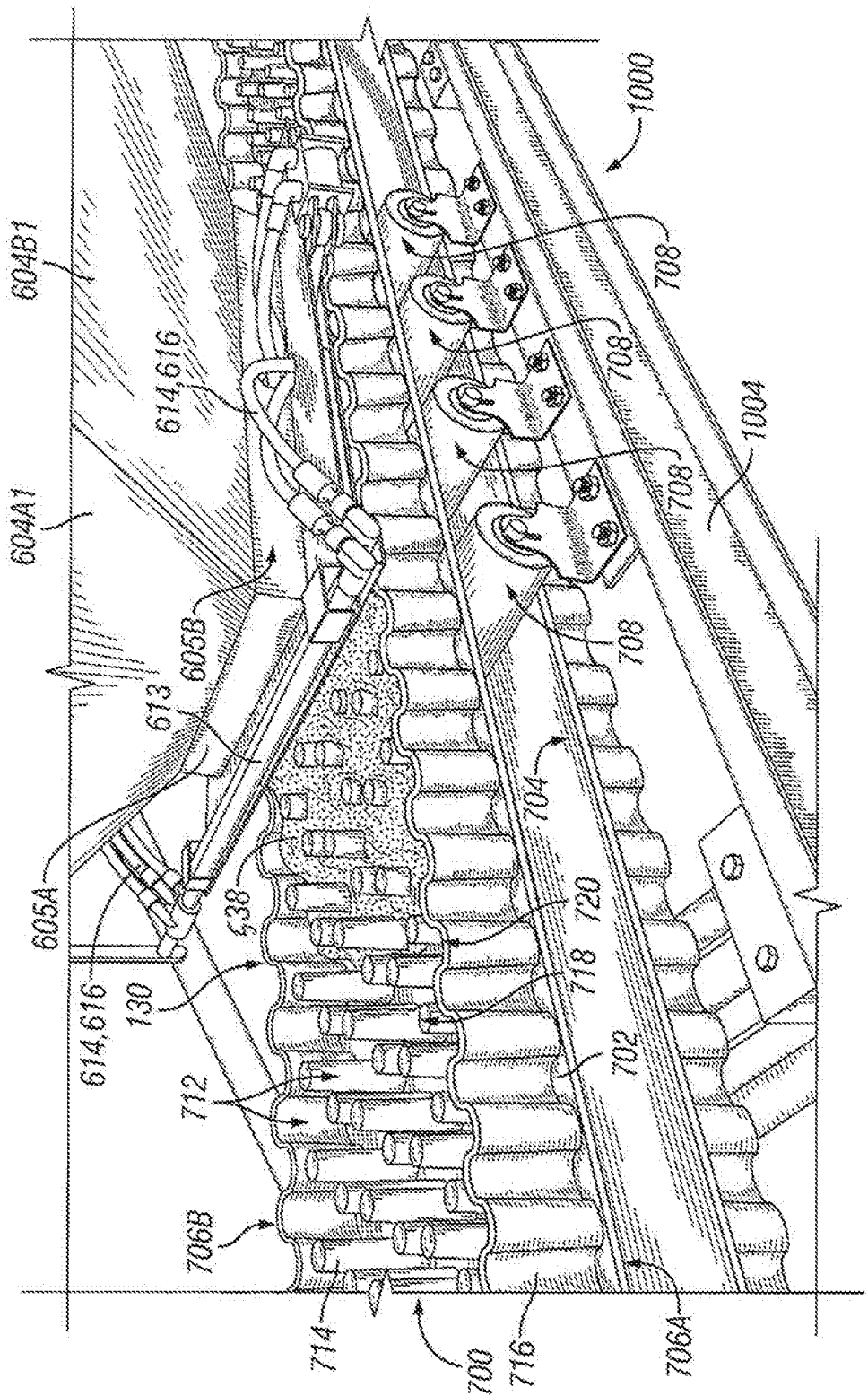
FIG. 27A is a fragmented perspective view of a conveyor belt having a plurality of partitions and a plurality of outside walls to convey proppant according to an embodiment of a system and method of the present invention.
Figure 27B:
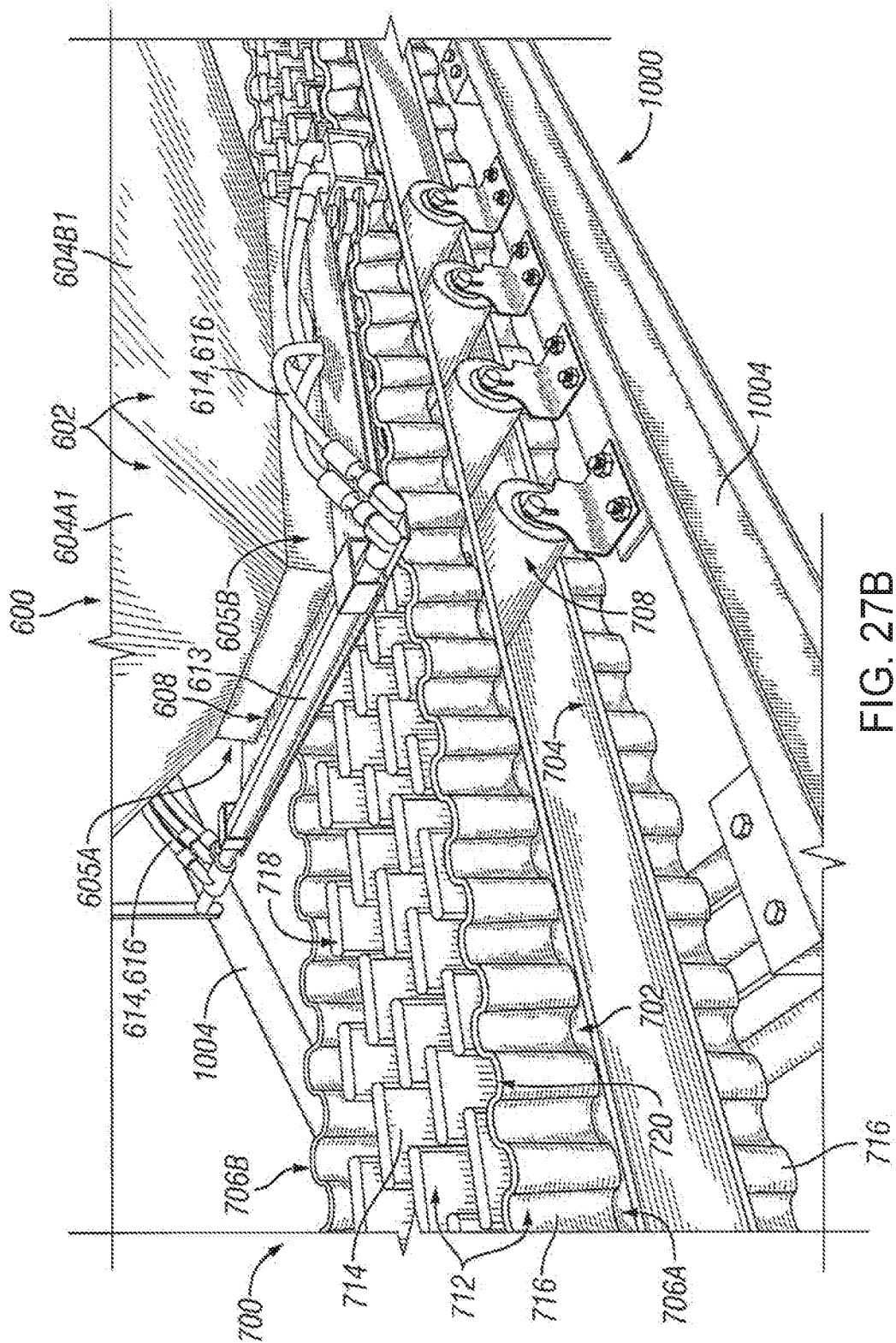
FIG. 27B is a fragmented perspective view of an alternative embodiment of a conveyor belt shown in FIG. 27A, having a plurality of partitions and a plurality of outside walls to convey proppant according to an embodiment of a system and method of the present invention.

In the embodiments shown in the series from FIGS. 26A to 26C, for example, proppant 538 is controllably discharged from the conveyor hopper 600 so that there is no excess proppant 538 discharged at any one time. This embodiment prevents the creation of a cloud of silica dust 550 in the area of the conveyor belt 700, while maximizing the efficiency of the delivery of proppant 538 onto the conveyor belt 700.

As shown in FIGS. 27A-27B and 28A-28B, each respective conveyor belt is adapted to reduce the risk of production and release of silica dust 550 as proppant 538 guidingly falls from the plurality of conveyor hoppers 600 to the one or more conveyor belt 700. The respective one or more conveyor belts 700 can include a plurality of partitions 712. Embodiments of the plurality of partitions 712 can include a plurality of fingers 714 and an outside wall 716 on each side. Each respective conveyor belt 700 can be manufactured to include, or integrate, the plurality of fingers 714 and the outside walls 716. Alternatively, the plurality of fingers 714 and the outside walls 716 can be connected to a top surface 702 of a conveyor belt using commercially-acceptable adhesive.

As shown in the embodiments of FIGS. 27A-27B and 28A-28B, the conveyor belt 700 is positioned at or near the one or more controllable openings 610 of the plurality of conveyor hoppers 600 to reduce risk of production and release of silica dust 550 as proppant 538 flows from the plurality of containers 900, to and through the plurality of conveyor hoppers 600, onto the one or more conveyor belts 700. In an embodiment, for example, the conveyor belt 700 is substantially enclosed.

Figure 28A:
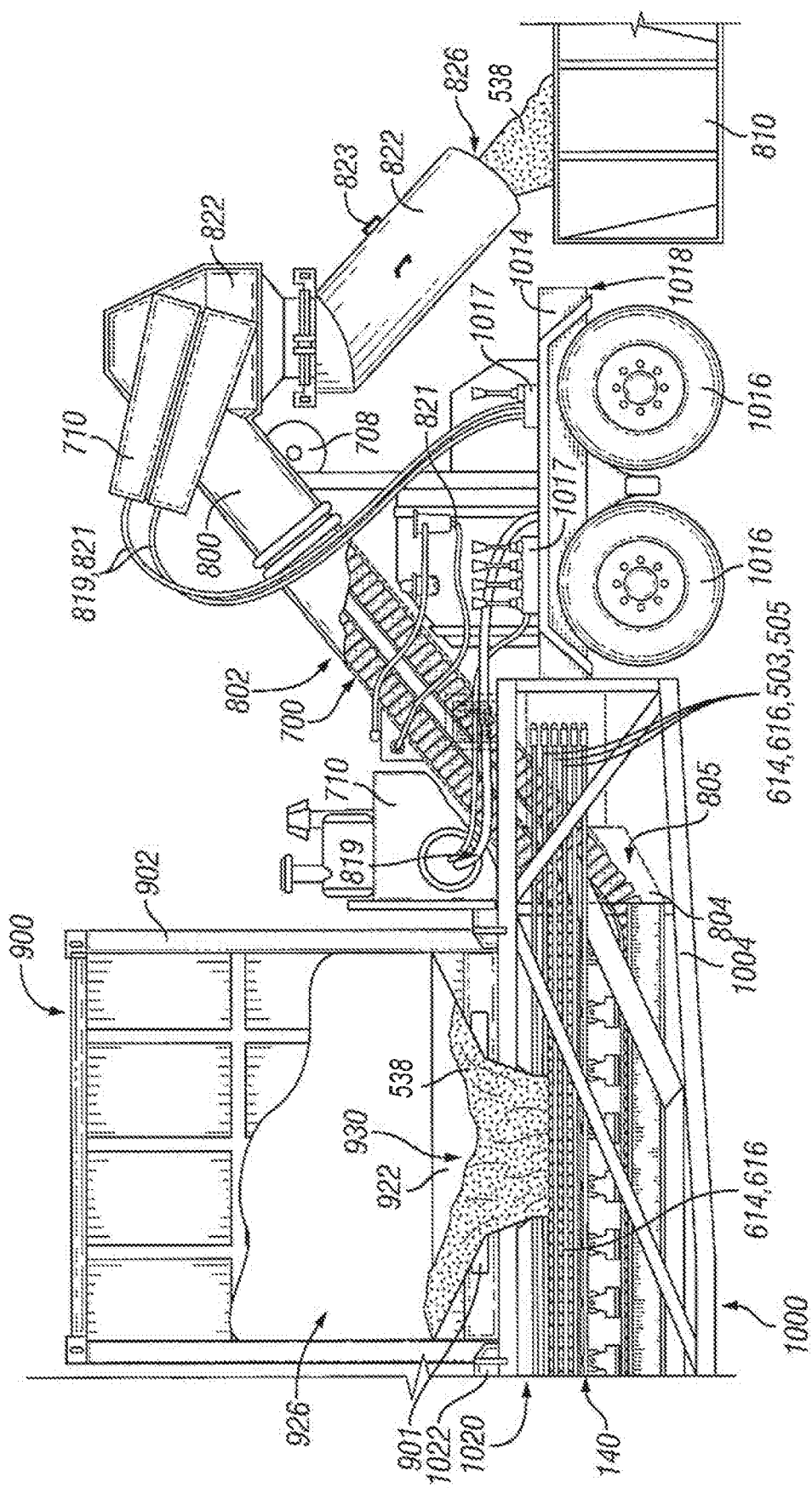
FIG. 28A is a fragmented perspective view of a second end of a conveyor according to an embodiment of a system and method of the present invention with a partial breakaway view of the shroud for clarity further to show a conveyor belt.
Figure 28B:
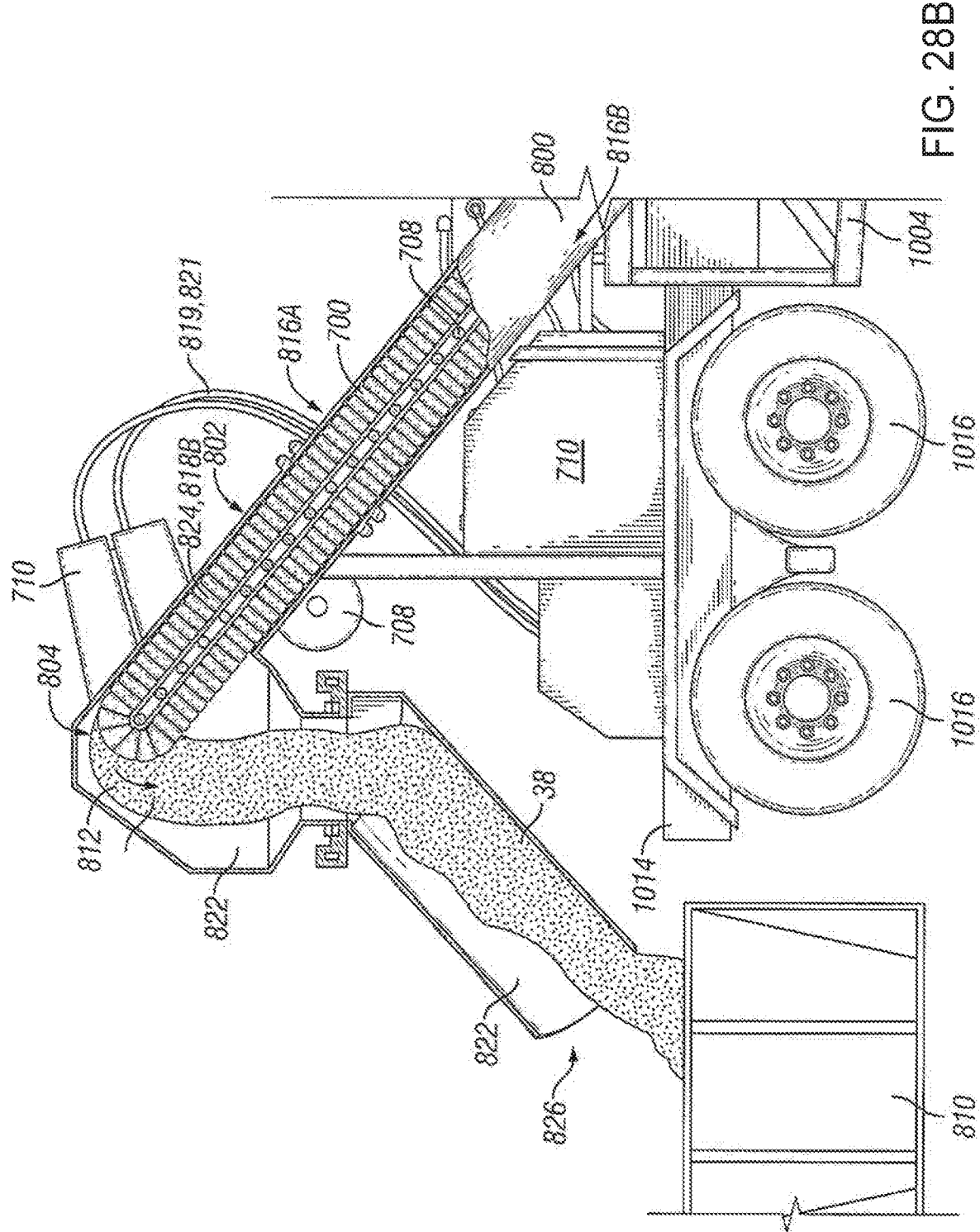
FIG. 28B is a fragmented perspective view of a second end of the conveyor according to an embodiment of a system and method of the present invention with a partial breakaway view of a chute for clarity further to show the second end of the conveyor belt depositing proppant into the chute by gravity feed.

As shown by the break-away portions of FIG. 28A, once the conveyor belt 700 passes the end of the last respective container 900 positioned on the conveyor 1000, the conveyor belt 700 is directed by one or more rollers 708 in an upward direction towards the second end 1014 of the conveyor 1000. This portion 802 of the conveyor belt 700 can travel upwards at an angle 805 of approximately thirty to sixty degrees with respect to a horizontal plane 1020 extending from the conveyor belt 700 as it is level with the ground. The portion 802 of the conveyor belt 700 that travels in an upward direction also passes through a shroud 800, therein defining a shrouded portion 802 of the conveyor belt 700, as shown in FIGS. 28A-28B. The shrouded portion 802 is positioned between a last respective container 900 on the conveyor 1000 and an inlet 824 of the chute 822 at an angle 805 of approximately 30 to 60 degrees from a horizontal plane 1020 when the conveyor 1000 is level. At the second end 1014 of the conveyor 1000, the one or more conveyor belts 700 turns about within the chute 822 that is substantially enclosed and travels downward towards a first end 1012 of the conveyor 1000. As shown in FIG. 28B, as the conveyor belt 700 turns about, the proppant 38 is deposited into a chute 822 that is enclosed by gravity feed 812. The proppant 38 flows down the chute 822 and is deposited where the operator 806 or machine directs the proppant 38 from the outlet 826 of the chute 822, but the chute 822 can be positioned to deposit proppant 38 into a blender hopper 810 at the well site 530.

In an embodiment, the conveyor belt 700 need not travel in an upward direction at the second end 1014 of the conveyor 1000, but rather, may stay level, or travel in a downward path, if the conveyor 1000, the one or more conveyor belts 700, or the chute 822, is positioned to deposit proppant 538 into a blender hopper 810 that is at or below the one or more conveyor belts 700, or if the chute 822 is positioned to deposit proppant 538 into a hole, for example. This embodiment of the present invention may include the one or more conveyor belts 700 traveling in a substantially level or downward path from the first end 1012 of the conveyor 1000 to the second end 1014, underneath the plurality of conveyor hoppers 600, and depositing the proppant 38 into a chute 822 or directly into a blender hopper 810 without passing through a shrouded portion 802. In this embodiment, the chute 822 or blender hopper 810 is adapted or positioned to remain lower to the ground than the top surface 702 of the conveyor belt 700 such that proppant 38 is deposited directly into either the chute 822 or the blender hopper 810 by gravity feed 812 as the conveyor belt 700 turns about around a roller 708. This embodiment, for example, provides that the one or more engines 710 and the controls 1017, if any, may need to be moved from the second end 1014 of the conveyor 1000 to the first end 1012 to accommodate the elimination of the shrouded portion 802 at the second end 1014. In this embodiment, the wheels 1016 of the conveyor 1000 may also move to the first end 1012 of the conveyor 1000. This embodiment may also include a blender hopper cover 1208 and a plurality of curtains 1200 to reduce the risk of production and release of silica dust 550 at the well site 530.

This application claims the benefit of, and is a divisional of U.S. patent application Ser. No. 14/738,485, filed Jun. 12, 2015, titled "Apparatus for the Transport and Storage of Proppant," which is a continuation-in-part of U.S. patent application Ser. No. 13/768,962, filed Feb. 15, 2013, titled "Support Apparatus for Moving Proppant from a Container in a Proppant Discharge System," now U.S. Pat. No. 9,771,224, issued Sep. 26, 2017, which is a continuation-in-part of U.S. patent application Ser. No. 13/628,702, filed Sep. 27, 2012, titled "Proppant Discharge System and a Container for Use in Such a Proppant Discharge System," which is a continuation-in-part of U.S. patent application Ser. No. 13/555,635, filed Jul. 23, 2012, titled "Proppant Discharge System Having a Container and the Process for Providing Proppant to a Well Site," now U.S. Pat. No. 9,718,610, issued Aug. 1, 2017, all of which are incorporated herein by reference in their entireties. U.S. patent application Ser. No. 14/738,485 further claims priority to and the benefit of U.S. Provisional Application No. 62/012,153, filed Jun. 13, 2014, titled "Process and System for Supplying Proppant from a Mine to a Transport Vehicle," U.S. Provisional Application No. 62/012,165, filed Jun. 13, 2014, titled "Apparatus for the Transport and Storage of Proppant," and U.S. Provisional Application No. 62/139,323, filed on Mar. 27, 2015, titled "Spine Car for Transporting Proppant Containers," all of which are incorporated herein by reference in their entireties.

Referring to FIGS. 28A-28B, the shroud 800 is a box, tube, or container structure that substantially or completely encloses a the shrouded portion 802 of the conveyor belt 700 while it is traveling in an upward direction towards the second end 1014 of the conveyor 1000. The shroud 800 can be a closed and elongated box having four sides 816A, 816B, 816C, 816D, and a first end 818A and a second end 818B, each end being open to allow the conveyor belt to pass through. The sides 816A-D of the shroud 800 can include a plurality of steel panels bolted together around the conveyor belt 700, and bolted to the conveyor at a first end 818A, and bolted to the chute 822 at a second end 818B. The material need not be steel panels, but could also include a seamless steel box, or another structure made of a similar metal, plastic, cloth, tarp, or other sheets. The shroud 800 need not fully enclose the conveyor belt 700. For example, the shroud 800 may include a tarp covering the top surface 702 of the conveyor belt 700 having a plurality of partitions 712, connected to the second end 1014 of the conveyor 1000 at the first end 818A of the shroud 800 and the chute 822 at the second end 818B of the shroud 800, using fasteners 820 such as bungee cords, rope, zip ties, or other connection means. Alternatively, the shroud 800 and chute 822 may be integral with one another or fully connected by bolts, welding, or similar connection. The shroud 800 is adapted and positioned to reduce the risk of release of silica dust 50 associated with proppant 38 as it is conveyed along the conveyor belt 700. The shroud 800 also prevents wind from blowing proppant 38 off of the conveyor belt 700, and rain from wetting the proppant 38 that may hinder the proppant 38 from flowing properly.

We claim:

1. A proppant delivery system comprising:
a track having a first portion and a second portion spaced apart from the first portion;
a container-hauling trolley with a container configured to move along the track;
a proppant supply station having a loading bay positioned adjacent the first portion of the track, the container-hauling trolley configured to move along the track for transporting the container in an empty state to the loading bay;
a proppant discharge station having an unloading bay positioned adjacent to the second portion of the track, the container-hauling trolley further configured to move along the track for transporting the container in a filled state from the loading bay to the unloading bay;
a container transport pathway arranged in spaced relation to said track and extending between the proppant discharge station and a remote well site location; and
a crane having a first crane portion adjacent the proppant discharge station and a second crane portion adjacent the container transport pathway, the crane configured to transfer the container in the filled state from the container-hauling trolley at the unloading bay toward the container transport pathway.

2. The proppant delivery system of claim 1, the crane comprising a gantry crane having a first gantry crane portion located directly above the proppant discharge station and a second gantry crane portion located above the container transport pathway.

3. The proppant delivery system of claim 1, wherein the container transport pathway comprises one or more of (i) a railroad track, and (ii) a road, the system further comprising:
a container transport vehicle movably positioned on the container transport pathway, the container transport vehicle configured to move between the crane adjacent the proppant discharge station and the well site location that uses the proppant from the proppant container.

4. The proppant delivery system of claim 1, the proppant supply station further comprising a silo positioned above the track and the loading bay, the silo configured for gravity discharge of proppant from the silo into the container on the container-hauling trolley.

5. The proppant delivery system of claim 1, the proppant discharge station comprising an inventory stack adjacent the unloading bay, wherein the crane is further configured to transfer the container in the filled state from the unloading bat to the inventory stack.

6. The proppant delivery system of claim 1, the proppant discharge station comprising a first inventory stack and a second inventory stack, wherein the crane is further configured to transfer the container in the filled state from the container-hauling trolley to the first inventory stack and to transfer the container in an empty state from the second inventory stack to the container-hauling trolley.

7. A proppant delivery system comprising:
a track;
a container-hauling trolley configured to move along the track;
a proppant supply station positioned adjacent a first portion of the track, the container-hauling trolley configured to move along the track to a location adjacent the proppant supply station;
a proppant discharge station positioned adjacent to a second portion of the track, the container-hauling trolley further configured to move along the track to a location adjacent the proppant discharge station;
a container transport pathway comprising one or more of (i) a railroad track, and (ii) a road extending in spaced relation to said track;

a crane having a first crane portion adjacent the proppant discharge station and a second crane portion adjacent the container transport pathway, the crane configured to transfer a proppant container from the proppant discharge station toward the container transport pathway, a container transport vehicle movably positioned on the container transport pathway, the container transport vehicle configured to move between a location adjacent the crane and a well site location that uses the proppant from the proppant container.

8. The proppant delivery system of claim 7, the crane comprising a gantry crane having a first gantry crane portion located directly above the proppant discharge station and a second gantry crane portion located above the container transport pathway.

9. The proppant delivery system of claim 7, the proppant supply station further comprising a silo positioned above the track, the silo configured for gravity discharge of proppant from the silo into the proppant container on the container-hauling trolley.

* * * * *